(12) United States Patent
Mischell et al.

(10) Patent No.: US 9,213,993 B2
(45) Date of Patent: Dec. 15, 2015

(54) INVESTMENT, TRADING AND ACCOUNTING MANAGEMENT SYSTEM

(75) Inventors: Thomas E. Mischell, Cincinnati, OH (US); Patricia J. Fink, Cincinnati, OH (US); Brian S Hertzman, Cincinnati, OH (US); Anita J. Giesler, Newport, KY (US); Jane M. Anthony, Crestview Hills, KY (US); Kathleen J. Brown, Cincinnati, OH (US); Carol K. Thomas, Edgewood, KY (US); Alistair M. Bates, Loveland, OH (US); Steven Ely Khosrova, Woodland Park, NJ (US); Nick Rosser, Amityville, NY (US); Deepak Agarwal, Gurgaon (IN)

(73) Assignee: American Financial Group, Inc., Cincinnati, OH (US)

( * ) Notice: Subject to any disclaimer, the term of this patent is extended or adjusted under 35 U.S.C. 154(b) by 393 days.

(21) Appl. No.: 13/494,228

(22) Filed: Jun. 12, 2012

(65) Prior Publication Data
US 2013/0332324 A1     Dec. 12, 2013

(51) Int. Cl.
*G06Q 40/00*   (2012.01)
*G06Q 40/06*   (2012.01)

(52) U.S. Cl.
CPC .............. *G06Q 40/06* (2013.01); *G06Q 40/123* (2013.12)

(58) Field of Classification Search
CPC ...................................................... G06Q 40/06
USPC ........................................... 705/30, 35, 36 R
See application file for complete search history.

(56) References Cited

U.S. PATENT DOCUMENTS

| 6,064,985 A * | 5/2000 | Anderson .................... 705/36 R |
| 2011/0040700 A1* | 2/2011 | Griffin et al. ................ 705/36 R |

* cited by examiner

*Primary Examiner* — Hunter Wilder
(74) *Attorney, Agent, or Firm* — Pepper Hamilton LLP

(57) ABSTRACT

Systems and methods to manage investments, trades, and financial accounting. The integrated system processes an investment under various investment groups and accounting methodologies, such as GAAP, SAP, Tax, and. Trade. An investment is processed based on events occurring during the life of the investment for each accounting method to provide for accurate financial reporting in accordance with the one or more accounting methods, such as GAAP, SAP, and Tax accounting. The system is flexible to calculate cash flow, yield, and amortization for an investment during the lifespan timeline of the investment based on the occurrence of an event (or a hypothetical event) during the lifespan timeline of the investment. Accurate reporting is provided by effective dating events of an investment to the appropriate reporting period. The system provides for consolidation, e.g., the aggregation of income and assets from a set of portfolios to report them as one group.

21 Claims, 38 Drawing Sheets

Security Type Table

Common Stock
American Depository Receipts
LP-Shares
Mutual Fund
Equity Option
    Equity Call Option
    Equity Put Option
Asian Option
Right
Warrant
Perpetual Ptd
    Perpetual Pfd with Warrant
    Perpetual Pfd Step-ups
    Perpetual Pfd - Convertible
Mandatory Redeemable Pfd
    Mandatory Redeemable Pfd - Convertible
    Mandatory Redeemable Pfd with Warrant
Trust Preferred - Shares
Dutch Auction Pfd
Corp & Other Bond
    Corp & Other Bond with Warrant
    Corp & Other Convertible
Trust Preferred - Par Value
Bank loans
Corp & Other Revolving Line Of Credit
Corp & Other Term Loan
Muni - Revenue
Muni - GO State
Muni - GO - Non State
Govt - Agency
U.S. Treasury Notes
U.S. Treasury Bonds
Treasury Bills
MBS
    MBS - Agency
    MBS - Private Label
ABS
    ABS - Agency
    ABS - Private Label
TBA
TBD
LP
LLC

PROSPECTUS PROCESSING FLAGS

Epires?
The security has an Expiration Date, and will expire automatically

Matures or Redeems?
On a specified maturity/redemption date the issuer pays the holder

Convertible?
The security has a feature that it may be converted to another security

Detachable Warrant?
The prospectus states that there is an associated detachable warrant

Pays Dividends?
Dividend calculation if announced for accrual

Pays Interest?
Interest Income will be calculated for accrued and Coupon Payments received

Factor Based Paydowns?
Redemptions are processed by Principal Factor changes

Sinking Fund Schedule?
Paydowns according to a Sinking Fund schedule

Schedule Payment?
Paydowns principal according to a predefined principal schedule

Call Schedule?
The issuer may call all or part of the holdings

Put Schedule?
The holder may request the redemption of all or part of the holdings

Prepayments Allowed?
Issuer may pay principal prior to Maturity

Security Template Initialization

Security Template Name: Common Stock — 512

Bloomberg Product Type: EQUITY   **Trading Quantity Type *:** Shares
Processing Class: Stock Note: a Sinking Fund Schedule security always trades with a Original Face.

Prospectus Processing Flags — 515

| | | | |
|---|---|---|---|
| Expires/Exercisable | Not Applicable | Has Factor Based Paydowns | Not Applicable |
| Matures/Redeems | Not Applicable | Has Sinking Fund Schedule | Not Applicable |
| Is Convertible | Not Applicable | Has Schedule Payments | Not Applicable |
| Has Detachable Warrant | Not Applicable | Has Call Schedule | Not Applicable |
| Pays Dividends | Applicable | Has Put Schedule | Not Applicable |
| Pays Interest | Not Applicable | Prepayments Allowed | Not Applicable |

Accounting Method Processing Flags — 520

| Embedded Derivative | GAAP | SAP | TAX |
|---|---|---|---|
| Has Embedded Derivative | Not Applicable | Not Applicable | N/A |

Book Value Accounting

| | GAAP | SAP | TAX |
|---|---|---|---|
| Amortizes | Not Applicable | Not Applicable | Not Applicable |
| Mark to Market | Not Applicable | Not Applicable | N/A |
| Cost Recovery | Not Applicable | Not Applicable | Not Applicable |

Ledger Classification — 525

| | GAAP | SAP | TAX |
|---|---|---|---|
| Ledger Class | Common Stock | Common Stock | Common Stock |
| Income Treatment | Dividend Income | Dividend Income | Dividend Income |

Reporting Classification — 530

| | GAAP | SAP | TAX | Trading |
|---|---|---|---|---|
| Reporting Class | Equity | Equity | Equity | N/A |

[ Cancel ]  [ Clear ]  [ Accept ]

| Ledger Class | Income Treatment | Reporting Class | Trading Quantity | Security Type | Bloomberg Product | Processing Class | Applicable |
|---|---|---|---|---|---|---|---|
| Common Stock | Dividend Income | Cash | Notional Amount | Common | CMDTY | Stock | Optional |
| Preferred Stock | Interest Income | Debt | Contracts | Perpetual Pfd | EQUITY | Preferred Stock | Not Applicable |
| Convertible Pfd | LP / LLC Income | Derivative | Shares | MRP | MUINI | Equity Option | |
| MRP | Option Income | Equity | Par | Convertible Pfd | PFD | Asian Option | |
| Convertible MRP | None | Mortgage Backed | Original Face | Trust Preferred Equity | CLNT | Dept | |
| Bonds | | Partnership | Notional Par | Bonds | M-MKY | MBS / ABS | |
| Convertible Bonds | | Short Term Debt | Percent | Convertible Bond | GOVT | LP / LLC | |
| Rights | | CFC | | Trust Preferred Debt | CORP | | |
| Warrants / Options | | PFIC | | MBS./ ABS | INDEX | | |
| Asian Option | | Warrants | | Asian Option | CURNCY | | |
| Equity Option | | Options | | MBS IO | MTGE | | |
| LP / LLC | | | | Equity Option | None | | |
| Other invested Assets | | | | Warrant | | | |
| Direct Mortgages | | | | Right | | | |
| | | | | LP Shares | | | |
| | | | | ? | | | |

| Completed | Security Attribute | Bloomberg Field | Value | Security Type |
|---|---|---|---|---|
| Rules for Template: | Bloomberg Product Type | DS122 Market Sector | Equity | |
| | BB Security Type | DS674 Security Type 2 | Common Stock | |
| | | | REIT | |
| | | | Depository Receipt | |

| Rules for Security Type: | Bloomberg Product Type | DS122 Market Sector | Equity | Common |
|---|---|---|---|---|
| | BB Security Type | DS674 Security Type 2 | Common Stock | |
| | BB Security Type | DS674 Security Type 2 | REIT | |

| | Bloomberg Product Type | DS122 Market Sector | Equity | American Depositort Receipt |
|---|---|---|---|---|
| | BB Security Type | DS674 Security Type 2 | Depository Receipt | |

Security Template Initialization — 550

| | | | | |
|---|---|---|---|---|
| Security Template Name | MBS & ABS — 552 | | | |
| Bloomberg Product Type | MTGE | | Trading Quantity Type * | Original Face |
| Processing Class | MBS / ABS | | | |

Note: a Sinking Fund Schedule security always trades with a Original Face

Prospectus Processing Flags — 555

| | | | |
|---|---|---|---|
| Expires/Exercisable | Not Applicable | Has Factor Based Paydowns | Applicable |
| Matures/Redeems | Applicable | Has Sinking Fund Schedule | Not Applicable |
| Is Convertible | Not Applicable | Has Schedule Payments | Not Applicable |
| Has Detachable Warrant | Not Applicable | Has Call Schedule | Not Applicable |
| Pays Dividends | Not Applicable | Has Put Schedule | Not Applicable |
| Pays Interest | Applicable | Prepayments Allowed | Not Applicable |

Accounting Method Processing Flags — 560

| Embedded Derivative | GAAP | SAP | TAX |
|---|---|---|---|
| Has Embedded Derivative | Not Applicable | Not Applicable | N/A |

Book Value Accounting

| | GAAP | SAP | TAX |
|---|---|---|---|
| Amortizes | Applicable | Applicable | Applicable |
| Mark to Market | Optional | Optional | N/A |
| Cost Recovery | Not Applicable | Not Applicable | Not Applicable |

Ledger Classification — 565

| | GAAP | SAP | TAX |
|---|---|---|---|
| Ledger Class | Bonds | Bonds | Bonds |
| Income Treatment | Interest Income | Interest Income | Interest Income |

Reporting Classification — 570

| | GAAP | SAP | TAX | Trading |
|---|---|---|---|---|
| Reporting Class | Mortgage Backed | Mortgage Backed | Mortgage Backed | N/A |

| Cancel | Clear | Accept |
|---|---|---|

| Ledger Class | Income Treatment | Reporting Class | Trading Quantity | Security Type | Bloomberg Product Type | Processing Class | Applicable |
|---|---|---|---|---|---|---|---|
| Common Stock | Dividend Income | Cash | Notional Amount | Common | CMDTY | Stock | Optional |
| Preferred Stock | Interest Income | Debt | Contracts | Perpetual Pfd | EQUITY | Preffered Stock | Not Applicable |
| Convertible Pfd | LP / LLC Income | Derivative | Shares | MRP | MUINI | Equity Option | |
| MRP | Option Income | Equity | Par | Convertible Pfd | PFD | Asian Option | |
| Convertible MRP | None | Mortgage Backed | Original Face | Trust Preferred Equity | CLNT | Dept | |
| Bonds | | Partnership | Notional Par | Bonds | M-MKY | MBS / ABS | |
| Convertible Bonds | | Short Term Debt | Percent | Convertible Bond | GOVT | LP / LLC | |
| Rights | | CFC | | Trust Preferred Debt | CORP | | |
| Warrants / Options | | PFIC | | MBS./ ABS | INDEX | | |
| Asian Option | | Warrants | | Asian Option | CURNCY | | |
| Equity Option | | Options | | MBS IO | MTGE | | |
| LP / LLC | | | | Equity Option | None | | |
| Other invested Assets | | | | Warrant | | | |
| Direct Mortgages | | | | Right | | | |
| | | | | LP Shares | | | |
| | | | | ? | | | |

| Completed | Security Attribute | Bloomberg Field | Value | Security Type |
|---|---|---|---|---|
| Rules for Template: | Rule 1: | | | |
| | Bloomberg Product Type | DS122 Market Sector | MTGE (or MORTGAGE) | |

FIG. 16A

| | | | | 575 |
|---|---|---|---|---|
| Bloomberg Product Type | DS122 Market Sector | Corp | | |
| LP / LLC | DS826 CDO/CLO FLAG | Y | | |
| Is CBO/CLO | DS166 Is Sinkable | N | | |
| Sinking Fund | Priority: | | | |
| Rule for Security Type: | | | | SAP Reporting Group |
| Bloomberg Product Type | DS122 Market Sector | MTGE | TBA | MBS-TBA |
| Issuer Name | DS134 Issuer | Freddie Mac | | |
| | | FHLMC-GNMA | | |
| | | FHLMC STRUCTURE PASS THROUGH | | |
| | | FANNIE MAE | | |
| | | GOVERNMENT NATIONAL MORTGAGE A | | |
| | | FANNIEMAE WHOLE LOAN | | |
| | | Fanniemae Aces | | |
| | | Fanniemae Strip | | |
| | | FannieMae Grantor Trust | | |
| Tax Original Issue Date | DS173 First Settle Date | First Settle Date is >= 30 days from Issue Date | | |
| Issue Date | DS031 Issue Date | See rules above for Tax Original Issue Date | | |
| Bloomberg Product Type | DS122 Market Sector | MTGE (or MORTGAGE) | TBA | MBS-TBA |
| BB Security Type | If Security Type 2 | Whole Loan | | |
| Tax Original Issue Date | DS173 First Settle Date | First Settle Date is >= 30 days from Issue Date | | |
| Issue Date | DS031 Issue Date | | | |
| Bloomberg Product Type | DS122 Market Sector | MTGE (or MORTGAGE) | MBS-Agency | |
| Issuer Name | If Issuer DS134 | Freddie MAC | | |
| | | FHLMC-GNMA | | |
| | | FHLMC STRUCTURE PASS THROUGH | | |
| | | FANNIE MAE | | |
| | | GOVERNMENT NATIONAL MORTGAGE A | | |
| | | FANNIEMAE WHOLE LOAN | | |
| | | Fanniemae Aces | | |
| | | Fanniemae Strip | | |
| | | FannieMae Grantor Trust | | |
| Bloomberg Product Type | DS122 Market Sector | MTGE (or MORTGAGE) | ABS-Agency | |
| Issuer Name | If Issuer DS134 | SMALL BUSINESS ADMINISTRATOR | | |
| | | SBIC | | |
| Bloomberg Product Type | DS122 Market Sector | MTGE (or MORTGAGE) | ABS-Private Label | ABS-Non Agency |
| BB Security Type | DS674 Security Type 2 | ABS,CMO,CBO,HY or ABS Other | | |
| Bloomberg Product Type | DS122 Market Sector | Corp | ABS-Private Label | ABS-Non Agency |
| Is CBO/CLO | DS826 CDO/CLO FLAG | Y | | |
| Sinking Fund | DS166 Is Sinkable | N | | |
| | DS122 Market Sector | MTGE (or MORTGAGE) | MBS-Private Label | MBS-Non Agency |
| | DS674 Security Type 2 | Whole Loan | | |

Note: Trading Quantityt is set for IOs by DS148 Notional Principal Flag.

Issue: Another alternative

| Issuer Name | If Issuer DS134 | Freddie MAC | MBS-Agency |
|---|---|---|---|
| | | FHLMC-GNMA | |
| | | FHLMC STRUCTURE PASS THROUGH | |
| Either have all these choices or we could say-it starts with or contains "Freddie, FHLMC, Fannie, Government or Fanniemae | | FANNIE MAE | |
| | | GOVERNMENT NATIONAL MORTGAGE A | |
| | | FANNIEMAE WHOLE LOAN | |
| | | Fanniemae Aces | |
| | | Fanniemae Strip | |
| | | FannieMae Grantor Trust | |

FIG. 16B

| REAL EVENT TYPE MAPPING TO BUSINESS EVENT TYPE | | | |
|---|---|---|---|
| Real Event Definition Name | Sequence (Processing Order) | Accounting Method | Business Event Definition Name |
| Accretion Factor | 1 | GAAP | Amortization Income |
| Accretion Factor | 2 | GAAP | Interest Accrual |
| Accretion Factor | 3 | GAAP | Mark To Market Adjustment Amortizing |
| Accretion Factor | 4 | GAAP | Accretion Factor |
| Accretion Factor | 1 | SAP | Amortization Income |
| Accretion Factor | 2 | SAP | Interest Accrual |
| Accretion Factor | 3 | SAP | Mark To Market Adjustment Amortizing |
| Accretion Factor | 4 | SAP | Accretion Factor |
| Accretion Factor | 1 | TAX | Amortization Income |
| Accretion Factor | 2 | TAX | Interest Accrual |
| Accretion Factor | 3 | TAX | Mark To Market Adjustment Amortizing |
| Accretion Factor | 4 | TAX | Accretion Factor |

FIG. 19

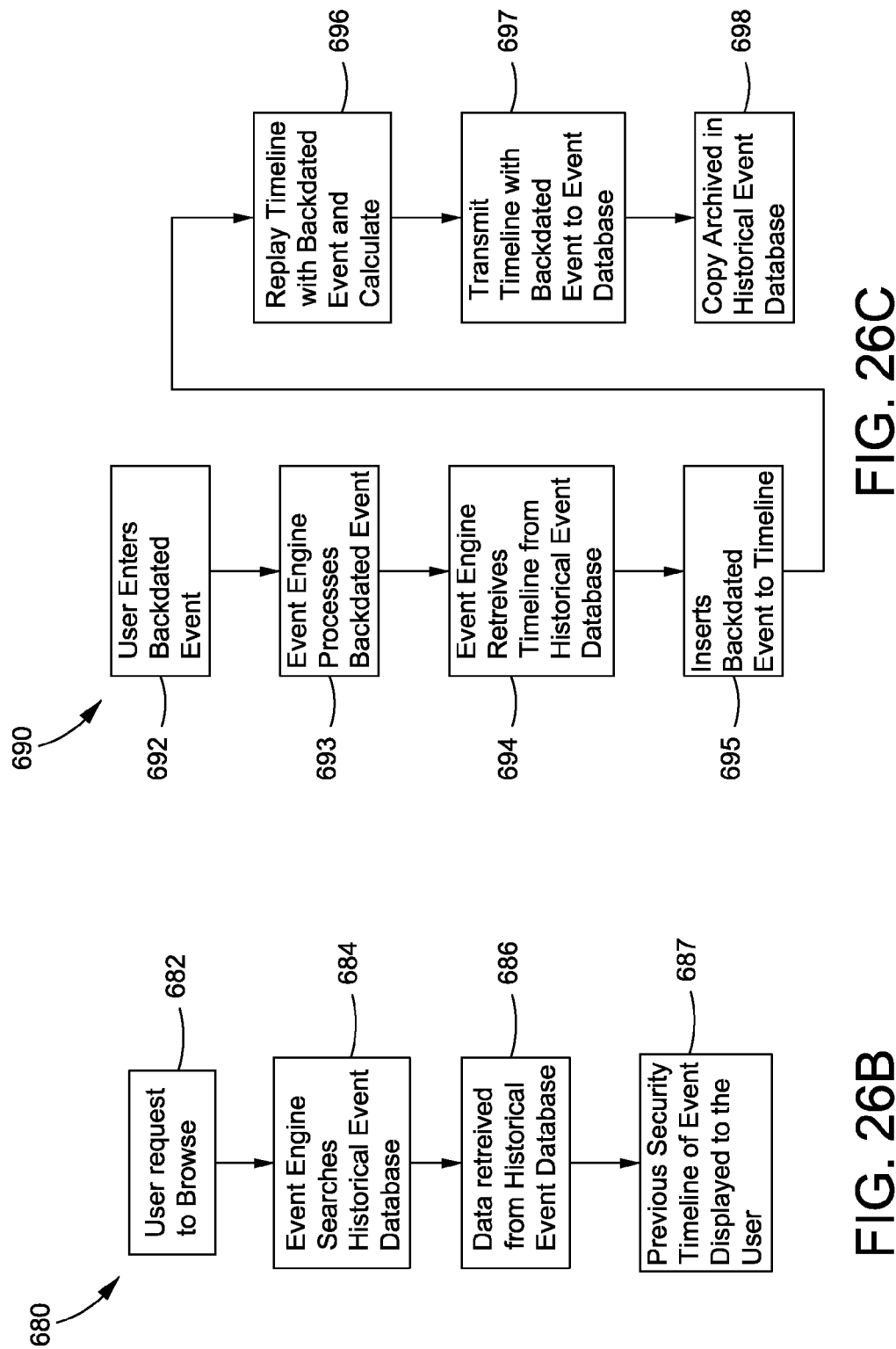

← 932

12.5 CashReconciliation - Entry Screen

| Cash Reconciliation [Entry] |||||
|---|---|---|---|---|
| Portfolio \*  Portfolio Name ← 934 |||||
| Cash Reconciliation Entry |||| Search Payables / Receivables |
| SIN* | 3D4567821 || ☐ Only Payables ☐ Only Receivables ☐ Search Reconciled Items ||
| Cash Reconciliation Date* | 01/13/2005 || Search Date Range  From: Through: ||
| Cash Reconciliation Reason | ▼ || Cash Reconciliation Reason: | All ▼ |
| Bank Account | ▼ || ☐ Include Accrued but not Due ||
| Principal |  || Bank Account: | All ▼ |
| Income |  || Note: The Cash Reconciliation Entry fields may also be used to refine the search ||
| Or Total |  |||||
|  ||| <scroll right for more fields> ||
| Fractional Share Cash |  || Processing Flags ||
| Capital Change Cash |  || Matures / Redeems | Yes Has Sinking Fund Schedule |
| Consent Fee |  || Is Convertible | No Has Call Schedule |
| Commitment Fee |  || Has Detachable Warrant | No Has Put Schedule |
|  ||| Pays Dividends | No |
| Ledger Comment |  || Pays Interest | Yes |
| <Cash Reconciliation Message Area> |||||

← 936

| Search Results (Open & Unapplied Payables / Receivables) ||| | | | |
|---|---|---|---|---|---|---|
| Expected Date / Reason / Bank Account | Event Descr. | Ledger Account Name | Original Payable Amount | Original Receivable Amount | Applied Amount | Open Payable Amount | Open Receivable Amount |

← 937

01/13/2005  Trade Settlement, SIN: 3D4567821, Description: ABC Corp Bond 5.75% 01-15-2012
☐ BNY 5432123456789
    Outside Acquisition Dept, Lot <yyyyddmmnnnn>
        Payable For Securities     4,850,330.00                4,850,330.00

← 938

01/15/2005  Income, SIN: 3D4567821, Description: ABC Corp Bond 5.75% 1-15-2012
☐ BNY 5432123456789
    Outside Acquisition Dept, Lot <yyyyddmmnnnn>
        Accrued Prepaid Interest     49,238.00             49,238.00
    Interest Acrual, Lot <yyyyddmmnnnn>
        Accrued Interest Receivable     1,092.00             1,092.00
Bank Account Total                                   50,330.00             50,330.00

Confirmation screen for a Reversal Item

| Portfolio Name | | | |
|---|---|---|---|
| Cash Reconciliation Entry ←—— 934 | | | |
| SIN* | 3D4567821 | | |
| Cash Reconciliation Date* | 01/15/2005 | | |
| Cash Reconciliation Reason | | | |
| Principal | | | |
| Income | | | |
| Or Total | | | |
| | | | |
| Fractional Share Cash | | <scroll right for more fields> | |
| Capital Change Cash | | Processing Flags | |
| Consent Fee | | | |
| Commitment Fee | | Matures / Redeems | Yes Has Sinking Fund Schedule |
| | | Is Convertible | No Has Call Schedule |
| | | Has Detachable Warrant | No Has Put Schedule |
| Ledger Comment | | Pays Dividends | No |
| | | Pays Interest | Yes |

<Cash Reconciliation Message Area>

Search Results (Open & Unapplied Payables / Receivables) ←—— 936

| Expected Date / Reason / Bank Account | Event Descr. | Ledger Account Name | Open Payable Amount | Open Receivable Amount | Applied Amount | Open Payable Amount | Open Receivable Amount |
|---|---|---|---|---|---|---|---|
| 01/13/2005 | Income, SIN: 3D4567821, Description: ABC Corp Bond 5.75% 01-15-2012 | | | | | | |
| BNY 5432123456789 | | | | | | | |
| ☐ | | Outside Acquisition Dept, Lot <yyyyddmmnnnn> | | | | | |
| | | Accrued Prepaid Interest | | 14,771.40 | | | 14,771.40 |
| | | Interest Acrual, Lot <yyyyddmmnnnn> | | | | | |
| | | Accrued Interest Receivable | | 327.60 | | | 327.60 |
| | Bank Account Total | | | 15,099.00 | | | 15,099.00 |
| 01/13/2005 | Unknown Reason, SIN: 3D4567821, Description: ABC Corp Bond 5.75% 10-20-2012 | | | | | | |
| ☐ BNY 5432123456789 | | | | | | | |
| | | Unapplied User Item: Income 12,079.20 | | | | | |

Add / Edit User

ED id: jsmith  ← 1331
First Name: John
Smith
Account Status: Active ▼

Business Group Membership
Available:　　　　　　　　　　　　　　　Selected:
```
Trading
SAP Corporate Managers          [ Add>> ]
SAP Corporate Accountants
SAP Subsidiary Managers         [ <<Remove ]
SAP Subsidiary Accountants
```
← 1332

System Roles For User
Available:　　　　　　　　　　　　　　　Selected:
```
Trade Assistant
Concent Fee                     [ Add>> ]
System Administrator
Capitol Change Input            [ <<Remove ]
Capitol Change Reviewer Trading
```
← 1334

Note: Individual users assignment of system roles is in addition to System Rules the user receives from Business Group membership.

Consolidation Group　　　　　　　　　　　　　　　1336
　　　　　　　　　← 1337
Consolidation View:　　　　　　　Consolidation Group:
GAAP ▼　　　　　　　　　　　　GAAP GROUP ▼
　　　　　　　　　　　　　　　　　　　　　　← 1338
Note: if the VIEW ALL PORTFOLIOS system role is assigned, consolidation group settings are ignored.

Portfolios
Available:　　　　　　　　　　　　　　　Selected:
```
All Portfolios
ACC                             [ Add>> ]
ADIC
AEIC                            [ <<Remove ]
AESLIC
```
← 1340

Note: Users may only update data for portfolios they are assigned to.

[ Back ]  [ Cancel ]  [ Save ]

Trading - Outside Buy, Stock

Security Information
SIN*: BCC190129
Security Name: AT&T Corp

Ratings (date updated)  NAIC Analyst  SIC / Country
Moody  NR  S&P  NR  017           4813
Fitch  NR  INT  NR  L  144A=No  USA Trade Information
Trade Date*: 12/10/2002
Settlement Date*: 12/10/2002
Broker Name*: Fidelity Corp
OR
Trade Explanation*:
Trade Explanation Detail:
Share Price ($)*: 56.00

Ledger Comment:

Trading Notes: Merrill gave an offer of 58

| Trade Allocation | | | | | | | |
|---|---|---|---|---|---|---|---|
| Portfolio* | | Shares* | Principal ($) | Commission ($) | Total ($) | Puchase Intent* | |
| | | 6,000.00 | 336,000.00 | 300.00 | 336,000.00 | Available For Sale ▼ | |
| | | | calculated | | calculated | | |
| | | | calculated | | calculated | | |
| | | | calculated | | calculated | | |
| | | | calculated | | calculated | | |
| | | | calculated | | calculated | | |
| | | | calculated | | calculated | | |
| | | | calculated | | calculated | | |
| | | | calculated | | calculated | | |
| | | | calculated | | calculated | | |
| Totals | | 6,000.00 | 336,000.00 | 300.00 | 336,000.00 | | |

FIG. 37

INVESTMENT, TRADING AND ACCOUNTING MANAGEMENT SYSTEM

TECHNOLOGY FIELD

The present invention relates generally to an investment, trading and accounting management system and method to manage investments under various accounting methodologies effective dated for events occurring in the life of the security. Effective dating ensures that the full financial effect of an event will be reported "as-of" a specific date, regardless of the date it occurred, or the date it entered the system. Various investment groups for managing the investments in the system include, for example, GAAP, SAP, Tax, and Trade. Various accounting methodologies for managing the accounting of investments in the system include, for example, GAAP, SAP, and Tax. Embodiments of the present invention are useful to track and understand differences in financial values between accounting methodologies for investments, as well as, consolidation entries, which is the process of aggregating the income and assets of a set of Portfolios to report them as one group.

BACKGROUND

Investment firms including companies, insurance businesses, investment professionals, and or other individuals make investments by purchasing or selling particular securities. As used herein, a security is an investment instrument issued in the market place. Also as used herein, a purchase lot is an investment in a security or securities. A portfolio may include investments in a security or various securities, and the composition of the portfolio investments may change over time as securities are purchased and sold. Accounting systems are utilized to track the securities within a portfolio.

A financial entity, as for example an insurance or investment company may have to account for investments under multiple sets of accounting principles, depending on the purpose of the financial reporting. Each set of accounting principles are defined by a mandated collection of specific regulatory business rules. These rules often differ depending on the regulatory objective. A financial entity may have to account for investments under Generally Accepted Accounting Principles (GAAP), which is the standard for corporate reporting purposes, and used for financial statements and reports to shareholders and the Securities and Exchange Commission (SEC). Generally, these principles reflect the desire to present a meaningful but conservative financial picture to shareholders. A financial entity may have to account for investments under Statutory Accounting Principles (SAP), also known as Acquisition Base or Investment Accounting. SAP are mandated by the National Association of Insurance Commissioners (NAIC), the insurance industries regulating body, which are the standards that must be followed by insurance companies. Generally, the purpose is to ensure enough reserves are kept on the books to meet possible claim payments. A financial entity may have to account for investments under Tax, for Federal Tax Regulations, which are the IRS rules and guidelines for declaring income. Generally, the purpose is to book earnings as soon as is feasible and limit deductions, thereby maximizing taxable income.

Financial entities (e.g., investment firms, insurance companies, etc.) typically have to account and report for investments under multiple accounting rules. As a result, financial entities may be required to maintain separate book-of-records for portfolio investments, and for the investments within a portfolio, for each accounting rule applied to a portfolio. The accounting systems may typically not share data or provide a common access point or user interface. For some securities, the systems do not provide for an accurate accounting with immediate calculated updates for investments when particular events occur during the life of the investment or multiple accounting methods. If in the life of an investment, a financial event needs to be applied early in the life of the investment, then all calculation and reporting after the event needs to be deleted and the calculations renewed from that added event going forward. Financial entities may also utilize separate systems to calculate, balance, document, and report information pertinent to a portfolio or the investments within. Due to these conventional restraints, many man-hours are required to process an investment as events in the life of the investment take place often requiring redundant calculations of cash flow, yield, and amortization of the security for different accounting methodologies over various systems. This may result in inaccurate or inconsistent investment ledgers and reporting.

Financial entities are also connected across public networks via, for example the Internet or wirelessly, to trading systems, data feeds, inventory locations (e.g. banks), regulatory systems, and the like. A financial entity may connect and obtain investment information from a data system over a network during a financial transaction and then input the information into a separate localized accounting system. Manual creation of the investment, as obtained, for example, from private placement documents over a data feed, is typically constructed by a user for the accounting system. After the accounting for the investment is conducted then the information pertaining to the investment for reporting, such as recording financial values to the investment ledger is made available from an accounting system to some other system before the information can be reported to a client or regulatory body. Inventory and cash maintenance may be conducted by the owner or custodian of the book-of-records outside other accounting systems utilized.

What is needed is an integrated and flexible system to manage investments, including portfolio investments and the securities within a portfolio, over multiple investment groups and accounting methodologies, including for example GAAP, SAP, Tax, and Trade. A need also exists for the system to manage an investment from the time the investment is entered (e.g. purchased or exchanged) into the system to the time the investment is reported out from the system. A need further exists such that any event occurring during the life of an investment is accounted for immediately and across the multiple accounting methodologies for a user to review and for reporting purposes. A need further exists, such that certain users may be able to update, remove, or replace events during the life of an investment and for a system to react in substantial real time for an event by calculating cash flow, yield, and amortization for an accurate reporting as of the date the event was manipulated by the user. What is also needed is inventory reconciliation and management within the same system that is updated as events occur for each investment.

SUMMARY

Embodiments of the present invention address and overcome one or more of the above shortcomings and drawbacks, by providing systems, and methods for managing securities for various accounting methodologies. This technology is particularly well-suited for, but by no means limited to, securities transacted under GAAP, SAP, Tax, and Trade.

Embodiments of the present invention are directed to an investment, trading and accounting management system that includes an application server for processing an investment and one or more events pertaining to the investment. The application server includes a security profile component to receive the investment and information pertaining to the investment from one or more users or one or more feed sites. The security profile component organizes the information pertaining to the investment into one or more security attributes and assigns the investment and the one or more security attributes into one or more predefined security templates to generate a security profile for the investment. The application server also includes an event engine connected with the security profile component to receive the one or more events pertaining to the investment from the one or more users or the one or more feed sites and to receive the security profile from the security profile component. The one or more events are linked to the security profile pertaining to the investment by the event engine. The event engine includes an event handler component to add at least one of the one or more events to an investment timeline of events in the life of the investment at a date on the investment timeline in which the at least one event occurred. The event engine also includes a calculation component connected with the event handler component to receive the investment timeline from the event handler component and calculate one or more calculated outputs comprising at least one of a cash flow, an amortization, and a yield for the security profile as of a specified date on the investment timeline after the addition of the at least one event to the investment timeline based on the at least one event. The calculation component selects one or more accounting methods to calculate based on the one or more security attributes or from a request from the one or more users. The event engine further includes a rules handler component connected to the calculation component to receive the one or more calculated outputs from the calculation component and to apply one or more rules to the one or more calculated outputs of the calculation component to generate one or more rule-applied calculated values. The one or more rules are based on the one or more accounting methods selected by the calculation component. The application server further includes a reporting component connected to the event engine to receive the one or more rule-applied calculated values and to report the one or more rule-applied calculated values for the security profile to the one or more users. The system also includes a database server connected with the application server to transmit to the application server, receive from the application server, and store at least one of: the investment; the information pertaining to the investment, the security profile, the one or more investment timelines, the one or more rules for the one or more accounting methods, the one or more events, the one or more calculated outputs, and the one or more rule-applied calculated values.

According to an embodiment of the invention, the one or more accounting methods include at least one of: GAAP accounting, SAP accounting, and Tax accounting. In one embodiment, the one or more accounting methods comprise two or more of: GAAP accounting, SAP accounting, and Tax accounting.

According to another embodiment of the invention, the system further includes investment groups for managing investments. The investment groups include one or more users from at least one of: a GAAP department, a SAP department, a Tax department, and a Trade department. In one embodiment, the investment groups include one or more users from two or more of: a GAAP department, a SAP department, a Tax department, and a Trade department.

In one embodiment, the application server further includes an accounting maintenance component connected with the security profile component to receive the security profile, the event engine to receive the one or more events and the one or more rule-applied calculated values, and the reporting component to transmit an inventory and a difference between the inventory and the rule-applied calculated values. The accounting maintenance component receives the inventory from the one or more users or the one or more feed sites and compares the inventory with the one or more rule-applied calculated values to determine the difference, determine the availability of the inventory, and to reconcile the difference.

According to an embodiment, the event engine further includes a what-if component connected to the rules handler component and the calculation component. The what-if component receives one or more hypothetical events from the one or more users to add to, change or remove from the investment timeline of events in the life of the investment for calculation at the calculation component and application of one or more rules at the rules handler component to generate a hypothetical rule-applied calculated value and to transmit the hypothetical rule-applied calculated value to the one or more users.

In another embodiment, the application server further includes a ledger component connected to the event engine and the reporting component to update a ledger pertaining to the security profile with the one or more rule-applied calculated values transmitted from the event engine and to transmit the ledger to the reporting component.

According to one embodiment, the specified date on the investment timeline is selected from a user chosen date, an occurrence date or a pre-closing date. The occurrence date is a date the event occurred. The pre-closing date is a date prior to a reporting period closing date.

In an embodiment of the present invention, the system further includes a user database server connected with the application server and a user interface. The user database server stores user account information for the one or more users comprising at least one of a user ID and a password. The application server compares the user account information on the user database server with an entered user ID and an entered password from the one or more users at the user interface to allow or deny access to the one or more users to the application server.

According to an aspect of an embodiment, the user account information includes one or more business groups of which the one or more users belongs. The user account information also includes one or more event access rights of which the one or more users belong. The one or more event access rights define whether the one or more users can enter or modify the one or more events. The user account information further includes one or more accounting method access rights of which the user belongs. The one or more accounting method access rights define whether the one or more users can access the application server for the one or more accounting methods.

In one embodiment, the one or more feed sites include at least one of a Custodial Bank, a security data provider, Bloomberg, BNY Mellon, National Association of Insurance Commissioners (NAIC), EJV, IDSI, and BROKER.

Embodiments of the present invention are directed to a method for managing investments, trading and accounting for investments that includes processing an investment and one or more events pertaining to the investment at an application server. The processing includes receiving the investment and information pertaining to the investment from one or more users or one or more feed sites at a security profile component in the application server. The one or more users or the one or more feed sites communicate with the application server. The processing also includes organizing the information pertaining to the investment into one or more security attributes at the security profile component, selecting a predefined security template from various security templates stored in a database server based on the investment and the one or more security attributes at the security profile component and transmitting the selected predefined security template from the database server to the security profile component. The processing also includes assigning the investment and the one or more security attributes to the selected predefined security template at the security profile component, generating a security profile after assigning the investment and the one or more security attributes to the selected predefined security template in the security profile component, transmitting the security profile from the security profile component to an event engine and receiving the one or more events from the one or more users or the one or more feed sites at the event engine. The processing also includes linking the security profile with the one or more events pertaining to the investment at the event engine, selecting an investment timeline of events in the life of the investment from one or more security timelines pertaining to the security profile from the database server by the event engine and transmitting the selected investment timeline from the database server to the event engine. The processing also includes adding at least one of the one or more events to the selected investment timeline at a date the at least one event occurred at an event handler component in the event engine, transmitting the selected investment timeline for the security profile with the added at least one event to a calculation component in the event engine from the event handler component and selecting one or more accounting methods in the calculation component for calculating one or more calculated outputs for the selected investment timeline based on the at least one event. The one or more accounting methods are selected based on the security attributes or by a request from the one or more users. The processing also includes calculating the one or more calculated outputs comprising at least one of a cash flow, a yield, and an amortization for the one or more selected accounting methods for the security profile as of a specified date on the investment timeline based on the at least one event, transmitting the one or more calculated outputs from the calculation component to a rules handler component in the event engine and applying one or more rules to the one or more calculated outputs at a rules handler component based on the one or more selected accounting methods to generate one or more rule-applied calculated values. The processing further includes transmitting the one or more rule-applied calculated values from the event engine to a reporting component and reporting the one or more rule-applied calculated values for the security profile at the reporting component to the one or more users. The method also includes storing at the database sever in connection with the application server at least one of: the investment; the information pertaining to the investment, the security profile, the one or more investment timelines, the one or more rules for the one or more accounting methods, the one or more events, the one or more calculated outputs, and the one or more rule-applied calculated values.

In an embodiment of the present invention, the one or more accounting methods comprise at least one of: GAAP accounting, SAP accounting, and Tax accounting. In one embodiment, the one or more accounting methods include two or more of GAAP accounting, SAP accounting, and Tax accounting.

According to an embodiment, the method further includes investment groups for managing investments. The investment groups include one or more users from at least one of: a GAAP department, a SAP department, a Tax department, and a Trade department. In another embodiment, the investment groups include one or more users from two or more of a GAAP department, a SAP department, a Tax department, and a Trade department. In one embodiment, the one or more accounting methods include GAAP accounting, SAP accounting, and Trading.

In another embodiment, the method further includes selecting at the calculation component the specified date on the timeline from a user chosen date, an occurrence date or a pre-closing date. The occurrence date is a date on which the event occurred. The pre-closing date is a date prior to a reporting period closing date.

In an aspect of an embodiment, when the pre-closing date is selected as the specified date, adding the at least on event to the selected investment timeline includes determining at the event handler component whether the reporting period closing date has already occurred and if the reporting period closing date has already occurred, then shifting the at least one event on the selected investment timeline to a date after the reporting period closing date at the event handler component before transmitting the security timeline to a calculation component in the event engine.

In another aspect of an embodiment, the method further includes receiving an inventory for the investment at an accounting maintenance component in the application server for the security profile from the one or more users or the one or more feed sites, receiving the one or more rule-applied calculated values for the security profile from the event engine at the accounting maintenance component, comparing the inventory for the investment in the security profile with the one or more rule-applied calculated values to determine differences at the accounting maintenance component, reconciling the differences at the accounting maintenance component and transmitting the inventory or differences to the reporting component.

In one embodiment, the method further includes receiving one or more hypothetical events from the one or more users at a what-if component in the event engine, transmitting the one or more hypothetical events from the what-if component in the event engine to the event handler component, linking the security profile with the one or more hypothetical events pertaining to the security at the event engine and selecting the investment timeline of events in the life of the investment from one or more security timelines pertaining to the security profile from the database server by the event engine. The method further includes transmitting the selected investment timeline from the database server to the event engine, adding at least one of the one more hypothetical events to the selected investment timeline at the date the received event occurred at the event handler, transmitting the selected investment timeline including the at least one hypothetical event to the calculation component in the event engine and selecting the one or more accounting methods in the calculation component for calculating at least one hypothetical calculated output for the selected investment timeline based on the at least one hypothetical event. The one or more accounting methods are selected based on the one or more security attributes or from a request from the one or more users. The method further includes calculating the at least one hypothetical calculated output including at least one of a hypothetical cash flow, a hypothetical yield, and a hypothetical amortization for the one or more selected accounting methods, and for the security profile as of the specified date on the investment timeline based on the at least one hypothetical event. The method further includes transmitting the at least one hypothetical calculated output from the calculation component to the rules handler component in the event engine, applying the one or more rules to the at least one hypothetical calculated output at the rules handler component based on the one or more accounting methods to generate one or more hypothetical rule-applied calculated values, transmitting the one or more hypothetical rule-applied calculated values from the rules handler component to the what-if component and transmitting the one or more hypothetical rule-applied calculated values from the what-if component to the one or more users.

In another embodiment, the method further includes archiving the selected investment timeline into the database server to add to the one or more investment timelines pertaining to the security profile after selecting the investment timeline and before retrieving the investment timeline.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 8 shows a table of exemplary security types listed with reporting classes according to one embodiment of the present invention;

FIG. 10 shows a table of exemplary prospectus processing flags according to one embodiment of the present invention;

FIG. 15 shows an exemplary screenshot for security template initialization of common stock according to one embodiment of the present invention;

FIG. 16A shows an exemplary screenshot for security template initialization of a mortgage back security according to one embodiment of the present invention;

FIG. 16B shows a supplemental exemplary screenshot for security template initialization of a mortgage back security according to one embodiment of the present invention;

FIG. 19 shows an exemplary table of a real event types mapped to several business event definition types based on accounting methods according to one embodiment of the present invention;

FIG. 26B shows a process for event browsing and replay according to one embodiment of the present invention;

FIG. 26C shows a process for event backdating and event reversal according to one embodiment of the present invention;

FIG. 28 shows an exemplary screenshot for entry of cash reconciliation according to one embodiment of the present invention;

FIG. 29 shows an exemplary screenshot of a confirmation screen for a cash reconciliation reversal item according to one embodiment of the present invention;

FIG. 35 shows an exemplary screenshot of user information entry preceding access right processing;

FIG. 36 shows an exemplary trading page of a bond on the ITAMS; and

FIG. 37 shows an exemplary trading page with trade allocation event table for a stock on the ITAMS.

DETAILED DESCRIPTION OF ILLUSTRATIVE EMBODIMENTS

Figure 1:
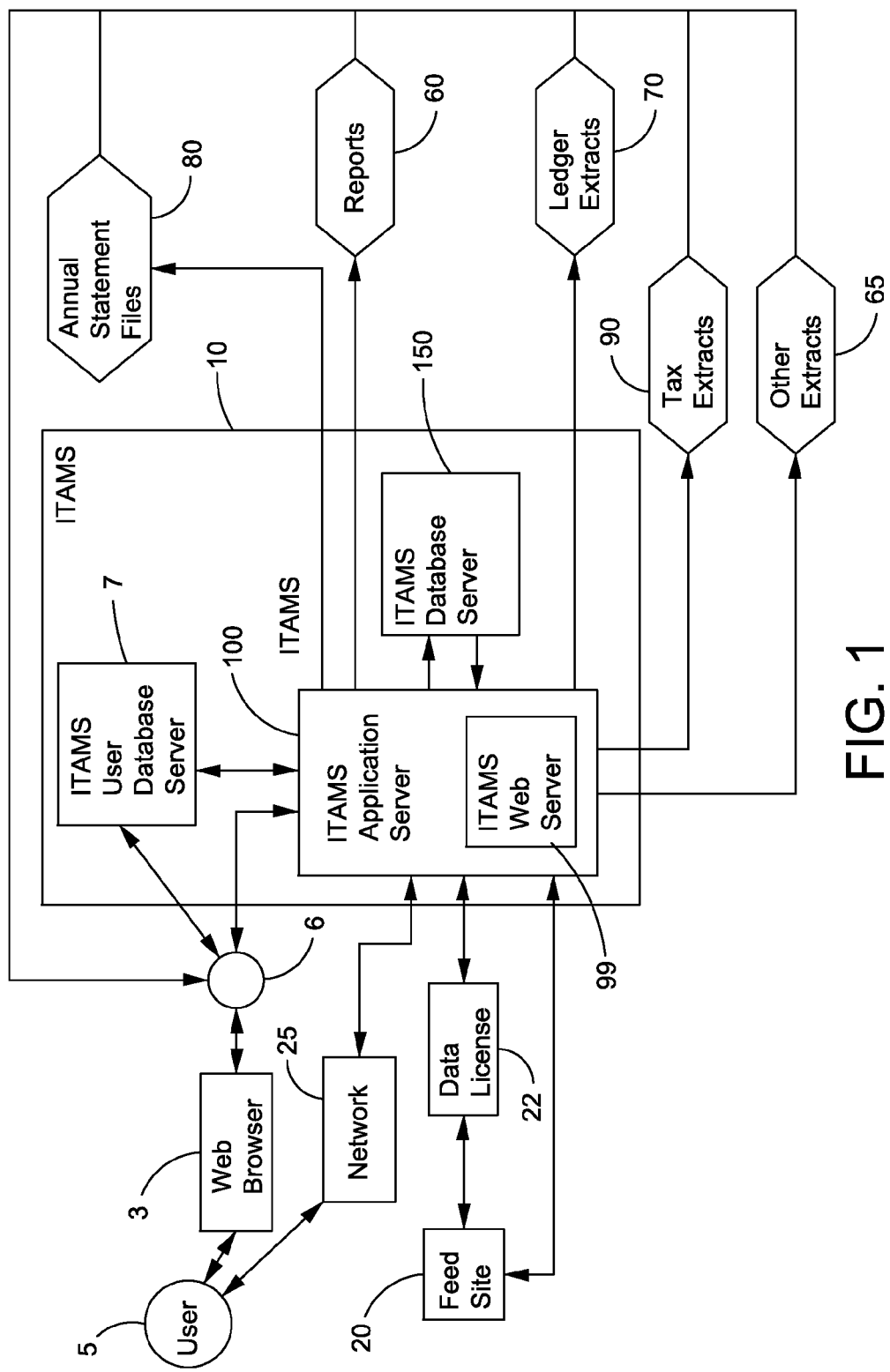
FIG. 1 shows a schematic block diagram illustrating an investment, trading and accounting management system (ITAMS) for managing securities according to one embodiment of the present invention.

The problems in the prior art have motivated the creation of an integrated investment and accounting management system (ITAMS) and methods for processing various types of investments, which may include effective dating, wherein each investment is processed and maintained under one or more accounting rules and/or methodologies, as well as various consolidation levels. The rules used by ITAMS to process a specific type of investment, and therefore its basis and/or carrying value, are determined by the specific accounting guidelines and rules of the basis and/or carrying value being determined.

As used herein, an investment is something (e.g., a security) that money is put into with the expectation of gain, which upon thorough analysis, has a high degree of security for the investment amount, as well as security of return, within an expected period of time. As used herein, a security is generally a fungible, negotiable financial instrument issued in the marketplace representing financial value, that signifies an ownership position in a corporation (a stock), a creditor relationship with a corporation or governmental body (a bond), or rights to ownership such as those represented by trust assets, an option, subscription right, subscription warrant, and the like. As used herein, a purchase lot is a unit of trading of a security. An investment may include a purchase lot of securities held by an investor, or the like, and sold to another. The security may be for debt, as in a banknote, bond, debenture, or mortgage-backed certificate. The security may be for equity, such as common or preferred stock. The security may be a derivative contract, such as a forward, futures, option, or swap. The accounting rules for any specific security type may differ according to the purpose of the financial reporting provided by ITAMS. For example:

| Investment Type/ Event | GAAP | SAP | TAX |
| --- | --- | --- | --- |
| Municipal Bond Tax Exempt Interest | Treat as Income | Treat as Income | Do NOT include Interest as Income |
| Mandatory Redeemable Preferred | Amortize | Amortize | Do NOT Amortize |
| Step-Up Preferred | Treat as Stock | Treat as Stock | Treat as Debt Security |

To achieve accuracy, ITAMS defines an investment accurately and with enough sufficiency, by the characterization of the security attributes within a security profile, so that similar types of investments may be consistently/comparably calculated and accounted for. The security is processed by ITAMS under a particular security profile based on the type of security it comes in as, and ITAMS reports the security based on attributes further defined in the security profile. The calculations are based on events supplied to, or internally generated by ITAMS, throughout the life of the investment.

ITAMS calculates cash flow, yield and amortization while maintaining inventory location and reconciling inventory for every event in the life of the investment. Event timelines are generated for an investment for each accounting methodology. ITAMS also ensures that a transaction will be accounted for "as-of" the date the event occurred. ITAMS also provides effective dating so that an event may appropriately effect proper reporting regardless of actual event date. This way, ITAMS is able to reproduce the basis and/or carrying value of a portfolio, or a report, for any date. The result is that ITAMS is an audit friendly system since an accounting may be processed at any time during the life of the investment based on the addition of event dates. ITAMS can back track, recalculate, and update data for an investment under all the investment groups and account methodologies, including GAAP, SAP, Tax, and/or Trade; and track/understand the differences in financial values between accounting methodologies for investments. Thus, ITAMS can provide calculations and reports for an investment between any of the accounting methodologies that a user may choose to review. The cause of any SAP to GAAP, SAP to Tax, and GAAP to Tax differences are identified and quantified by ITAMS and may be reported to a user.

FIG. 1 shows a schematic block diagram illustrating the integrated investment and accounting management system (ITAMS) 10 for managing investments according to one embodiment of the present invention. ITAMS 10 includes an ITAMS application server 100, ITAMS user database server 7, and ITAMS database server 150, all interconnected with communication lines. Note, although multiple servers/databases are shown and described herein, it is contemplated that one or more servers, computing devices, processors, data stores, databases, tables within a database or data store, and the like may be used to store date and information in order to implement embodiments of the present invention.

In the illustrated embodiment, the ITAMS application server 100 communicates with the ITAMS database server 150 to retrieve from or provide to the ITAMS database server 150 data or information pertaining to processing investments within ITAMS 10. Data may include investments, securities and/or events. The investment includes a representation of the asset. An event is an occurrence taking place at a point in the life of the security that may affect the financial status of the investment. Information may include anything in addition to the investment, security and/or event in relation to the investment, security and/or event. Investment information is any subsequent information pertaining to the representation of the asset. Investment information may include, but is not limited to: the number (lots) bought or sold; the date of sale/purchase; security type; ticker symbol; paydown information; maturity date; or any other information pertaining to the investment. Investment information may also include requirements for application of particular accounting rule(s) to the investment. The event may include the description of the occurrence and when the occurrence took place. Event information may include, but is not limited to: where the event occurred; who affected the event; or whether the event was automatic or manually induced.

The ITAMS application server 100 may include a web server 99 to provide features of the ITAMS 10 to a user 5 in the form of, for example, a web application so that a user 5 may interact with the ITAMS 10 via, for example, a web browser. In some embodiments of the invention, the web application may be entirely written in Java so that the application is entirely designed for the browser. In the illustrated embodiment, the web server 99 manages data passed between the web browser 3 and any user device for accessing the web browser 3. The ITAMS application server 100 processes and manages communication with various external sources.

The ITAMS 10 communicates and exchanges information with a user 5. The user 5 may include: a person, another system, a financial entity that accesses ITAMS 10, and the like. The user 5 may further include: a customer, investor, finance professional, investment accountant, trader, investment firm, companies, insurance businesses, investment professionals, any other individuals or financial entities making investments, or any other person(s) with access to ITAMS 10. In addition, a system administrator (not shown) may also communicate with ITAMS 10 through similar communication networks as a user 5, or in a more secure network. A system administrator may have access to various features that a user 5 does not have access to. The system administrator may designate what features a user 5 may have access to (see FIG. 33).

Communication with the user may occur on or over a network linking the ITAMS 10 with the user 5. The user 5 can interact with ITAMS 10, including the ITAMS application server 100, on an electronic device incorporating a web browser 3. The electronic device may be any of cell phones, PDAs, laptop, desktop, tablet PCs, or any other device capable of connecting to a network with ITAMS 10. Connection through the network may be through wired link, such as a telephone line, cable, or fiber. The network connection may also run through a wireless link, cellular link, or any other link in which digital and/or analogue information is transferred. Between the web browser 3 and linked ITAMS application server 100, a user security device 6 is connected to verify user ID and password information at user sign-in to ITAMS 10. The security device 6 compares the user ID and password to user account information stored on the ITAMS user database server 7 to verify whether user 5 has access to work with ITAMS 10. The ITAMS user database server 7 may communicate to the ITAMS application server 100 whether or not the user 5 has access to ITAMS 10 and/or whether the user 5 is restricted from utilizing particular features or accessing particular investment, portfolios, securities, and/or other data in ITAMS 10. Once user ID and password are verified, the user may begin utilizing the ITAMS 10 to access information pertaining to investments and/or other features of ITAMS 10 as authorized. The system administrator may determine authorization for accessing particular features and data in ITAMS 10 for a given user 5. In some embodiments of the invention, if the user 5 is affiliated with a particular financial group or company, then the user 5 may access the ITAMS 10 directly through network 25 linked with that particular financial group or company.

In other embodiments of the invention, the ITAMS application server 100, ITAMS user database server 7, ITAMS web server 99, and ITAMS database server 150 may be physically connected and/or separated in a variety of combinations. One or more of these servers may be located separately in another location from the other servers. Physically connected two or more servers or separating one, some, or all servers may be implemented to provide increased security and/or accessibility. In other embodiments of the invention, an ITAMS web server 99 or ITAMS user database server 7 may not be required and thus not included in the ITAMS 10. For these embodiments, the user 5 would interact directly with the ITAMS application server 100. For example, the ITAMS application server 100 may be connected to a terminal or located directly in proximity to the terminal, so that a user 5 could only obtain access and utilize the ITAMS 10 through that terminal. In other embodiments of the invention, the ITAMS application server 100 may include processing to handle functions otherwise designated to the ITAMS web server 99 or ITAMS user database server 7. In other embodiments of the invention, processing and other server functionality may be distributed among other or additional servers and/or across multiple or additional processors. Thus, for example, certain operations conducted by the ITAMS application server 100 may be transferred to a processor in for example the ITAMS user database server 7 to offload processing work of the ITAMS application server 100 and thus increase processing efficiency.

The ITAMS application server 100 may also communicate with one or more feed sites 20. The feed site 20 may be defined as a supplier to provide various types of data or information to ITAMS 10. For example, the feed site 20 may provide ITAMS 10 with information pertaining to various types of investments (e.g. trades, exchanges, capital changes, etc.), securities (e.g., common stock, debt, mortgage back securities, etc.), investment research, pricing, cash, inventory, regulatory and accounting rules, or any other financial information. ITAMS 10 may receive, retrieve, and/or access data or information directly from the feed site 20 or after a request for data or information from the feed site 20 is sent to the feed site 20 from ITAMS 10. A user 5 may request the data or information directly from the feed site 20 in a separate connection to the feed site 20, through a connection to the feed site 20 through ITAMS 10, or by a request to the ITAMS 10 so that ITAMS 10 may receive the data or information from the feed site 20. The feed site 20 may automatically provide ITAMS 10 with data or information in real-time, from historical transactions, or with future predictions and/or modeling. ITAMS 10 may also provide the feed site 20 with data or information. In some embodiments, ITAMS does not connect directly to a feed site 20, but rather a file from a feed site 20 may be brought down using another application. The file may be pulled from a directory and uploaded into ITAMS 10. Bloomberg DataLicense 22, for example, may be integrated into the connection between ITAMS 10 and the feed site 20 so that data or information transmitted between ITAMS 10 and the feed site 20 is accurate and authenticated. For example, feed data, such as cash flows and sinking fund schedules, may be provided from data license 22.

Examples of feed sites 20 may include, but are not limited to, Security Data Providers and Custodial Banks (including for example: Bloomberg, the BNY Mellon, National Association of Insurance Commissioners (NAIC), EJV, IDSI, Brokers, etc.) or any other financial vendor, regulatory organization, and/or information provider. Feed sites 20 also encompass any one or more asset houses. An asset house may be defined as a storage location for cash or inventory and may provide ITAMS 10 an accounting of the cash or inventory stored at the asset house. These types of feed sites 20 may provide ITAMS 10 with information pertaining to asset amounts, including amount of inventory or cash available/remaining, location of the assets, and provide any events or other information pertaining to the assets. A user 5 may request information pertaining to the assets from an asset house through a request to the ITAMS 10. ITAMS 10 may access data from the asset house either directly or after a request for data to the asset house. Alternatively, the feed site 20 may automatically provide ITAMS 10 with asset information. An asset house type of feed site 20 may include, but is not limited to, a custodial bank (e.g., BNY Mellon).

In addition or alternative to data or information supplied by a feed site 20, the user 5 may input data or information. The user 5 can edit or modify data or information supplied by the feed site 20; and/or add new data or information not supplied by a feed site 20. For example, the user 5 may alter investment information (e.g., security attributes) or events affecting an investment with information not supplied by the feed site 20. The user 5 may input the data or information through the web browser 3 to ITAMS 10. The ITAMS application server 100 may review data or information inputted and/or entered into ITAMS 10 to validate that the data or information is complete, accurate, or from a qualified submitter with appropriate authorization to enter or update data or information in ITAMS 10.

The ITAMS application server 100 processes instructions, requests, financial information, and other submitted data or information from the user 5 and/or feed sites 20. As further discussed below, the ITAMS application server 100 performs various types of calculations, manages the life of an investment including changes to the investment typically based on events occurring during the life of the investment, manages investments held in portfolios, manages the various forms of accounting under various accounting rules for each investment, etc. The ITAMS application server 100 integrates investment information inputted to ITAMS 10, investment calculations, investment/security events, inventory accounting, and application of accounting rules to an investment to provide for accurate and complete financial accounting for reporting of the investment. The ITAMS application server 100 performs these tasks while retrieving and relaying data or information to and from the ITAMS data server 150. In some embodiments of the invention, data or information may also be inputted by user 5 directly into the ITAMS database server 150, and ITAMS knows how to process the data or information based upon effective dating, for example.

The ITAMS application server 100 may output data or information in various forms, including but not limited to the form of; annual statement files 80; reports 60; ledger extracts 70; tax extracts 90; or other extracts 65; and the like. The ITAMS application server 100 may extract financial information in any one of these extract forms automatically or through user 5 request. Reports 60 may be further broken down into various report types, for example, as further described in reference to FIG. 31. The ITAMS application server 100 may also provide the user 5 with data or information, as for example in reports 60, in electronic format on a display screen through the web browser 3, in electronic mail, or in any other electronic means to supply the user 3 with data or information. The ITAMS application server 100 may also automatically provide the user 5 with data or information on a schedule or after certain processing functions within the ITAMS application server 100 have occurred. In some embodiments, ITAMS 10 interacts with a third party scheduling tool (e.g., UC4) to generate files and run scheduled events, transfer files to and from vendors, etc.

Figure 2:
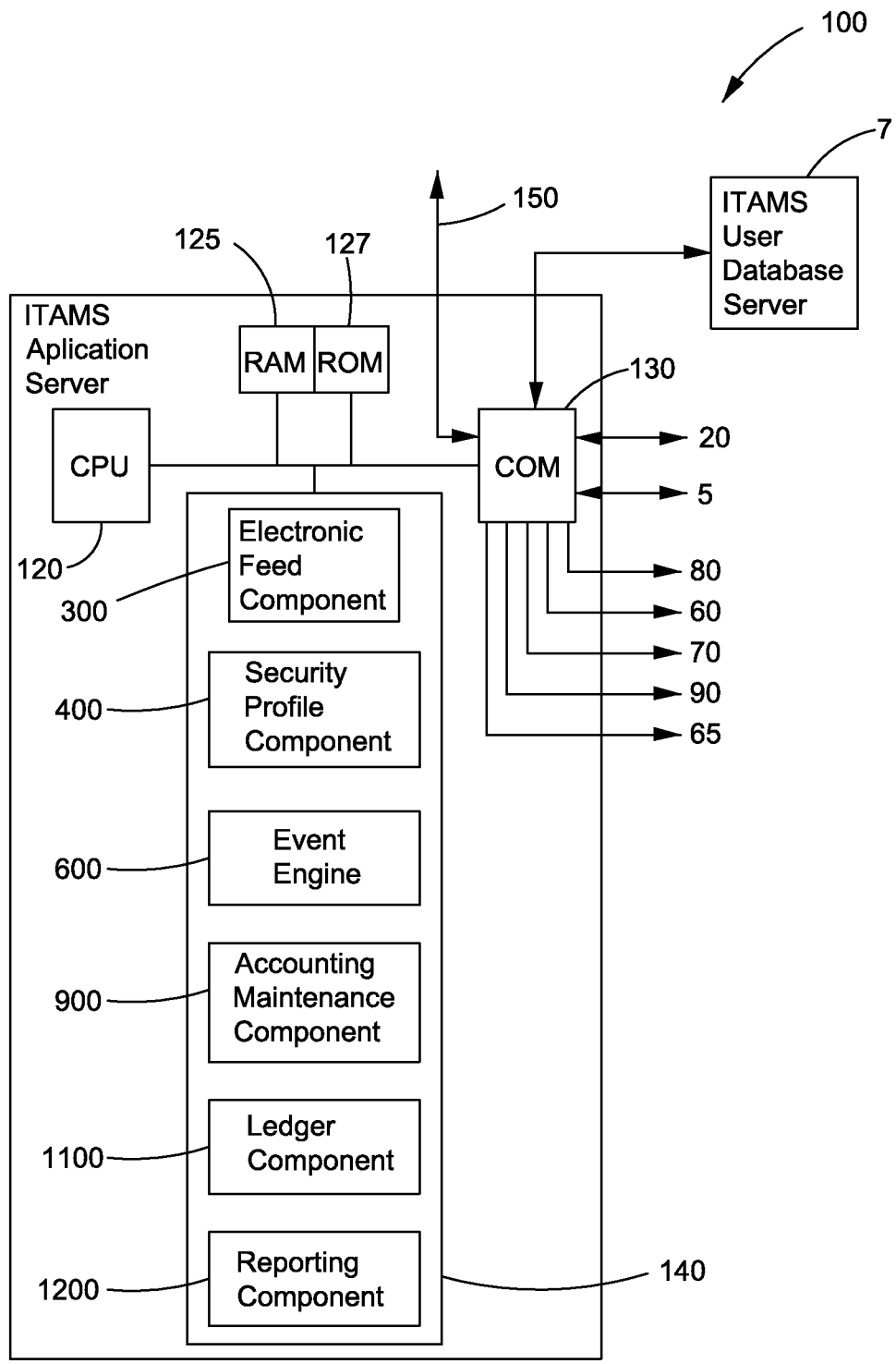
FIG. 2 shows a schematic block diagram of an ITAMS application server of FIG. 1 according to one embodiment of the present invention.

FIG. 2 shows a schematic block diagram of the ITAMS application server 100 of FIG. 1 according to one embodiment of the present invention. As shown, the ITAMS application server 100 may include a software engine storage component 140, central processing unit (CPU) 120, a communications port 130, random-access memory (RAM) 125, and read-only memory (ROM) 127. To facilitate effective dating, the ITAMS application server 100 may also include a clock (not shown) to manage electronic transmission of data between components within the ITAMS application server 100 along communication connections, such as an interconnected databus. Alternatively, ITAMS 10 may use system date/time in the effective dating component.

The software engine storage component 140 may include logic utilized by the CPU 120 for the processing of features provided in ITAMS 10. The logic may include an electronic feed component 300, security profile component 400, event engine 600, an accounting maintenance component 900, ledger component 1100, and reporting component 1200. These engines/components are stored in the software engine storage component 140 as computer logic programs and instructions with their internal and external communication connections further described with reference to FIG. 5.

The instructions and computer logic programs stored in the software engine storage component 140 are processed along with other computing tasks by the CPU 120. The CPU may be commercially available having single or multiple numbered processors. The CPU 120 may utilize additional instructions or data stored in ROM 127, which may include, for example, information provided from the ITAMS web server 99, displaying to and receiving information from a user 5 across the web browser 3. RAM 125 may be utilized by the CPU 120 to store and acquire temporary data, as for example security information just recently supplied from the ITAMS database server 150.

The communications port 130 is a connection hub for linking the ITAMS application server 100 with other sources across a network. The communication port 130 connects the ITAMS application server 100 with the ITAMS user database server 7 and ITAMS database server 150 within ITAMS 10. As shown, the communication port 130 also connects to send and receive data from one or more feed sites 20 and users 5. As shown, the communications port 130 is also connected to send output, as for example from the ledger component 1100 and reporting component 1200, in as, for example, annual statement files 80, reports 60, ledger extracts 70, tax extracts 90, and other extracts 65.

Figure 3:
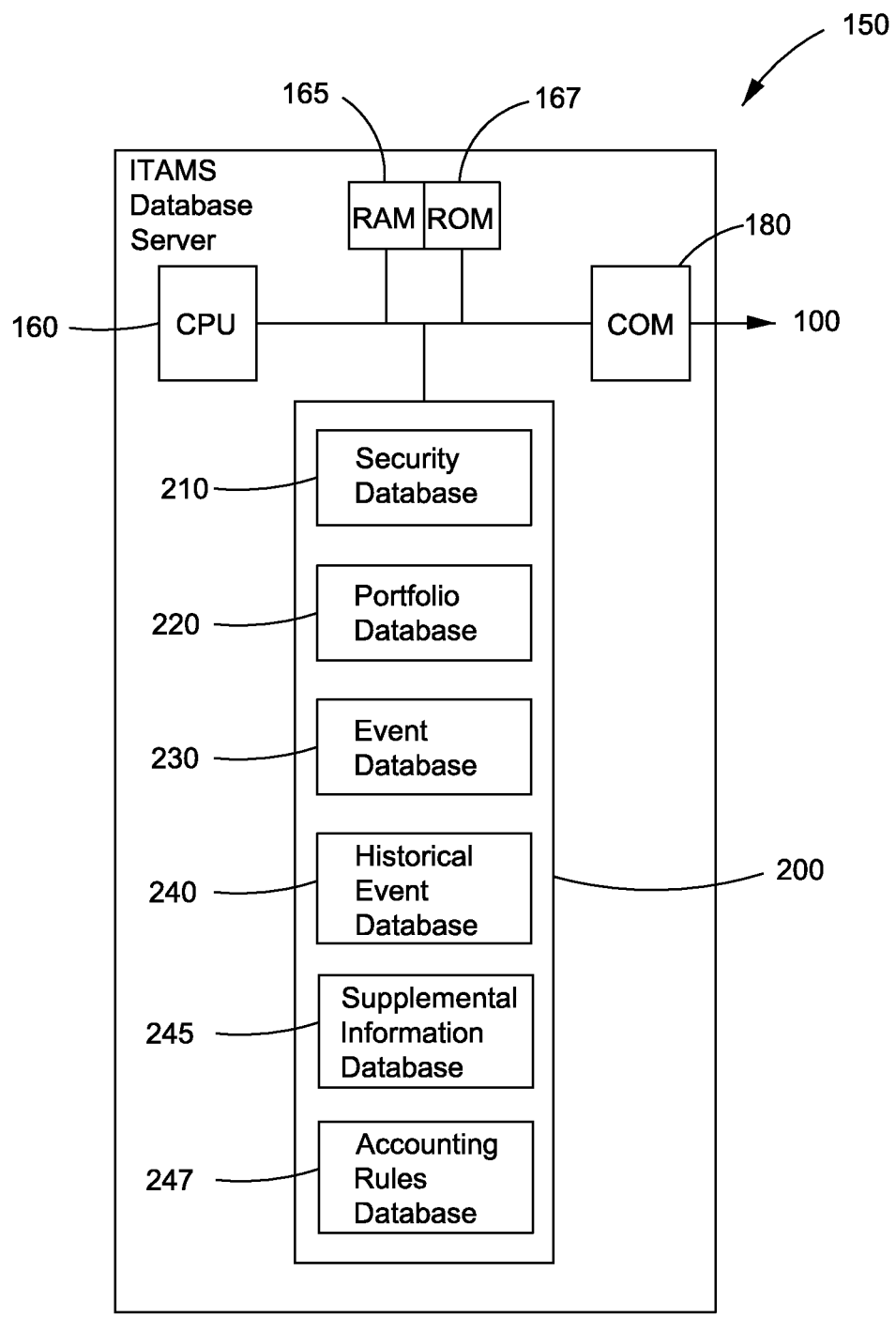
FIG. 3 shows a schematic block diagram of an ITAMS database server of FIG. 1 according to one embodiment of the present invention.

FIG. 3 shows a schematic block diagram of the ITAMS database server 150 of FIG. 1 according to one embodiment of the present invention. The ITAMS database server 150 may include the same standard computing components as the ITAMS application server 100, such as a CPU 160, RAM 165, ROM 167, and a communication port 180. As shown, the communication port 180 is connected with the ITAMS application server 100. The computing components are interconnected with each other by a communication connection, such as a databus.

The ITAMS database server 150 also may include a data storage device 200 connected to the other computing components. As shown, the data storage device 200 may include a security database 210, a portfolio database 220, an event database 230, a historical database 240, an accounting rules database 247, and a supplemental information database 245. Each of the databases may be independent databases, combined databases, or tables within one or more databases.

Investments may include stocks, bonds, options, mortgages, and other holdings. The security database 210 stores information pertaining to securities in the form of attributes, including, for example, security identification number (SIN), a security CUSIP (standard nine digit alphanumeric code for identifying a security in financial organizations), an ITAMS 10 generated dummy SIN, the lots of the security, and any other security attributes. Attributes of the security are collected and processed by ITAMS 10 to pre-define a security in ITAMS 10 (see FIG. 7). An exemplary list of security attributes are further discussed in reference to FIG. 12 below. The security database 210 may also store the ITAMS 10 generated security profile and security profile templates, as further described in reference to FIG. 7.

An investment portfolio may include various lot(s) of securities, and the composition of the portfolio may change over time as lots/securities are purchased, sold, and exchanged. A portfolio may represent a legal entity that holds or may hold investments. In addition, a portfolio may be used in an intercompany trade to pass the security to another portfolio. The legal entity may represent a single corporation and the portfolio may include all investments held by the corporation. ITAMS 10 recognizes a portfolio which may be an entity under which investments, such as securities investments, may be held. The portfolio database 220 stores portfolios and information pertaining to the portfolio. Information pertaining to the portfolio may include information to link particular investments to a portfolio.

An event is an occurrence taking place at a point in the life of the investment (on the lifespan of the investment) that may affect the financial status of the investment (e.g., capital changes, cash flow updates, cash interest payments, trades, paydowns, etc.). The event database 230 stores the current lifespan timeline of an investment, those events in the current lifespan of an investment, and information pertaining to events occurring over the course of the current investment lifespan. The historic event database 240 stores previous investment lifespan timelines affected by prior events, those events affecting the previous investment lifespan timelines, and information pertaining to previous investment lifespan timelines and previous events shaping the lifespan of the investment. The event database 230 and historic event database 240 are further described in FIGS. 25 and 26A-C. The accounting rules database 247 stores the most current accounting rules, as for example, for rules under GAAP, SAP, and Tax. The most current accounting rules are utilized by ITAMS 10, as provided from the accounting rules database 247, to provide for complete and accurate reporting. The supplemental information database 245 may store other forms of information utilized by the ITAMS 10 or a user 5 of ITAMS 10. Other forms of information may include the editing history of the investment/security profile (see FIG. 5) or the processed timeline for the hypothetical event (see FIG. 17).

Figure 4:
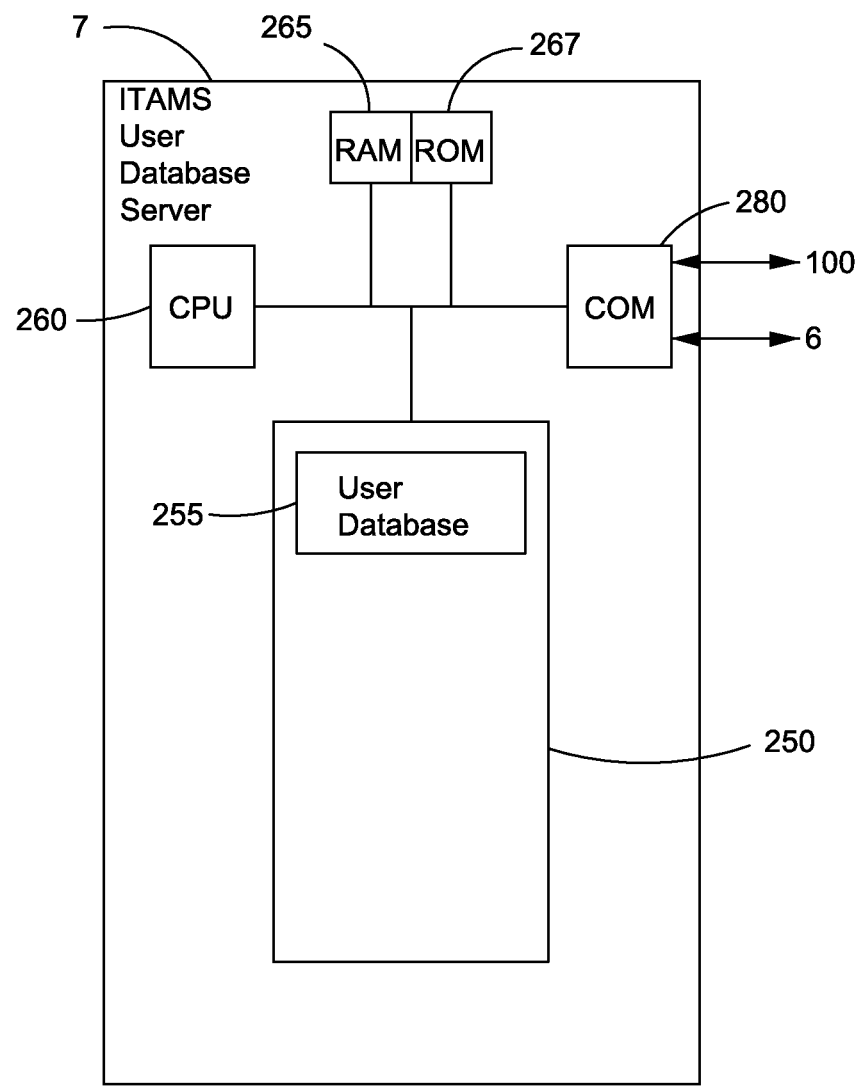
FIG. 4 shows a schematic block diagram of an ITAMS user database server of FIG. 1 according to one embodiment of the present invention.

FIG. 4 shows a schematic block diagram of the ITAMS user database server 7 of FIG. 1 according to one embodiment of the present invention. The ITAMS user database server 7 may include the same standard computing components as the ITAMS application server 100 and ITAMS database server 150, such as a CPU 260, RAM 265, ROM 267, and a communication port 280. The communication port 280 is connected with the ITAMS application server 100 and the user security device 6. The computing components are interconnected with each other by a communication connection, such as a databus. User database may include a Lightweight Directory Access Protocol (LDAP) user rights database, and may include a table in ITAMS 10.

As shown, the ITAMS user database server 7 may include a user data storage device 250 connected to the other computing components. As shown, the user data storage device may include a user database 255. The user database 255 stores data pertaining to users 5 accessing ITAMS 10. The ITAMS user database server 7 communicates with the user security device 6 and then determines or requests the ITAMS application server 100 to determine whether the user 5 requesting access to ITAMS 10, through for example the web browser 3 matches with the user ID and password information stored in the user database 255. In some embodiments, ITAMS may include code to connect to, for example, SITEMINDER to match to user access tables in ITAMS 10. Where a user database is used, it may authenticate the user using SITEMINDER in order to, for example, authorize user rights to access the application. Authorization for specific roles/functions within ITAMS 10 may be handled within ITAMS 10 database tables.

In other embodiments of the invention, the user database 255 may reside in the data storage device 200 of the ITAMS database server 150 eliminating the ITAMS user database server 7. Thus, the ITAMS application server 100 would communicate directly with the user 5 through the user security device 6 to determine whether a user ID and password match exists between the user ID and password information entered by the user 5 and the user ID and password information stored in the user database 255 within the ITAMS database server 150. In some embodiments, both authentication and authorization may be handled by ITAMS 10 database tables.

In some embodiments of the invention, the ITAMS database server 150 will compare the user ID and password information to determine a match and then open the communication between the user 5 and ITAMS application server 100 to utilize the features of ITAMS 10, when the match is confirmed. In other embodiments of the invention, the ITAMS application server 100 will process the user ID and password match by requesting user information from the user database 255 in the ITAMS user database server 7.

Figure 5:
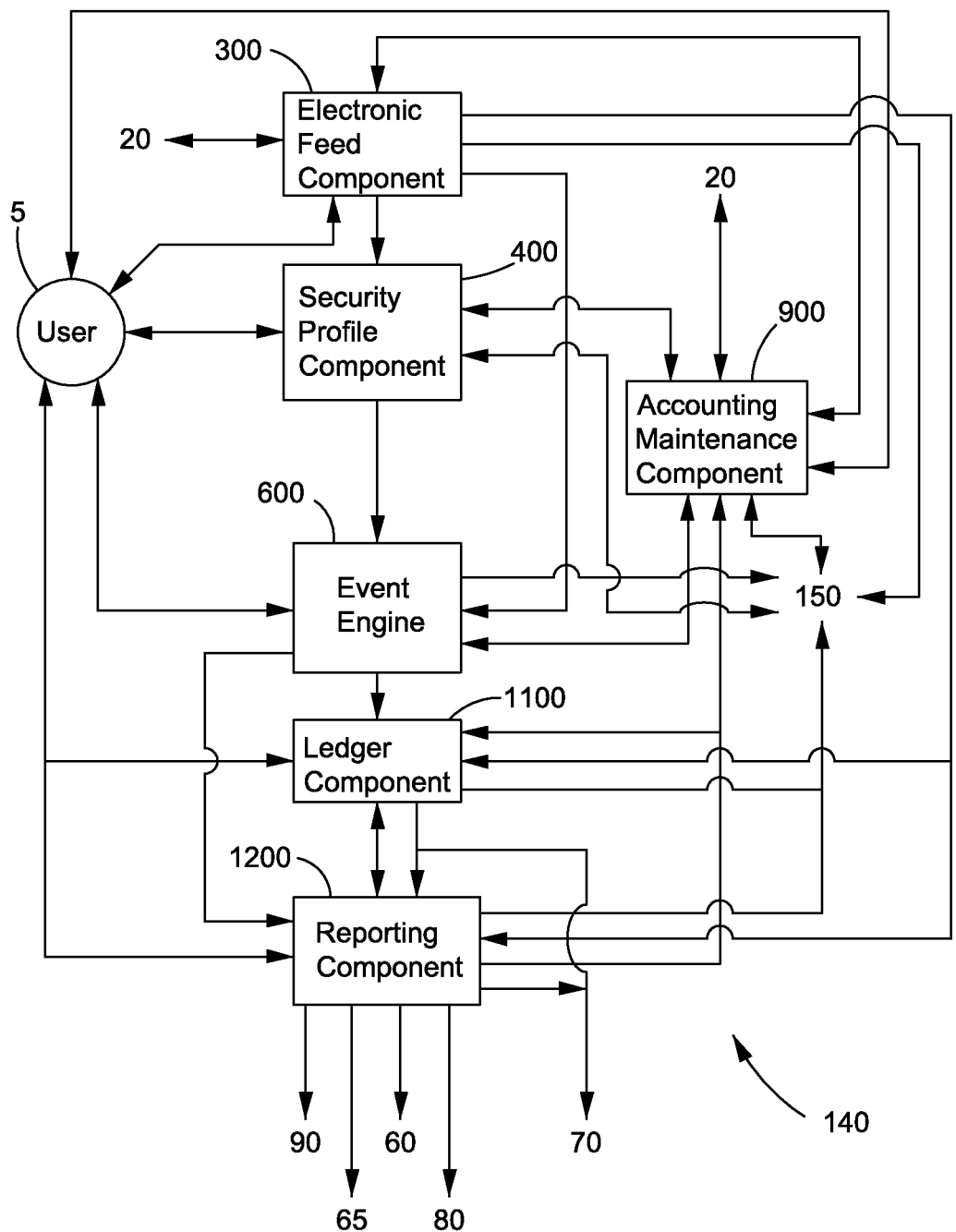
FIG. 5 shows a schematic block diagram of interconnection in an ITAMS software component storage device according to one embodiment of the present invention.

FIG. 5 shows a schematic block diagram of interconnection in the ITAMS software engine storage component 140 according to one embodiment of the present invention. Data or information is passed systematically between one or more engines/components, for example six engines/components as shown in FIG. 5. Engines/components shown in FIG. 5 include an electronic feed component 300, security profile component 400, event engine 600, accounting maintenance component 900, ledger component 1100, and reporting component 1200. Communication to and from these engines/components from sources outside the ITAMS application server 100 goes through the communication port 130 of the ITAMS application server 100 (see FIG. 2).

The electronic feed component 300 receives data or information from external sources, outside of ITAMS 10, including from one or more feed sites 20 and/or users 5. The electronic feed component 300 then transmits data or information from the external sources to the appropriate engine/component in the software engine storage component 140 based on the type of data or information entering the electronic feed component 300. For example, the electronic feed component 300 may relay investment and security information to the security profile component 400. The feed component 300 may also relay information pertaining to events, as pertaining to an investment, to the event engine 600. The feed component 300 may also relay asset information, such as inventory or cash information, to the accounting maintenance component 900. In other embodiments of the invention, the electronic feed component 300 may even relay certain information to the ledger component 1100 or reporting component 1200 to supplement a ledger or a report.

Security information relayed by the electronic feed component 300 is received by the security profile component 400. The security is a representation of the asset. Security information is subsequent information pertaining to the representation of the asset. Security information may include, but is not limited to: security type; ticker symbol; paydown information; maturity date; or any other information pertaining to the security. The security profile component 400 may also receive security related information from a user 5. User 5 may also directly communicate with the security profile component 400, bypassing the electronic feed component 300. Security information processed by the security profile component 400, as further discussed in FIG. 7, may be transmitted along with security profiles to the ITAMS database server 150 for storage in, for example, the security database 210 (see FIG. 3). Security profiles and other security information may also be transmitted to event engine 600 or the accounting maintenance component 900 from security profile component 400.

The event engine 600 receives the security profile and other security information from the security profile component 400 or the ITAMS database server 150. The event engine 600 may receive information pertaining to an event or to a particular security from the electronic feed component 300. Event information may include, but is not limited to: lots purchased and sold; the date of the purchase/sale; or any other information pertaining to the event. Events and information pertaining to events may be provided directly to the event engine 600 by the user 5. The event engine 600 may also notify the user 5 of particular events. The event engine 600 may also communicate with the accounting maintenance component 900, by, for example, sending particular event information to the accounting maintenance component 900 or receiving asset information impacting a security and thus generating an event. The event engine 600 may transmit investment and security calculations based on events, under various accounting methodologies, as further described in FIG. 17, to either or both the ledger component 1100 and reporting component 1200. The event engine 600 may also transmit the calculated financial information directly to the user 5 to, for example, review the information through the web browser 3 on a device for accessing the web browser 3. Events, calculations, and security timelines processed by the event engine 600, as further discussed in FIG. 17, may be transmitted to the ITAMS database server 150 for storage in, for example, the event database 230 (see FIG. 3). The event engine 600 may also retrieve previous event information from, for example, the historical event database 240 (see FIG. 3) in the ITAMS database server 150 for event processing. The event engine 600 may also retrieve accounting rules from, for example, the accounting rules database 247 (see FIG. 3) in the ITAMS database server 150 for event processing. Although multiple databases are described herein, one skilled in the art will understand that one or more databases or data stores may be used to implement embodiments of the invention.

The accounting maintenance component 900 receives security profiles or information pertaining to securities from the security profile component 400. Asset information, for example, pertaining to inventory or cash, or other financial information is received by the accounting maintenance component 900 from the electronic feed component 300. Particular event information or calculated financial information for particular securities, and related events, based on particular rules for accounting methodologies may be sent from electronic feed component 300 to the accounting maintenance component 900 and may be further relayed to one or more feed sites 20 or users 5. Any information provided by the user 5 in regards to investments, asset information, or any other financial information may be received directly at the accounting maintenance component 900. The accounting maintenance component 900 may then relay asset information or processed asset information and receive various asset information for comparison and reconciliation for cash or inventory reconciliation, as further described with reference to FIG. 27, to the user 5, the electronic feed component 300, the event engine 600, security profile component 400, the ledger component 1100, and/or the reporting component 1200. The accounting maintenance component 900 may also communicate with the ITAMS database server 150.

The ledger component 1100 and reporting component 1200 receive calculated financial information for particular securities based on events processed under particular rules for accounting methodologies. Both the ledger component 1100 and reporting component 1200 may receive and report asset information from and to the accounting maintenance component 900. Both the ledger component 1100 and reporting component 1200 may receive requests from the user 5 for the ledger component 1100 and/or reporting component 1200 to provide any one of reports 60, ledger extracts 70, annual statement files 80, tax extracts 90, or other extracts 65. The ledger component 1100 and reporting component 1200 may communicate with each other to share information pertaining to ledgers and other various reports for investments, portfolios and their securities.

In some embodiments of the invention, one or more of the engines/components in the software engine storage component 140 may communicate data or information to and from the ITAMS database server 150. In some embodiments, for example, data may be input via user interface or a feed file. Data may be sent to the event engine 600 where it is processed and various calculations are performed. The resulting values may be stored in one or more tables in the database, such as ledger and lot values. These stored results may be viewed by users through browser screens. The reporting component may extract this information from the tables within the database, performs various calculations to allocate the data to specific reports, and then displays those results on reports.

Figure 6:
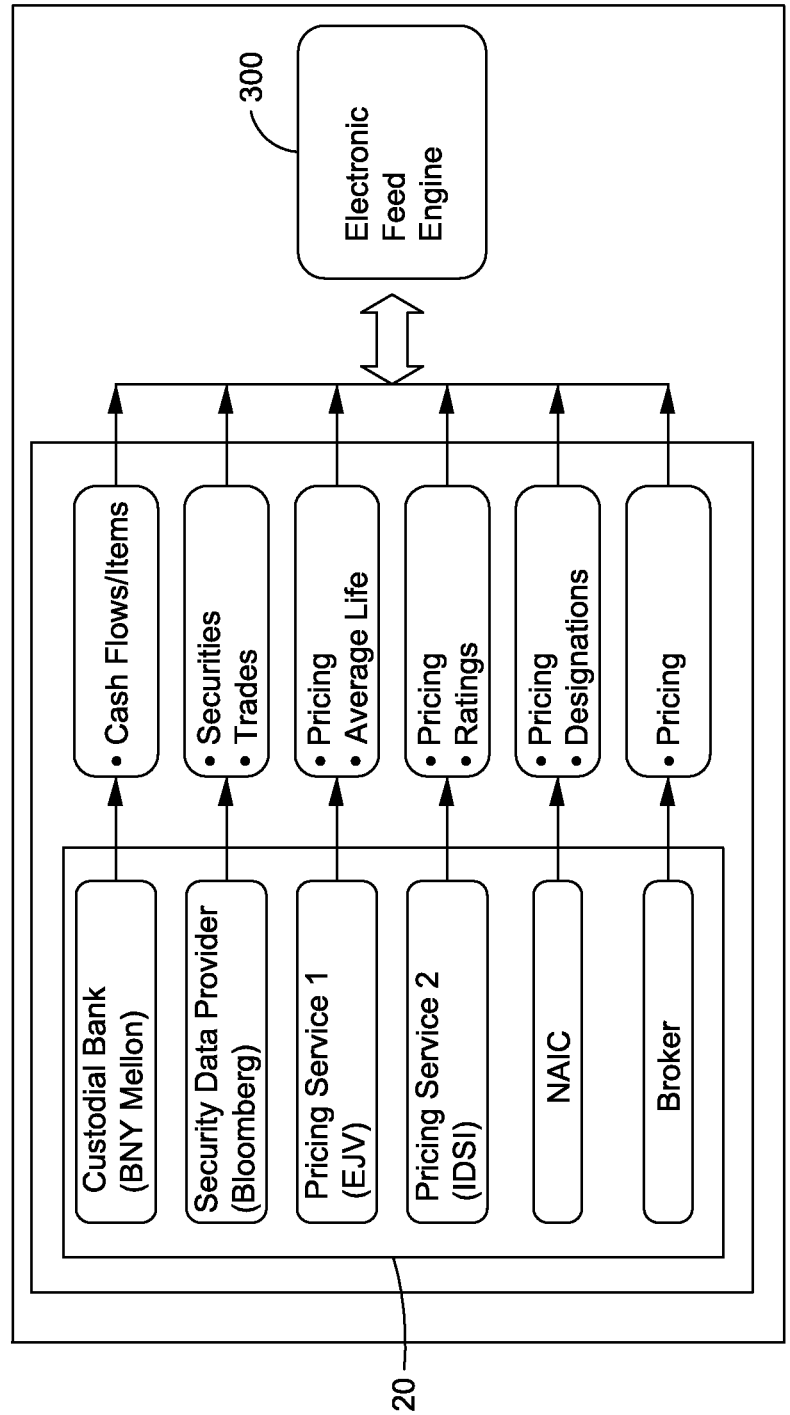
FIG. 6 shows a table of exemplary feed sites in communication with the electronic feed component of the ITAMS according to one embodiment of the present invention.

FIG. 6 shows a table of exemplary feed sites 20 that may communicate with the electronic feed component 300. The electronic feed component 300 may accept inputs from various sources outside ITAMS 10. ITAMS 10 processes the inputted data or information by transforming the data or information into a format utilized by the ITAMS 10 to further process the data or information in the ITAMS application server 100 and/or for storage in the ITAMS database server 150. In another embodiment, users do not interact directly with the electronic feeder. Rather, files are downloaded from various sources and uploaded into ITAMS 10. A user may request that a file be generated to be sent to the source requesting data. Through the GUI users can also identify files that need to be uploaded.

The following feed types may be supported by the ITAMS 10 and may communicate with the electronic feed component 300, which include but are not limited to: Bloomberg SMF Feed, Bloomberg Trade Feed, Bloomberg Data License Cash Flows Feed, BNY Mellon Cash Activity Feed, BNY Mellon Inventory Reconciliation Feed, EJV Pricing and Average Life Feed, IDSI Pricing and Ratings Feed Manual Pricing Feed, NAIC Pricing, Ratings and Designation Feed, Bloomberg Inventory Reconciliation Feed, and/or Asset Segmentation. As shown in FIG. 6, for example, a BNY Mellon feed provides cash flow data and an IDSI feed provides pricing and ratings data to the electronic feed component 300.

As shown in FIG. 6, a feed site (e.g., Bloomberg) may provide ITAMS 10 with cash flow (cash item) information. A Bloomberg type feed site may provide ITAMS 10 with securities and/or trades. An EJV type feed site may provide pricing and/or an average life for a security. An IDSI type feed site may provide pricing and ratings to ITAMS 10, for example. An NAIC type feed site may provide designations and pricing to ITAMS 10, for example. A Broker type feed site may provide pricing. Other types of feed sites, not shown in FIG. 6 may provide similar or different information to ITAMS 10.

In some embodiments of the invention, to handle incoming data or information, the electronic feed component 300 accepts incoming data or information and stores each as a record to a particular database in the data storage device 200. If the record includes security attribute or security information, the record may be stored in the security database 210. An event record is stored in the event database 220 and other financial information may be stored in the supplemental information database 245. The electronic feed component 300 may then process the record and transmit a security to the security profile component 400 and an event to the event engine 600, within the ITAMS application server 100 with or without first storing in the security database 210. For example, a Bloomberg SMF Feed will generate a security initialization event, providing both an investment and event for the creation of the security profile. Investment information may be stored in the security database 210 and the event pertaining to the investment may be stored in the event database 220. Both records are then transmitted, the investment to the security profile component 400 and the event, based on the security initialization, to the event engine 600 for further processing in the ITAMS application server 100. In another embodiment, lot information is not stored in a security database or tables. Security information, which is available industry wide, may be stored in various security tables. Lot information may be linked to the security, but stored in separate tables within the ITAMS system database. All the "records" coming into ITAMS 10 may be stored in their original format. These records may trigger other processing which on its own will store data in the database. These original "records" may be stored within tables, as opposed to separate databases.

The electronic feed component 300 supports automatic or manual feed processing. Manual feed processing means that a user 5 accepts individual records after they are stored in the data storage device 200 but before transmitted back to any engine/component in the ITAMS application server 100. In other embodiments of the invention, the user 5 may accept or deny data or information from entering the electronic feed component 300 or records from being saved within the data storage device 200. The acceptance process may allow the user 5 to search for feed files that the system has received. The user 5 can then browse the records for the selected feed, select one or more records to be accepted and submit them so that the electronic feed component 300 submits the records to the software engine storage component 140. Automatic feed processing means that the electronic feed component 300 bypasses a user's acceptance, resulting in automatic transmission and utilization of the data feed records in the ITAMS application server 100. The electronic feed component 300 can be configured to allow for automatic feed processing, or for manual user 5 acceptance, for particular feed types. The electronic feed component 300 may also be configured to suspend processing of a particular feed type. Feed types may include, but are not limited to, securities, security events, or cash flows. The electronic feed component 300 may also be configured for automatic processing, manual user acceptance, or suspended processing for data received from a particular feed. Thus, for example, pricing data received by the electronic feed component 300 from the NAIC may be suspended, whereas pricing data from the IDSI may require user 5 acceptance, before further processing is conducted in the ITAMS application server 100.

The electronic feed component 300 may also be configured so that a user 5 may undo the processing of one or more feeds and thus "reverse" out data or information transmitted by the electronic feed component 300 to the data storage device 200 or any engine/component in the software engine storage component 140. The electronic feed component 300 may also be configured to prevent inconsistent or incomplete records from being transmitted to a database in the data storage device 200 or an engine/component in the software engine storage component 140. The electronic feed component 300 may label the record as "pending" and store the pending records until a user 5 updates data or information to complete the record or the particular feed site 20 provides supplemental or updated data or information to complete the record.

Figure 7:
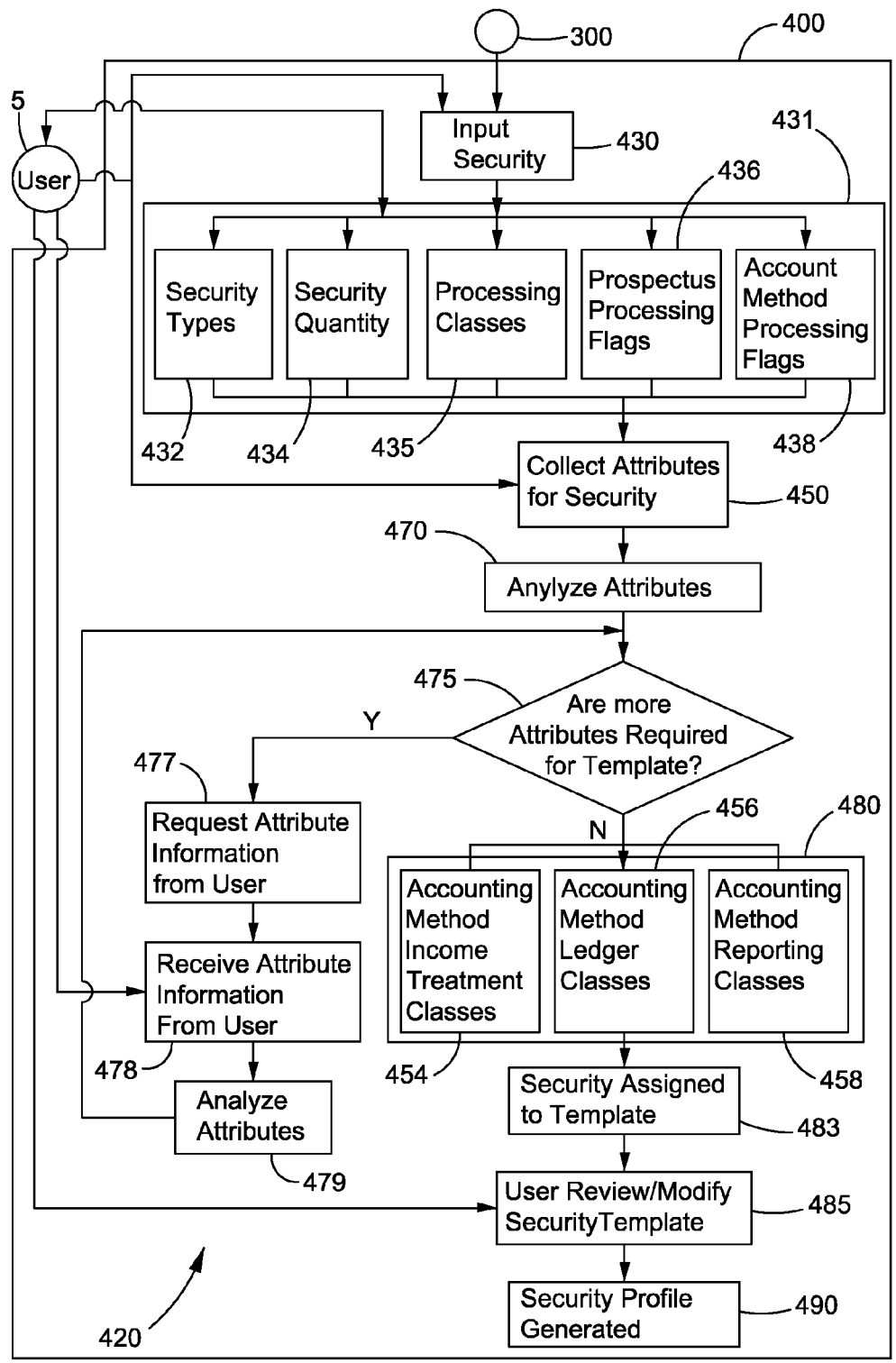
FIG. 7 shows a process for generating a security profile according to one embodiment of the present invention.

FIG. 7 shows a security profiling process 420 according to one embodiment of the invention. The security profile component 400 includes software logic to receive one or more securities and information pertaining to the security, and then to generate one or more security profiles based on numerous attributes pertaining to the security. The security profile component 400 then transmits the security profile to other engine/component in the software engine storage component 140 and/or to the security database 210 in the ITAMS database server 150 for utilization by ITAMS 10. In other embodiments, security templates may be predefined in the system. These predefined templates may determine what the default values for processing flags and attributes. For example, the investment/security information may be received in the Bloomberg Feed file, a template may be chosen based on a limited number of fields. Based on this selection, the processing flags and attributes may be set to the default values for that template. The additional security attributes may be displayed based on the default values in the processing flags/attributes. The remaining fields may be populated based on other information in the Feed file. The user 5 may have the option to update the value of most security attributes, including default values chosen with the template.

An investment and any security information pertaining to the investment may be transmitted from the electronic feed component 300 and inputted by the security profile component 400 at step 430. An example of information that may accompany an investment entering the ITAMS 10 includes the CUSIP, the nine digit alphanumeric code for identifying a security. The investment may be tracked elsewhere in ITAMS 10 by the CUSIP or by an ITAMS 10 generated SIN, to uniquely identify each security in ITAMS 10. In some embodiments of the invention, a timestamp is applied to the investment at the time the investment enters the security profile component 400 at step 430. Thus, the investment may be tracked by both the SIN and/or CUSIP, and timestamped in ITAMS 10. An investment and security information pertaining to the investment may also be manually entered by a user 5 and inputted at step 430. When, for example, a user 5 purchases an investment, the purchase of the investment is sent to ITAMS 10, either electronically or manually. The investment and information pertaining to the investment enters ITAMS 10, through the electronic feed component 300 and into the security profile component 400. Alternatively, the user 5 may enter the investment and information pertaining to the investment directly to the security profile component 400. In some embodiments of the invention, when there is no connection to a feed site 20 or when the feed site 20 is off-line, the preferred method of security entry into ITAMS 10 may be from the user 5.

At step 431, the security profile component 400 processes inputted investments and information pertaining to the investments received in step 430. The investment is pre-defined by the security profile component 400 by reviewing information pertaining to the investment provided by a feed site 20 or from a user 5 and then by extrapolating portions of the information and processing those portions through multiple categories. As shown in FIG. 7, categories for pre-defining the investment by the security profile component 400 may include: investment types 432: the trading quantity of the investment 434: the processing classes 435: prospectus processing flags 436: and accounting processing flags 438.

As shown, a first category for pre-defining the investment is determining the investment type 432. FIG. 8 shows a table of exemplary security types recognized by ITAMS 10. So for example, an investment entering the security profile component 400 may be pre-defined as a common stock, U.S. Treasury note, etc. based on the information received from a feed site 20 or user 5 and extrapolated by the security profile component 400.

As shown, a second category for pre-defining the investment is determining the number of securities accompanying the type of investment in the category of investment quantity 434. A number of purchases in an investment is typically referred to as a lot(s). So for example, if a user invests in a certain amount of lots of a particular investment, then when those lots are purchased, the feed site 20 or user 5, may provide ITAMS 10 with the lots in step 431.

Figure 9:
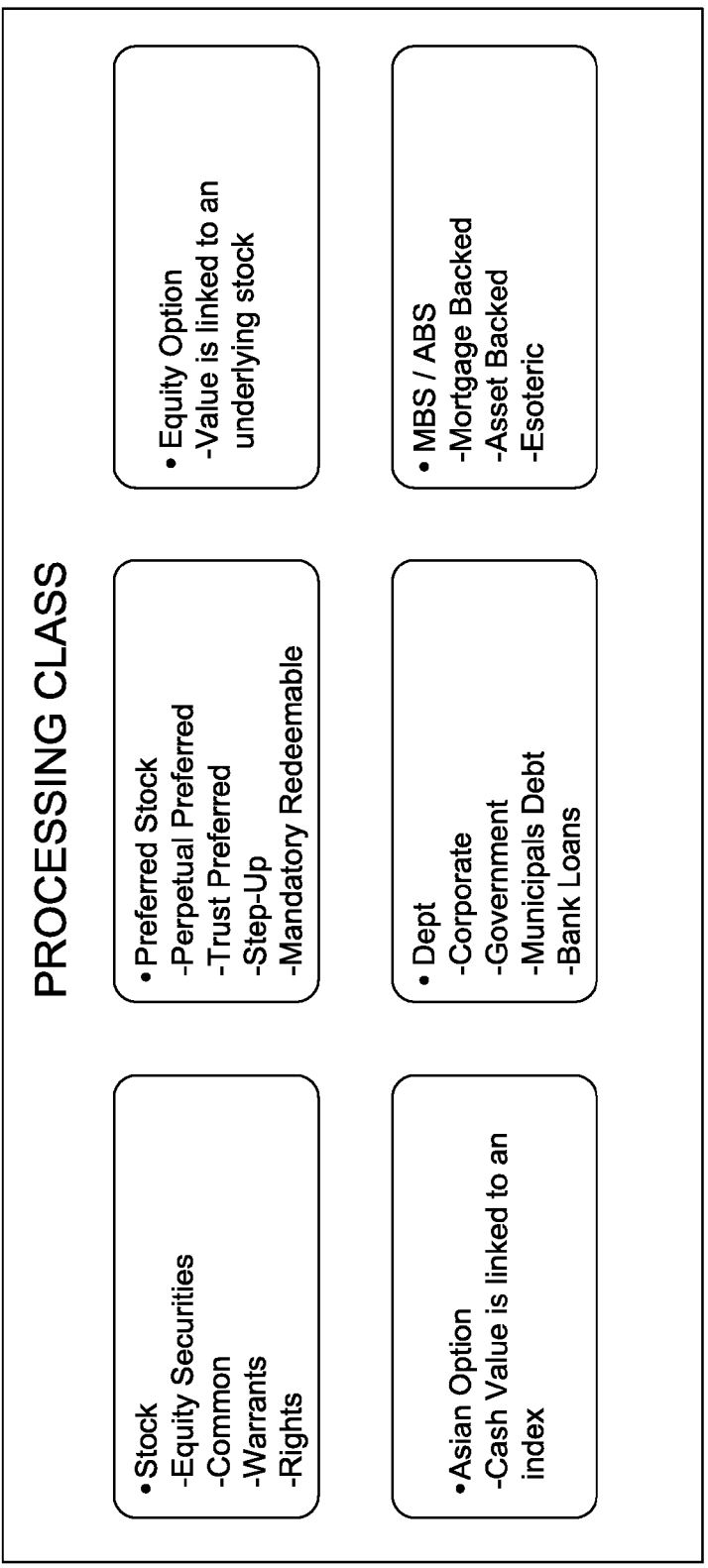
FIG. 9 shows a table of exemplary processing classes according to one embodiment of the present invention.

As shown, a third category for pre-defining the investment is determining the processing class of the investment under the category of processing class 435. FIG. 9 shows a table of exemplary processing classes. Thus the investment, pre-defined by a particular type in category investment type 432 may be connected to a particular processing class by ITAMS 10 to further define the investment. So for example, a security type of a common stock may be connected to a processing class for stock. In another example, a corporate debt security type is considered a debt for processing class. Another processing class is an Asian Option (also called an average option), which is a cash-settled option whose pay-out is linked not to the value of the expiration date, but rather to the average value of the underlying security, index or commodity over a specific set of dates. The processing classes shown in FIG. 9 may be replaced or supplemented by other processing classes defined in the security profile component 400.

Information is further extracted and processed by the security profile component 400 under the category of prospectus processing flags 436. FIG. 10 shows a table of exemplary prospectus processing flags for a given investment. Each box in the table expresses questions and example answers as determined by the security profile component 400, pertaining to an investment. The security profile component 400 examines the information acquired with an investment entering the security profile component 400 and extracts portions from the information to resolve these questions, such as those shown in FIG. 10, for the category of prospectus processing flags 436. The various questions to be resolved may be hard-coded into the ITAMS 10 for acquiring answers from every investment entered into ITAMS 10 by the security profile component 400 or the questions may be deleted, modified, supplemented, or replaced with other inquiries raised by a user 5 or supplied by a system administrator to acquire other forms of information under the prospectus processing flag category 436. Answers, like those shown in FIG. 10, are acquired in the information accompanying a security from a feed site 20 or the user 5. Thus for example, the security profile component 400 will try and identify within information pertaining to a security in step 431, when the investment will expire. As shown in FIG. 10, the answer to the expiration question, isolated from investment information by the security profile component 400, is that the investment will expire automatically at a particular date. In another example, and as shown in FIG. 10, a portion of the information pertaining to the investment is isolated by the security profile component 400 to answer whether the investment pays interest. The portion of information provides that interest income on the investment will be accrued and coupon payments will be received for the particular investment.

Figure 11:
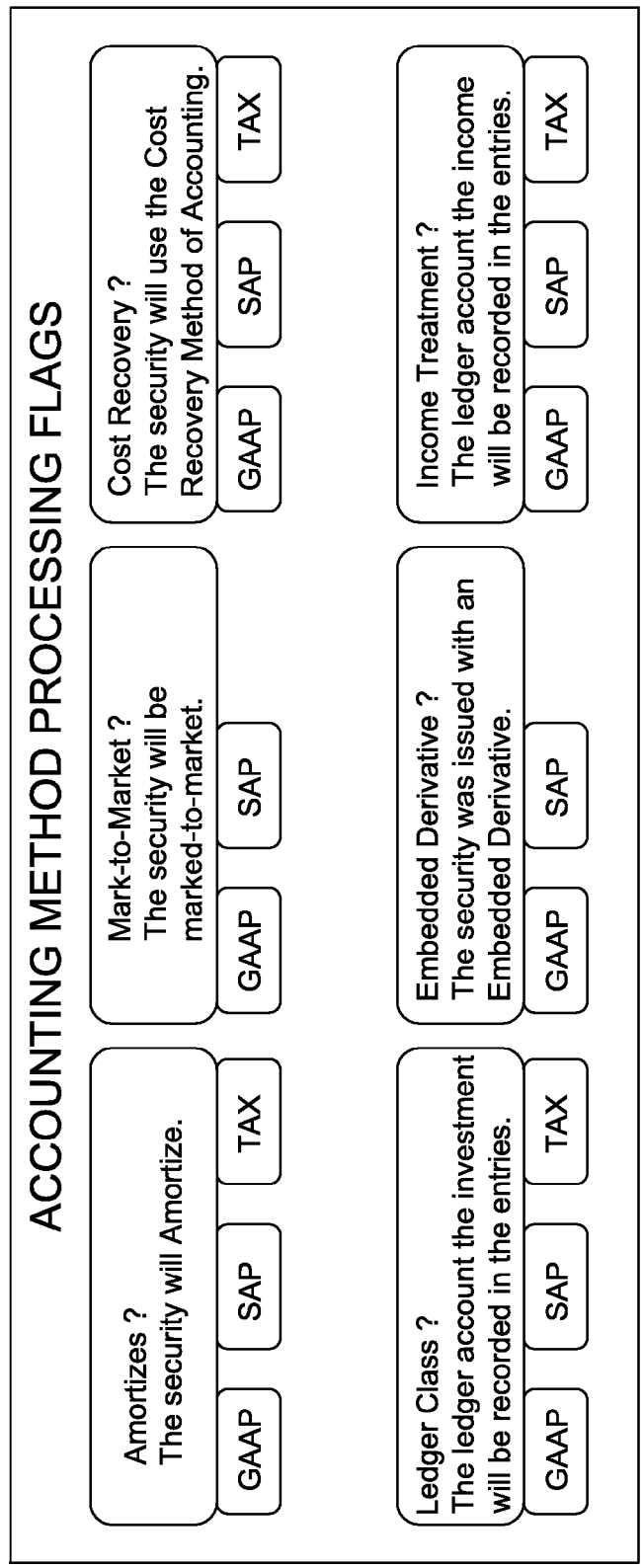
FIG. 11 shows a table of exemplary accounting method processing flags for processing attributes according to one embodiment of the present invention.

Referring again to FIG. 7, and in addition to pre-defining the investment, the investment information is further extracted and processed by the security profile component 400 under the category of accounting method processing flags 438. FIG. 11 shows a table of exemplary accounting method processing flags for a given investment. Each box in the table expresses questions and example answers pertaining to an investment as determined and processed by the security profile component 400. These particular questions are partitioned as per accounting methods. The types of accounting methods utilized by the ITAMS 10 may be GAAP, SAP, and Tax. Information extracted from a feed site 20 or user 5 that answers questions, such as those shown in FIG. 11, may supply information for processing the investment under one, some, or all of the accounting methods utilized by ITAMS 10. As with the prospectus processing flag category 436, the various questions to be resolved may be hard-coded into the ITAMS 10 for acquiring answers from every investment entered into ITAMS 10 by the security profile component 400 or the questions may be deleted, modified, supplemented, or replaced with other inquiries by a user 5 to acquire other forms of information under the accounting method processing flags category 438. Answers, like those shown in FIG. 11, are extrapolated by security profile component 400 from the information accompanying a security from a feed site 20 or the user 5. Thus for example, the security profile component 400 extrapolates from information pertaining to an investment to determine whether the investment has an embedded derivative, as shown in FIG. 11. Although not shown in FIG. 11, other accounting method processing flags may include ledger class, income treatment, and reporting class.

For all categories described above, the security profile component 400 attempts to pre-define the investment by extracting information pertaining to the investment to provide a security type, an investment quantity, a processing class for the investment, and resolve inquiries pertaining to prospectus and accounting method processing flags.

In some embodiments of the invention, ITAMS 10 may request the user 5 to supplement an investment and/or information pertaining to an investment previously inputted by a feed site 20 or the user 5. ITAMS 10 may ask questions of the user 5, when the information pertaining to an investment did not provide sufficient information, to further pre-define the investment as processed through one or more of the exemplary categories described above. Questions purposed to the user 5 on the user device through the web browser 3 may be followed by, but not limited to, blank text boxes for the user to fill in information, yes-no check boxes, or choices from drop-down menus.

After information is assessed and categorized in step 431 by the security profile component 400, as shown in FIG. 7, the security profile component 400 collects the security information as the attributes for the security in step 450. Information categorized in step 431 for pre-defining the security is considered attributes of the security. Security attributes are information pertaining to the investment, as provided to ITAMS 10, and then organized by ITAMS 10 for further processing. Security attributes include, but are not limited to: the information of an investment relative to the security type, the amount issued quantity, the processing classes of the security, the prospectus processing flags for the security, and the accounting method processing flags for the investment. A user 5 may update or supplement information at step 450 and further increase the list of attributes, or replace particular attributes for the investment, or modify attributes.

Figure 12:
FIG. 12 shows an exemplary table of collected attributes according to one embodiment of the present invention.

An exemplary table of collected attributes according to one embodiment of the invention are shown in FIG. 12. For example, the security type, amount issued quantity, CUSIP identifier, ticker symbol, etc. may be considered generic attributes collected by the security profile component 400.

The stock par value, debt maturity, and mortgage-backed security (MBS) day delay are examples of processing class attributes collected by the security profile component 400. The security profile component 400 may also collect the maturity date and paydown schedule as examples of processing flag attributes. In addition amortization information or market-to-market information pertaining to a particular accounting method are examples of account method attributes collected by the security profile component 400.

Referring again to FIG. 7, once all attributes are collected for a particular investment, the security profile component 400 analyzes the attributes at step 470. The security profile component 400 determines, at step 475, whether the attributes are sufficient to match the particular investment with a security template already stored in the ITAMS database server 150 in the security database 210. In other embodiments of the invention, the security templates may be stored in any other database in the ITAMS database server 150 or in the ITAMS application server 100. In some embodiments of the invention, templates are pre-programmed into ITAMS 10. Templates might also be uploaded to ITAMS 10 by a user 5 or system administrator. The security profile component 400 may also adapt, update, or create new templates based on historical information of previously processed attributes and/or from information previously integrated into the present set of templates. So thus in effect, the security profile component 400 may learn of new and varying types of securities as new and varying attributes are processed by the security profile component 400 or provided by a user 5, so as to modify or update the present set of templates, as further discussed in step 485. The user 5 might also initialize a template for an uncommon security for the security profile component 400.

After the attributes are analyzed by the security profile component 400 in step 470, the security profile component 400 determines whether more attributes are needed at step 475 before assigning the particular investment to a template. If more attributes are required, the security profile component 400 requests additional information of the user 5, at step 477, to receive the necessary attributes for assigning the investment to a template. Requests for information from the security profile component 400 to the user 5 may be in the form of questions purposed to the user 5 through the web browser 3 by providing blank text boxes for the user to fill in information, yes-no check boxes, choices from drop-down menus, or any other means to receive additional information form the user 5.

At step 478, the security profile component 400 receives supplemental information pertaining to the investment from the user 5 to supplement, update, or replace attributes for the particular security. After the security profile component 400 receives information from the user 5 at step 478, the security profile component 400 again analyzes all the attributes for the particular investment at step 479.

If enough attributes are identified for an investment, as determined by the security profile component 400 in step 475, then rules considerations are applied in step 480. In some instances, a user 5 may not supply sufficient information or any information such that the number of attributes for a particular security are sufficient to assign the security to a template. In that case, the security profile component 400 will still conduct application of rules considerations in step 480 and assign the security to a template that the security profile component 400 determines to be the most comparable to the security and its attributes processed by the security profile component 400.

At step 480, the security profile component 400 applies various rules considerations to the investment and its security attributes based on types of accounting methods. Exemplary rules considerations for accounting methods are shown in the following sub-steps of step 480. Based on the security and attributes analyzed by the security profile component 400, an income treatment is applied to the security in step 454 based on the types of accounting methods that may be imposed on the investment.

Figure 13:
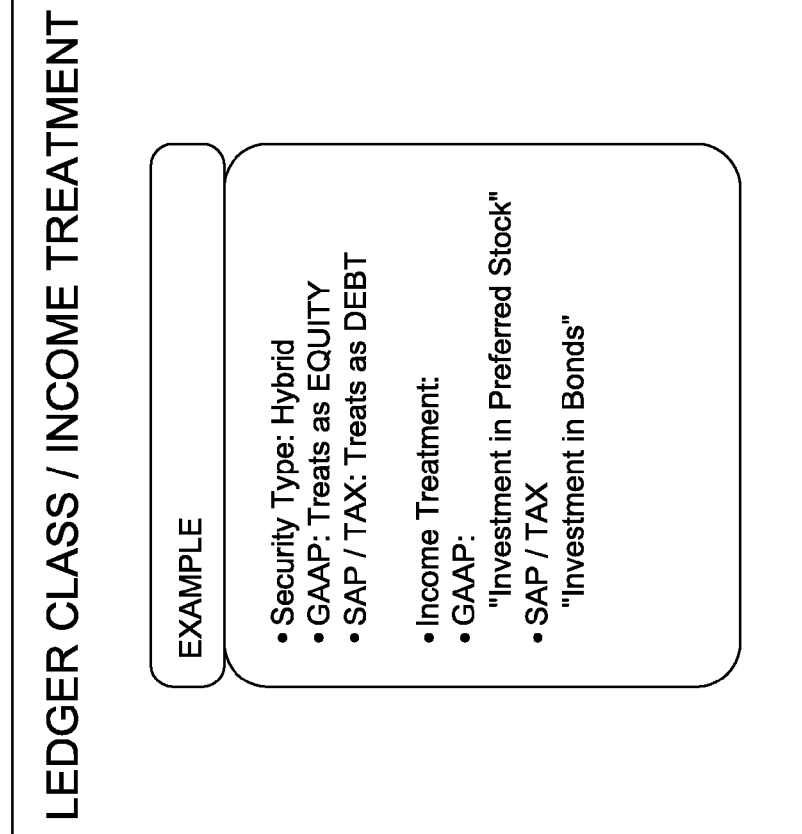
FIG. 13 shows an example of accounting treatment after rules considerations are applied according to one embodiment of the present invention.

FIG. 13 shows an example income treatment for a hybrid type investment as determined by the security profile component 400. Under GAAP method of accounting the hybrid type security is treated by the security profile component 400 as an equity, but under the SAP and Tax methods of accounting the hybrid type investment is treated by the security profile component 400 as a debt. Thus, for income treatment of the equity under GAAP the equity is an investment in stock as considered by the security profile component 400. The income treatment of the debt under SAP and Tax is an investment in bonds as considered by the security profile component 400.

Referring again to FIG. 7, in another sub-step of step 480, ledger classifications are applied to the investment by the security profile component 400 in step 456 based on the types of accounting methods that may be imposed on the investment. Ledgers typical list the accountings of debits and credits for a typical investment. A ledger may account these debits and credits differently, based on various changes or events occurring during the life of the investment, under a particular accounting method. For example, in a ledger, a hybrid security may be treated differently as equity under GAAP from a debt under SAP and Tax.

Based on the investment and security attributes analyzed by the security profile component 400, reporting classifications are applied to the investment in step 458 based on the types of accounting methods that may be imposed on the investment. Attributes of the security provide information to the security profile component 400 so as to assess and determine both ledger and reporting classifications under a particular investment groups and accounting methods, such as GAAP, SAP, Tax, and/or Trade.

Figure 14:
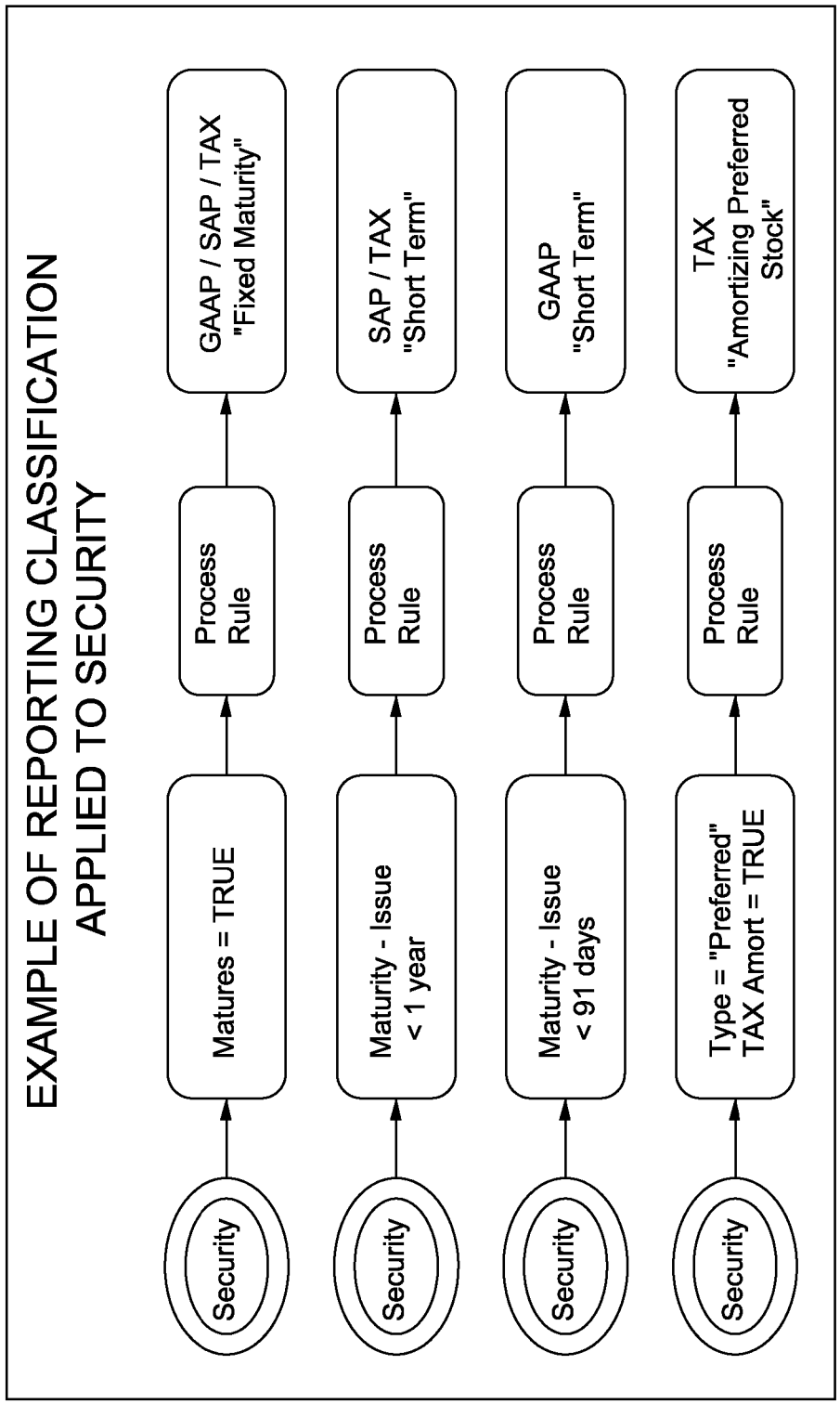
FIG. 14 shows an example of rules considerations applied for reporting categories according to one embodiment of the present invention.

FIG. 14 shows an example of reporting classification for an investment. In this example the attribute of maturity is assessed for a particular investment by the security profile component 400. If the security will mature at some time in the future, then the security is deemed a "fixed maturity" by the security profile component 400 under the accounting methods of GAAP, SAP, and Tax. If the difference between maturity and the time of issue of the security is less than one year then the investment is deemed "short term" by the security profile component 400 under the accounting methods of SAP and Tax. In addition, as shown in FIG. 14, if the difference between maturity and the time of issue of the security is less than ninety-one days then the investment is deemed "short term" by the security profile component 400 under for GAAP accounting methods. A security having attributes, wherein the security type is preferred and Tax amortization is true, then under Tax accounting methods the security profile component 400 deems the security as amortizing preferred stock for reporting classes.

Referring again to FIG. 7, after the rules considerations have been applied by the security profile component 400 in step 480, the investment based on its attributes and its classifications under application of rules considerations, is assigned by the security profile component 400 to a security template at step 483. By assigning an investment based on its attributes and its classification under application of rules considerations to a template, the security profile component 400 generates a commonality of organized investments to be further processed throughout ITAMS 10. By linking a particular investment and its attributes into a template, a requirement to hard code every new security into ITAMS 10 is diminished. A template for an investment already comprises a framework of code that may be recognized and thus may easily be processed by ITAMS 10. By integrating a particular investment within a template, the majority of code has already been established and may be easily processed by the other engine/component in the ITAMS application server 100 resulting in accuracy and efficiency. The security profile component 400 conforms particular investments, their attributes, and account method processing into a template to attain commonality for similar investments. Commonality from utilizing investment/security profiles results in more dependable reporting and a more audit friendly system.

After the investment is assigned to a template in step 483, the user 5 is afforded an opportunity to review and/or modify the investment within the template at step 485. The user 5 may reassign the investment to another template if the user 5 believes that the particular investment is more closely associated with another template. A security template in the security profile component 400 may be flexible, allowing for updates, additions, and deletions of attributes for a particular investment. A user may also initialize a security template manually. In this instance, the user may enter all information from security type and number of lots/shares, to the types for classifications that should be connected to the security based on the various accounting methods, such as GAAP, SAP, Tax, and Trade. In other embodiments of the invention, the user 5 may supply the security profile component 400 with new security templates.

FIG. 15 shows an exemplary screen shot of a security template initialization screen provided for user 5 by the security profile component 400 for the user 5 to review and input information to generate a template. As shown in FIG. 15, the investment initialization is created by a user 5 through a screen provided by the security profile component 400, as for the example security template of common stock 510. User 5 input may be incorporated by utilizing drop-down boxes and choosing a particular attribute for the investment from a list of options in each drop-down box. In some embodiments of the invention, the default option is shown in each drop-down box, without a user 5 selecting the drop down box, as may be provided by the system profile component 400 based on attributes already processed and analyzed in for example steps 450 and 480 in FIG. 7.

In this particular example, the security template initialized is for a common stock security template as shown in box 512. Investment type, processing class and quantity types are provided for selection in drop-down menus below box 512 with default attributes listed as an equity for the security type, stock for the processing class and shares for the quantity type. Prospectus processing flags may be selected by the user 5 under box 515. Accounting method processing flags 520 may be selected for the appropriate accounting method under box 520, as for example, embedded derivative information or book value accounting information such as cost recovery. In this example, the cost recovery is "not applicable" for book value accounting under either GAAP, SAP, or Tax. The accounting method processing flags under box 520 may be selected in the drop-down boxes for the associated accounting method by a user 5. Ledger classifications selections under box 525 and reporting classification selections under box 530 are provided by the security profile component 400. As an example, in this screen shot, the ledger class is "common stock" for GAAP, SAP, and Tax. Rules pertaining to the particular type of investment as processed by the security profile component 400 are then listed near the bottom of the screen shot in box 535. The security profile component 400 processes the inputs entered into screen by the user 5 to create a new security template.

FIG. 16A shows an exemplary screen shot of a security template initialization for a mortgage-back security (MBS) and/or asset-backed security (ABS) security template 550, wherein the security template name is chosen by a user 5 as an "MBS&ABS" under box 552. Investment type, processing class and quantity types are provided for selection in drop-down menus below box 522 with default attributes listed as an MTGE for the security type, MBS/ABS for the processing class and original face for the quantity type. Prospectus processing flags may be selected by a user 5 under box 555. Accounting method processing flags may be selected for the appropriate accounting method under box 560, as for example embedded derivative information or book value accounting information such as cost recovery. In this example, the cost recovery is "not applicable" for book value accounting under any accounting method (e.g., GAAP, SAP, or Tax). A frame for ledger classifications shown in box 565 and reporting classification shown in box 570 under the accounting method processing flags 560 may be selected in the drop-down boxes for the associated accounting methods by user 5. As an example, in this screenshot, the ledger class is "bonds" for GAAP, SAP, and Tax. Rules pertaining to the particular type of security as processed by the security profile component 400 are then listed near the bottom of the screen shot in box 575 of FIG. 16B. Screen shot in FIG. 16B is the bottom portion of the same screen shot in FIG. 16A.

Referring again to FIG. 7, after the template is revised or updated in step 485, a security profile is generated in step 490. The security profile includes the investment and its security attributes with accounting method rules applied in the format of a security template to provide for organization and commonality of software code for processing within ITAMS 10.

As shown in FIG. 5, the security profile is then transmitted to the ITAMS database server 150 for storage in the security database 210. Any additional information accompanying the security profile may be transmitted and stored in the supplemental information database 245. In some embodiments of the present invention, an editing history of the security profile may be stored in the ITAMS database server 150 in any one of the databases within, such as the security database 210 or the supplemental information database 245. The editing history may provide information pertaining to any adjustments or changes to a profile, including date of change, by the security profile component 400 or a user 5. The editing history may show whether a particular investment was removed from one template to another template, whether certain attributes were added, deleted, or replaced, and/or a user ID associated with changes to particular security profile. Information in the editing history may be utilized for financial auditing purposes.

The security profile may be directly transmitted from the security profile component 400 to the accounting maintenance component 900 or the event engine 600 for continued processing of information pertaining to or relevant to a security profile, such as an event occurring in the life of the investment.

Figure 17:
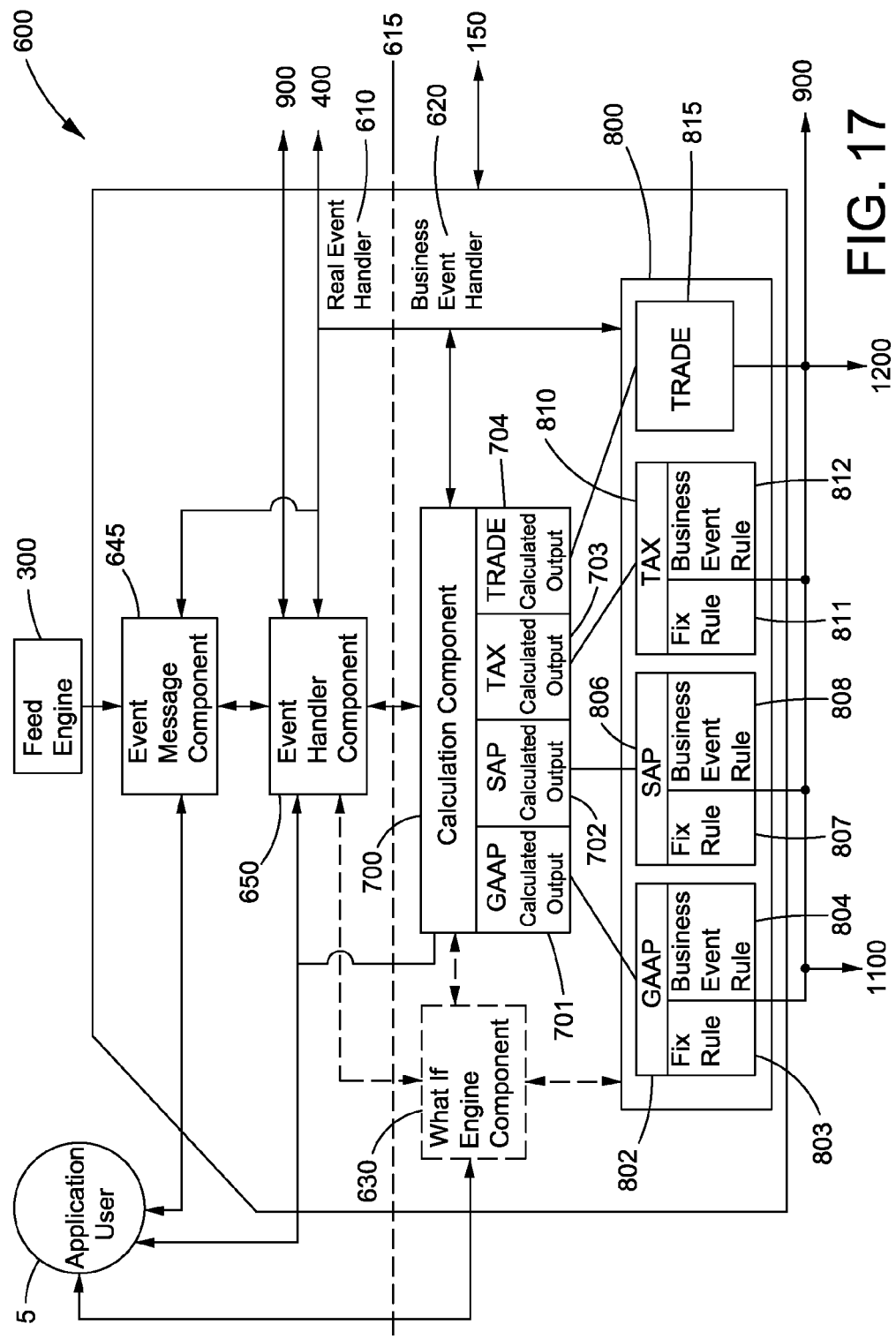
FIG. 17 shows a schematic of the event engine of FIG. 5 according to one embodiment of the present invention.

FIG. 17 shows a schematic of the event engine 600 from FIG. 5 according to one embodiment of the present invention. The event engine 600 in ITAMS 10 drives the financial accounting of investments by processing events in the life of an investment along a investment lifespan timeline. The benefits to processing financial accounting on events occurring in the life of an investment include an easier accountability for data changes at any time throughout the life of an investment. Another benefit is lowering the risk of incompleteness or incorrectness by treating all changes to an investment with consistency. Processing every investment as they arrive at the event engine 600 means that calculations and reporting for an investment are current "as-of" the date of the most recent event for the investment. This in turn, eliminates a need to calculate for a number of events not previously accounted for or calculated on.

The event engine 600 processes these events linked to the security profile for an investment for the various investment groups and accounting methods, such as SAP, GAAP, Tax, and/or Trade. Thus, any given investment processed in ITAMS 10 may have one or more timelines calculated by the event engine 600, e.g., one for each accounting method. ITAMS 10 may also compare timelines and report the difference between timelines for a particular investment. ITAMS 10 also identifies dependencies among changes to the investment and may replay those changes when event corrections are integrated into the timeline for an investment.

In the ITAMS 10, events may originate in two places: events originating outside ITAMS 10; and events generated from within ITAMS 10. Events originating outside ITAMS 10 would include, but are not limited to, an event such as a buy, sell, or consent fee for an investment. Events originating outside may come from the user 5 or a feed site 20. An internal event generated from within ITAMS 10 may include, but are not limited to, monthly amortization or interest accrual. An internal event may be processed in the calculation component 700 of the event engine 600, described further below.

Events may further be described as either real or business events. A real event represents the event as it occurred in the real world. It contains data common to all accounting methods and identifiable to attributes of the investment, for example, the portfolio code, CUSIP, number of shares, price, and the commission of a stock trade found in the security profile. Processing of real events may differ by accounting method. A business event defines the processing and the actions required in response to a real event. In ITAMS 10, one event may spawn another event. For example, selling a lot of securities in a real world event will spawn the business event of an interest accrual within the event engine 600. The interest accrual occurs automatically through ITAMS 10, partially based on information provided in the security profile.

The event engine 600 processes both real and business events. The event engine 600 includes an event message component 645, an event handler component 650, a calculation component 700, a what-if component 630, and a rules handler component 800. Real business events are typically processed through the event message component 645 and the event handler component 650 within the real event handler 610 portion of the event engine 600. Business events are typically processed in the calculation component 700, the what-if component 630, and the rules handler component 800 as identified by the business event handler 620 portion of the event engine 600. As shown in FIG. 17, the real event handler 610 portion and the business event handler 620 portion are separated by dash line 615. In some embodiments of the invention, real and businesses events may be processed in any component of the event engine 600.

Figure 18:
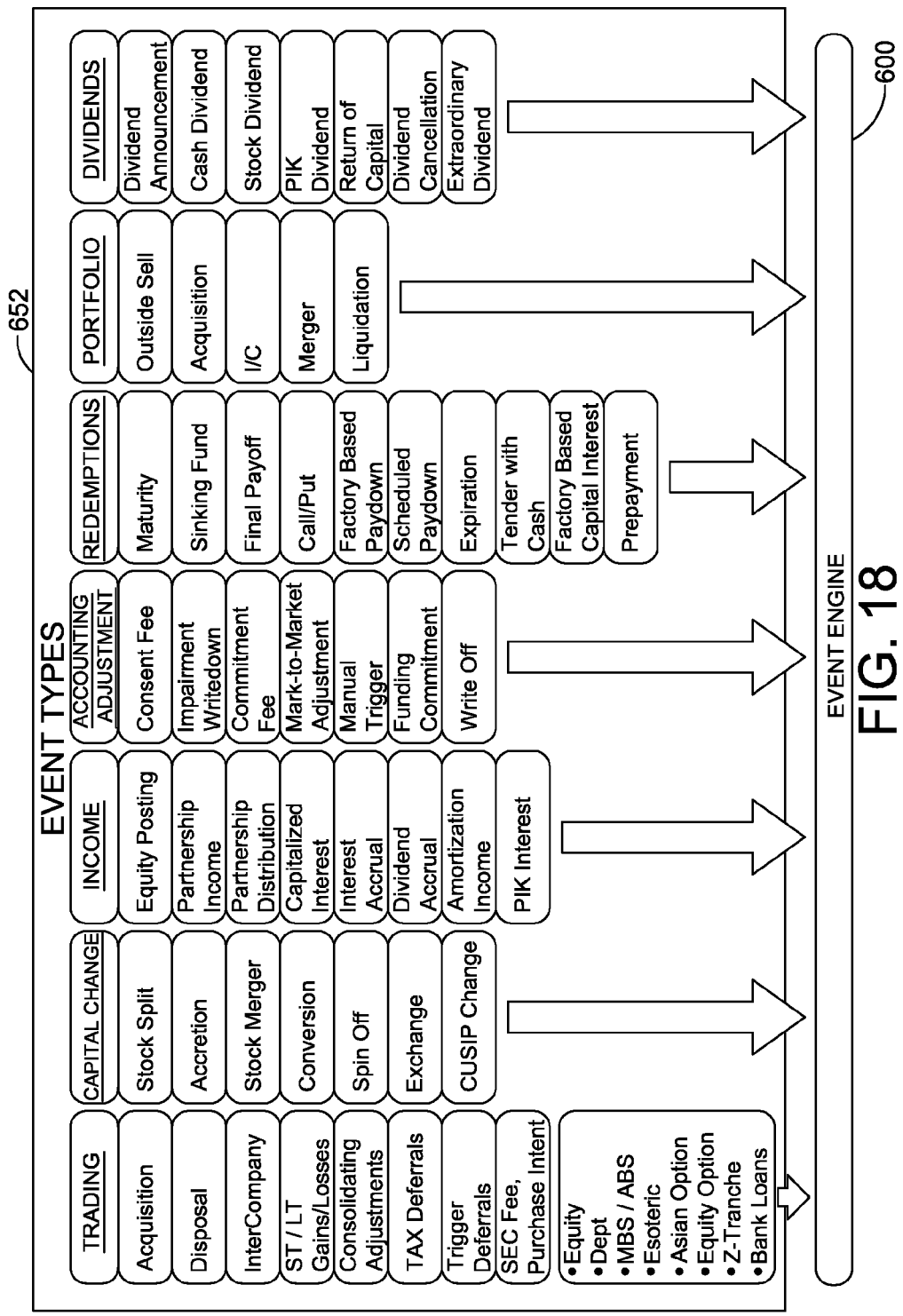
FIG. 18 shows an exemplary table of event types entering the event engine.

Various types of events may enter the event engine 600 including, but not limited to, the events listed in FIG. 18. FIG. 18 shows exemplary event type lists 652, showing events that may enter the event engine 600 of exemplary events.

Referring back to FIG. 17, an event, e.g., a real event, is received at the event message component 645 from the feed component 300, receiving events and information pertaining to events from a feed site 20 or a user 5. Input information received by the event message component 645 may include input information about the event that is common to all accounting methods, as for example, including CUSIP, number of shares (lots), designated portfolio, etc. found in the security profile. Data or information required to process the event by the event engine 600 preferably includes, at least, an event name and a real event date. So for example, the information may include a name of "X stock sale" with an event date of Dec. 31, 2020.

The event message component 645 may also link the event and information pertaining to the event to a particular security profile either provided directly from the security profile component 400 or with a particular security profile retrieved from the security database 210 of the ITAMS database server 150. If, for example, a real event takes place such that a particular stock is split and shares of the stock were previously purchased and the security profile for the purchase exists within ITAMS 10 then the event message component 645 would link the split event with the relevant security profile. If for example, a user 5 purchases a new stock, then the purchase of the stock as an event would enter the ITAMS 10 along with the security information pertaining to the stock so that a security profile would be generated in the security profile component 400 and then transmitted with the event to the event engine 600.

Once the event message component 645 has received data or information to further process an event for a particular security profile, the data or information is transmitted to the event handler component 650 as tied to the particular security profile.

The event handler component 650 creates and resolves lots for the particular security. Lots also include groups of securities impacted by an event as a unit within ITAMS 10. Lots may be a specific number of a security that a user 5 is buying or selling. The event handler component 650 will select lots, creates new lots, update lots, handle lots during event corrections, etc.

The event handler component 650 manages real-to-business event mapping for the investment. Thus, the event handler component 650 ensures that a real event affects the same lots for a given investment across all accounting methods. When processing by the event handler component 650 a real event may differ by the accounting method. Because each accounting method can define separate business events, the event handler component 650 maps the separate business events independently to the corresponding real events. By mapping a business event by an accounting method to the real event, the event engine 600 can further process one or more business events from one real event for the different accounting methods. For example, a real event consent fee may be processed as income under Tax accounting method and a real event consent fee may be processed as a reduction of book value under GAAP and SAP accounting methods.

FIG. 19 shows an exemplary table of real event types mapped to several business event types. The example real event type shown in the first column is an accretion factor. In one definition, an accretion factor is the factor amount of capital gains a bondholder receives after buying a bond at a discount when the bondholder expects the investment will be redeemed at maturity. Under the accounting methods, the accretion factor is mapped by the event handler component 650 to business events. So as for example shown in FIG. 19, an accretion factor may be mapped to an interest accrual or an accretion factor for a business event under GAAP. Accretion factor may be mapped to an amortization income or accretion factor under SAP. Accretion factor is also mapped, as shown in FIG. 19, to business event definitions in Tax.

Referring again to FIG. 17, the event handler component 650 supplements events into a timeline of financial history for a given investment under each accounting method. An event entering the event engine 600 through ITAMS 10, from either a feed site 20 or user 5, is added to an investment timeline. The event may be added as the latest date on a timeline, or if for instance a user 5 supplies an event that occurred prior to events already listed on a timeline, the event handler component 650 will insert the event in the appropriate location on the timeline for that particular investment. Lots for a particular security may have different financial timelines under a GAAP accounting method than the same lots for the same security under a Tax accounting method. The timeline for particular lots of a security are transmitted between the event engine 600 and the ITAMS database server 150, where the timeline is stored and retrieved in the event database 230. Historic events and timelines are stored in the historical event database 240 and this is further described in reference to FIGS. 25 and 26A-C.

The event handler component 650 may also be configured to handle scheduling for a particular investment. The event handler component 650 may schedule a time for insertion on the investment timeline when a particular action should occur. The scheduled action may be appropriated by the ITAMS 10 or by the user 5 for the ITAMS 10 or user 5. For example, if a new investment with a dividend is created in ITAMS 10, the event handler component 650 may schedule a series of actions on its investment timeline for the periodic review of dividend announcements from feed sites 20. The event handler component 650 may schedule actions along a timeline of a security for a user 5 to, for example, review the status of the security in ITAMS 10. Events also may be scheduled by the event handler component 650 and placed on a timeline for a future date. Processing of that particular event may not then trigger until the scheduled date becomes present.

The event handler component 650 may also be configured for notifying a user 5. Notification may be meant to inform the user 5 that a situation or condition has occurred for a particular investment based on an event. This allows for a user 5 to be proactive in identifying issues for a particular security that they need to be aware of. Various types of notifications may be transmitted to a user 5. For example, lot level notifications requiring a user 5 to check against each lot processed as part of an event may be transmitted. An investment level notification may be transmitted to a user 5 requiring the checking of conditions for each investment processed within an event. An event level notification may also be transmitted to the user 5 so as, for example, informing the user 5 that an impairment write-down was entered into ITAMS 10.

Figure 20:
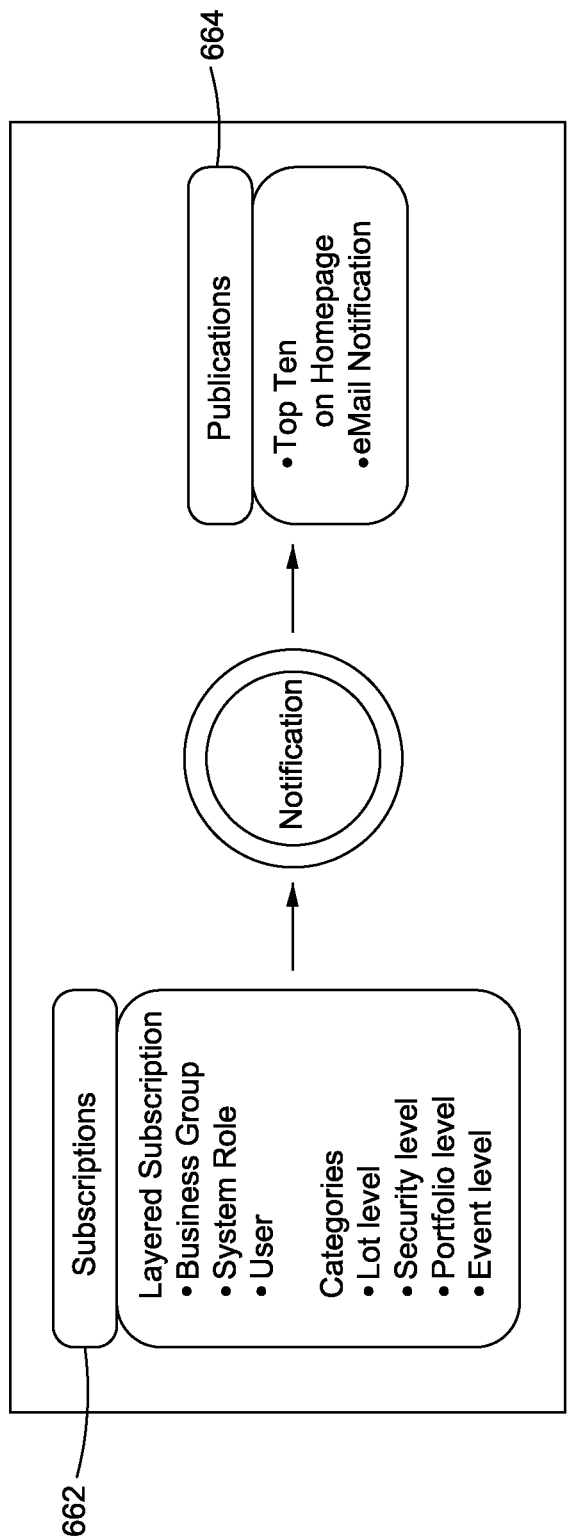
FIG. 20 shows exemplary subscription and publication features for notification.

FIG. 20 shows exemplary subscription 662 and publication 664 features for notification to a user 5 as provided in ITAMS 10. A user 5 may subscribe for notifications, as provided by the event handler component 650. Subscriptions 662 may be layered such that a user 5 may choose to enroll in a particular layered subscription preference to receive notifications. The user 5 may receive notifications as a member of a particular business group. So, for example, if the user 5 works in a trading department for his company, then the user 5 may receive all notification pertaining to trades. The subscription 662 may also be chosen based on user 5 system roles. A user 5 working as a system administrator may receive different notifications than a user 5 working as a tax analyst. The user 5 may also choose to receive notifications only when the user 5 reviews or works with particular portfolios or securities. The user 5 may also receive notifications for particular events occurring during the life of a particular investment.

The event handler component 650 may provide publications 664 including published notifications, as in for example, an email notification. The notification may also be published, as for example, on a homepage of the ITAMS 10 where a user 5 may see a listing of the notifications pertaining to the user 5. The notifications may be listed by date with the most recent events or the closest scheduled action appearing first in a list. The notifications might also be prioritized and listed on a homepage in terms of importance for the user 5 to take action. The notifications may be listed as a "top ten" in terms of priority on the homepage for a user 5.

Referring again to FIG. 17, the event handler component 650 transmits each business event, including the lots affected by the event for a particular security profile to the calculation component 700 of the event engine 600. The calculator component 700 processes the business event by often conducting complex calculations.

Figure 21:
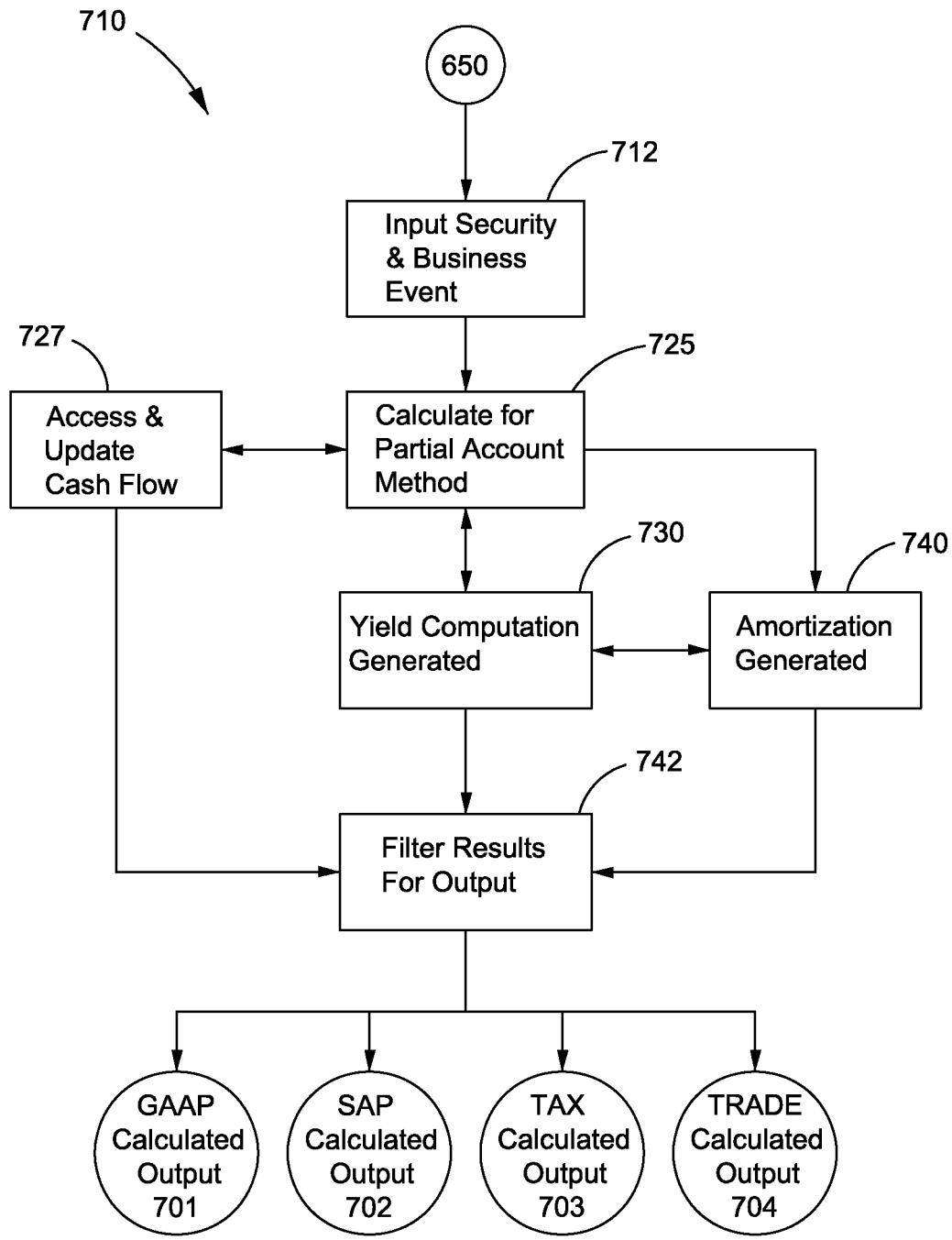
FIG. 21 shows a process for processing a security within the calculation component of the event engine of FIG. 17 according to one embodiment of the present invention.

FIG. 21 shows a process for calculating based on events of an investment within the calculation component 700. The calculation process 710 begins when the business event is transmitted from the event handler component 650 and inputted into the calculation component 700 at step 712.

The business event for the particular investment is then calculated in step 725. Calculation of the investment in ITAMS 10 supports one or more sets of expected cash flows, including the amount of cash as of a particular date, for each accounting method, including GAAP, SAP, and Tax. The calculation component 700 calculates events with standardized calculations to create consistency for the same type of investments.

As the calculation component 700 calculates a yield and amortization for an investment in step 725, the calculation component 700 accesses cash flow in step 727 and in many instances updates cash flow in step 727. A cash flow is, for example, a generated table listing by date of principal and interest payments, which are events processed by the calculation component 700 to calculate yield and amortization. Dates may include the issue date, all payable dates, and the maturity (redemption) date. For the first lot of a security entering ITAMS 10, a cash flow may either accompany the lot through the feed component 300 from a feed site 20, such as Bloomberg, to be forwarded to the calculation component 700, or a cash flow may be generated by the calculation component 700 if the cash flow is not received by ITAMS 10, this may be designated as "system generated cash flows."

A cash flow may be generated by the calculation component 700 through an algorithm by assessing investment lot and security attributes in the security profile. The amount and timing of most investments' cash flows can readily be mathematically derived from certain defined characteristics of the investment. Preferably, ITAMS 10 repeatedly requests a feed site 20 to attain a cash flow before resorting to generating cash flows internally. ITAMS 10 may support one or more predefined algorithms for generating cash flows, hereafter referred to as "shortcuts". If or when a security attribute is changed, the calculation component 700 will reanalyze the security to determine the appropriate cash flow shortcut to utilize. Cash flow amounts and dates may be manually entered by a user 5 and this shortcut may be designated "manual cash flows". Manual cash flows may include the use of a shortcut for the calculation component 700 to first populate a cash flow schedule and then allow for the user 5 to manually alter or supplement the cash flow schedule afterward. Prior to population of schedule cash flows by ITAMS 10 provides convenience to a user 5 than from entering each individual cash flow manually. As example, the calculation component 700 may generate system generated cash flows for a corporate bond from the following:
  i. issue date;
  ii. coupon rate;
  iii. interest payment month(s);
  iv. maturity date; and
  v. maturity value.

When a cash schedule is entered or edited, ITAMS 10 may notify the user 5 that a new yield and amortization schedule will be calculated as conducted within the calculation component 700 at schedule at step 725. The user 5 will be given a choice of having the calculation component 700 calculate the new yield and amortization schedule either: retrospectively or progressively. Calculating retrospectively would mean utilizing actual cash flows received from the purchase date and recalculating yield and amortization, and making any adjustment entries for later reporting. The retrospective calculation would be the default calculation for most investments under GAAP, SAP, and Tax accounting methodologies.

The calculation component 700 generates a yield in step 730 after calculating at step 725. Yield may typically be defined as the income return on an investment, including cash and non-cash components. The yield is derived by finding a rate that, when used to discount to present value, all expected cash flows from a lot (from purchase date to target date [maturity, call, or put date]), is equated from the present value of expected cash flows to the purchase price paid for on the lot.

The calculation component 700 will generate yield the same way for every investment based on either of the following: on the calculation from step 725 of cash flows provided in step 727; or from yields entered by a user 5. Yields might also be supplied for a given security from a feed site 20, which may override any calculation conducted by the calculation component 700 based on cash flows. Because the cash flows may vary by accounting method, the yields may vary as well. The following is a non-exhaustive list of events that may cause the computation or re-computation of a yield:

Outside acquisition (likewise Outside Portfolio Acquisition, Book of Business Acquisition, etc.)
  Impairment write-down (IOs)
  Intercompany trade
  Accretion
  Consent Fee
  Turning Off (On) Amortization
  Cash Flow Update
  Factor Based Paydown (IOs)—(not for tax)
  Factor Based Capital Interest—(not for tax)
  Mark-to-Market Adjustment
  Bifurcate Embedded Derivative—(not for tax)
  Esoteric Cash Flow Update and Yld—(not for tax)
  Book Value Adjustment
  Maintain Interest Rate—(not for tax)

The calculation component 700 will support periodic updates to the cash flows of, for example, an MBS security caused by changes in the expected prepayment rate. Such changes would automatically update cash flows either prospectively or retrospectively as may be specified by the user 5. The prospective approach processed by the calculation component 700 recognizes, through the recalculation of the effective yield to be applied to future periods, the effects of all cash flows whose amounts differ from those estimated earlier and the effects and changes in projected cash flows (effectively this method purchases the investment on a date at a price equal to the book value). Under the prospective method, the recalculated effective yield will equate the value of the investment to the present value of the anticipated future cash flows.

The recalculated yield is then used to accrue income on the investment balance for subsequent accounting periods. There are no accounting changes in a current period unless undiscounted anticipated cash flow is less than the value amount of the investment. The retrospective methodology processed by the calculation component 700 changes both the yield and the book value so that expected future cash flows produce a return on the investment equal to the return now expected over the life of the investment as measured from the date of acquisition. Under the retrospective method, the recalculated effective yield, processed by the calculation component 700, will equate the present value of the actual and anticipated cash flows with the original cost of the investment. The current balance is then increased or decreased to the amount that would have resulted had the revised yield been applied since inception, and investment income is correspondingly decreased or increased.

The calculator component 700 generates amortization for a particular investment in step 740 through calculation in step 725. For some investments, amortization is derived from the yield applied to the purchase cost. For each accounting method, an investment may be marked for calculating an amortization using either "effective interest," "straight-line," or "cost recovery" methods of accounting. Scientific calculation is the industry preferred amortization method for moving bond discount or premium from a balance sheet over to interest expense on an income statement. It is preferred over a straight-line method because it causes interest expense to be tandem with book value. ITAMS 10 also provides for straight-line amortization. If the straight-line model is chosen, the calculation component 700 may ignore cash flows and simply amortize the discount/premium/OID evenly over the remaining life of the investment. For example, commercial paper will be amortized using straight-line amortization. The calculation component 700 may be able to calculate amortization of any lot for any day of the month. Amortization may not be calculated for securities marked under the "cost recovery" method. The calculator component 700 may default to a scientific (or effective interest) calculation of amortization for all amortizable securities, except for security types like commercial paper and Asian options.

In some embodiments of the invention, the calculation component 700 is also capable of computing a yield from the amortization. In some embodiments of the invention, the calculation component 700 may comprise levers in which a user 5 can turn on or turn off calculating amortization in the event engine 600 for a period of time. In addition, the calculation component 700 may automatically turn off amortization, for example, when an impairment writedown event is processed or a user 5 turns off interest accruals. A user 5 may turn on amortization as deemed by the GAAP, SAP and Tax accounting rules.

Figure 22:
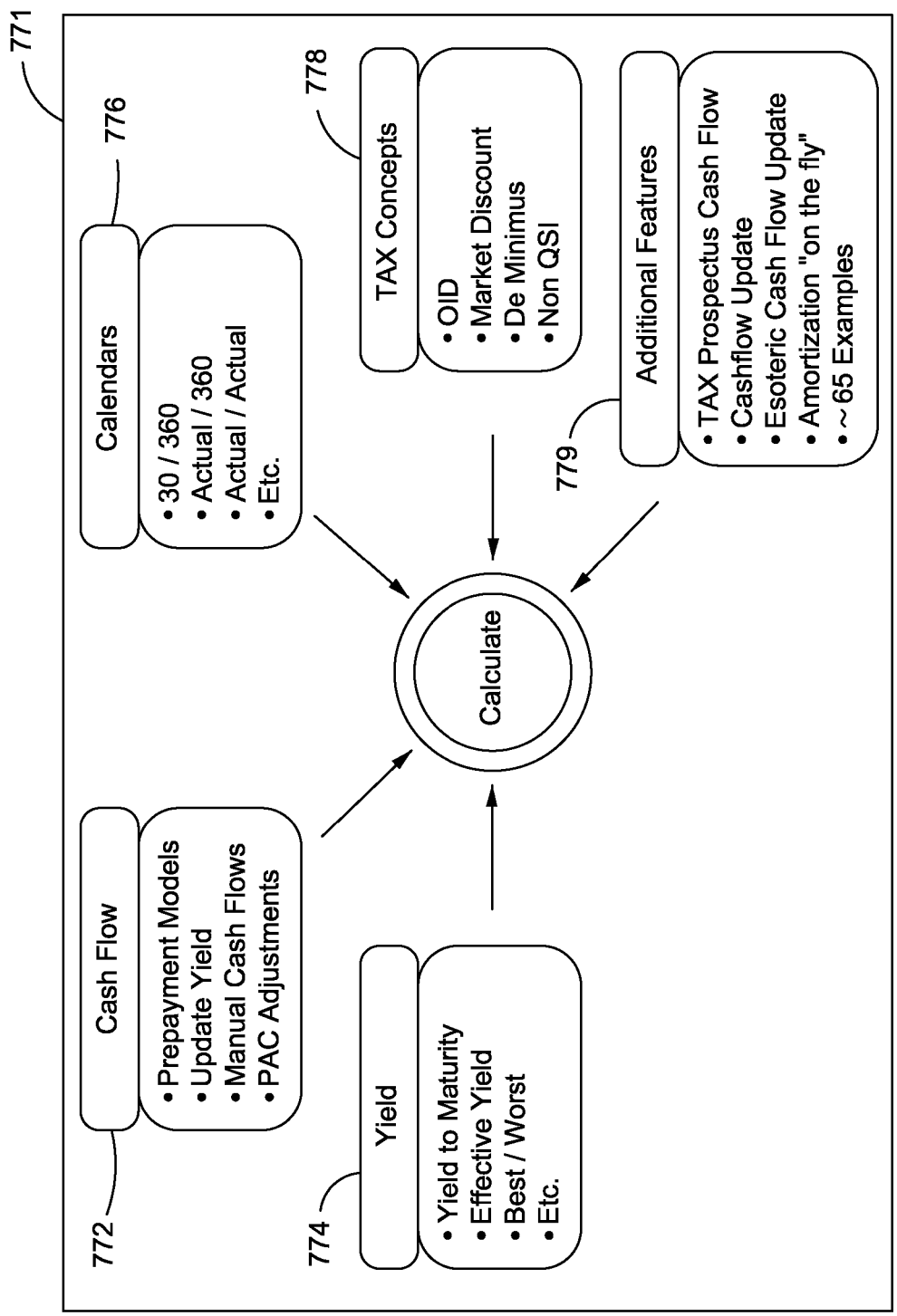
FIG. 22 shows various processing considerations when processing a security within the calculation component.

FIG. 22 shows various exemplary processing considerations for calculating yield and amortization within the calculation component 700 of the event engine 600. The calculation considerations table 771 includes various considerations for calculation which may include type of yield considerations 774, cash flow considerations 772, calendars for use considerations 776, tax concept considerations 778, and/or other additional considerations 779.

The various types of yield considerations 774 listed may be considered for calculation by the calculation component 700. For example, the yield may be a yield-to-maturity, meaning the calculated yield is an estimated future return for a fixed-interest security (e.g. a bond) assumed to be held until maturity with all principal and coupon payments made on schedule. The yield-to-maturity which, when used to discount to present value all expected cash flows from a lot (from purchase date to maturity date), equates the present value of expected cash flows to the purchase cost paid for the lot. Yield might also be calculated for best yield, calculated for best-case scenario assumptions or worst yield, for worst-case scenario assumptions. The effective yield (EFY) is the actual rate of return on the investment including the assumed reinvestment of cash flows and may be calculated by the calculation component 700. EFY is calculated using the following formula: $(1+Y)^N-1$, where Y=the periodic Book Yield (monthly, quarterly, semi-annual, annual) and N is the number of compounding periods in a year.

Various cash flow considerations 772 may be considered in calculating yield and amortization. As an example, manual cash flows supplied by a user 5 or feed site 20 may be considered for calculation as opposed to ITAMS 10 system generated cash flows. In another example, planned amortization class (PAC) adjustments may be considered, wherein PAC is a type of collateralized mortgage obligation with a predetermined principle paydown schedule that provides investors with more cash flow certainty for a more specific average life, meaning payment certainty at the expense of a lower yield for an investor.

Various calendar types for use 776 are listed as considerations for calculation of yield and amortization. For example, the interest calendar that is used to calculate interest income may be set by the calculation component 700. Amortization calendars may include 30/360, which may be the default for a user 5. Other calendars may include an actual/360, utilized on for example bank loans, or an actual/actual, utilized for U.S. Treasuries and notes.

Various tax concept considerations 778 are listed for considerations in calculation of yield and amortization. An original issue discount (OID) may be considered for calculation, meaning the difference between a stated redemption price at maturity and the issue price. Market discount might also be considered, meaning the difference between stated redemption price at maturity and purchase price. Another consideration is non-qualified stated income (non QSI), the difference between the original interest rate and the current interest rate for determining a portion of accrued interest paid.

Amortization on the "fly" may be an additional feature 779 as processed in ITAMS 10. Amortization on the "fly" is a feature for the user 5 to specify to ITAMS 10 to return amortized and accrued numbers as of the user 5 specified date, not just what has been recorded to the ITAMS 10 during, for example, a monthly amortization.

Referring again to FIG. 21, the cash flow, and/or generated yield or amortization is filtered for output in step 742 for one or more of the various accounting methodologies. The output may be considered, as for example: a GAAP calculated output 701; a SAP calculated output 702; and a Tax calculated output 703. GAAP may be used for a trade output 704. These outputs will be transmitted from the calculation component 700 to the rules handler component 800, as shown in FIG. 17.

Referring again to FIG. 17, the rules handler component 800 of the event engine 600 may transmit and receive information pertaining to an event of an investment to and from both the event handler component 650 and calculation component 700. GAAP calculated output 701, a SAP calculated output 702, and a Tax calculated output 703 are transmitted from the calculation component 700 to the rules handler component 800.

As described above, the event handler component 650 processes the real to business event mapping. The mapping is based on the application of rules under a particular accounting method as processed by the rules handler component 800. The rules handler component 800 defines a fixed and accounting method specific business rule for the mapping of the real and business events in the event handler component 650. Fixed rules are event rules which are not likely to change over time. Fixed rules are developed by the rules handler component 800, wherein the fixed rule is defined once for each business event type. The fixed rule is kept separately from the rules for any individual business event. For example, for an "outside buy stock" the tax holding date is always set to the trade date. By creating a single set of fixed rules for an "outside buy stock" business event type, the user 5 is guaranteed that the tax holding date will always be set to the trade date, even if multiple business events are defined to use slightly different business event rules. This ensures consistency while avoiding repetition of such rules in every set of business event rules. Each accounting method may define its own specific business methods based on the rules. Accounting method rules may be retrieved by the rules handler component 800 from the accounting rules database 247 (see FIG. 3).

A business event is compatible for mapping with a real event if the calculation component 700 is capable of processing the business event based on the attributes and information stored in the security profile for the event under the accounting method applied to the event. For example, the calculation component 700 is capable of processing a business event for a stock buy because the business event is mapped to the stock buy real event type having sufficient data for the calculation component 700 to process as a business event stock buy.

A user 5 may select from a list of predefined business event types to generate a business event for mapping to the real event by the event handler component 650. The user 5 may also select the business event rule for application to the business event by the rules handler component 800. The user 5 may be allowed to map a business event to a real event as long as either the business event is directly compatible with the real event. The event handler component may also include a converter (not shown) to convert the event message to a format as expected for processing by the calculator component 700. The converter may provide any missing pieces of data needed by the calculator component 700 in order to perform its calculations. For example, Outside Sell Stock & the Outside Buy Stock business events are not directly compatible with a Stock Exchange real event. However, the converter may convert the Stock Exchange event to an expected Outside Sell Stock & the Outside Buy Stock business event, making it possible for the calculation component 700 to process a Stock Exchange as a sequence of an Outside Sell Stock and an Outside Buy Stock. As the above example demonstrates, one real event type (e.g. Security Exchange) can be mapped to a sequence of two business events (e.g. Outside Sell Stock and Outside Buy Stock by ITAMS 10).

Figure 23:
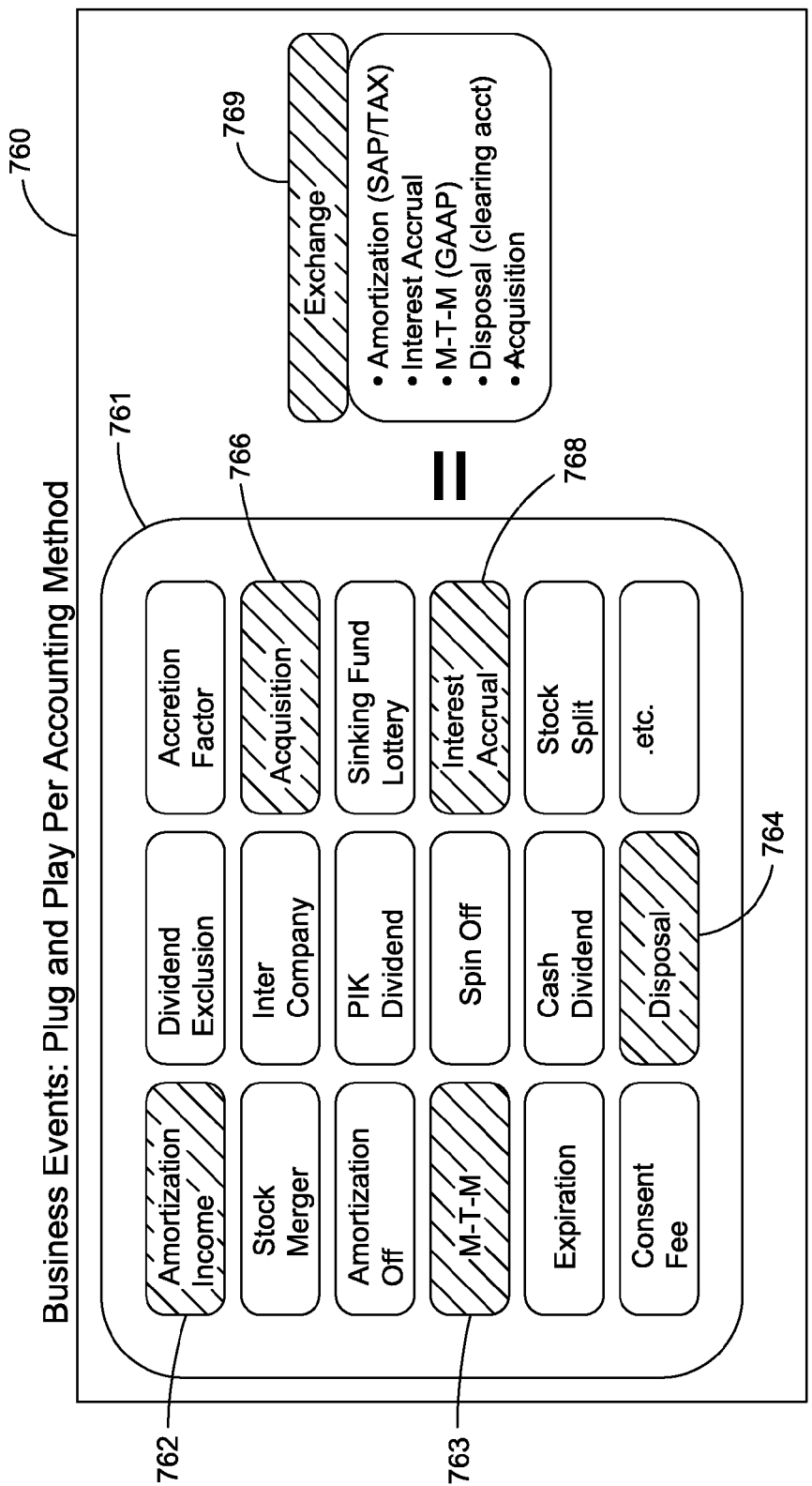
FIG. 23 shows an exemplary business event output in a plug-and-play accounting method table according to one embodiment of the present invention.

FIG. 23 shows an exemplary business event output in a plug-and-play accounting method table 760 according to one embodiment of the invention. For a given event entering the event engine 600, the user 5 may be presented with a business event selection table 761 for selecting various business events for a particular accounting method to be forwarded for processing at the calculation component 700. The shaded boxes indicate the selection of the various business events that a user 5 has chosen for calculation for a security for a real event. In this example, an amortization income 762, Mark-To-Market (M-T-M) 763, disposal 764, acquisition 766, and interest accrual 768 have been selected for calculation and the selections are listed under exchange 769 for further processing at the calculation component 700. In another embodiment, business event mapping to real events may be accomplished through a code change, and the system does not give the user the capability to directly select specific business event rules. Selections of specific business event rules may be made based on the security attributes selected. In some embodiments, the plug and play functionality may be predefined, and the user is not given the option to select business events when they are entering the real event. The business events are determined based on the security attributes defined for the investment, or by selections of specific values on the event. For example, a security can be set to account by Mark-to-Market processing within the security definition. In which case, when a real event, such as Outside Disposal, is processed it will use the Mark-to-Market business event. On an outside acquisition, a user can select a purchase intent of trading. If this is selected, GAAP accounting method may process this lot as mark-to-market even if the security processing flag is not set to mark-to-market. In this case for GAAP, the mark-to-market business event will be selected.

Referring again to FIG. 17, the calculated output from the calculation component 700 is forwarded to the rules handler component 800. GAAP calculated output 701 is transmitted to GAAP handling 802 and split between GAAP fixed rules 803 and GAAP business event rules 804. SAP calculated output 702 is transmitted to SAP handling 806 and split between SAP fixed rules 807 and SAP business event rules 808. Tax calculated output 703 is transmitted to Tax handling 810 and split between Tax fixed rules 811 and Tax business event rules 812. Trade calculated output 704 is transmitted to trade handling 815. As shown, the calculated output for a business event may be processed and outputted to at least one of any of the handlers shown in the rules handler component 800. The output of the GAAP, SAP, and Tax handlers in the rules handler component 800 may be further transmitted to the ledgers component 1100 (shown in FIG. 5) or the reporting component 1200 (shown in FIG. 5). The output of trade handling 815 is transmitted directly to the reporting component 1200 (shown in FIG. 5). Output from the rules handler component 800 may also be transmitted to the accounting maintenance component 900.

The relationship between the various accounting methods for a particular investment may be considered a form of "consolidation" (or "combination") of the investment. Processing for GAAP, SAP, Tax, and Trade with consolidation allows for the user 5 to review calculations for the investment as provided to the ledger component 1100 and/or reporting component 1200. Consolidation is the ability of ITAMS 10 to process a security, from a particular event, in one or more accounting methods. A user 5 may then compare calculations and reporting for an investment in any accounting method the user 5 chooses, including, one or more of: GAAP; SAP; Tax; and/or Trade.

Figure 24:
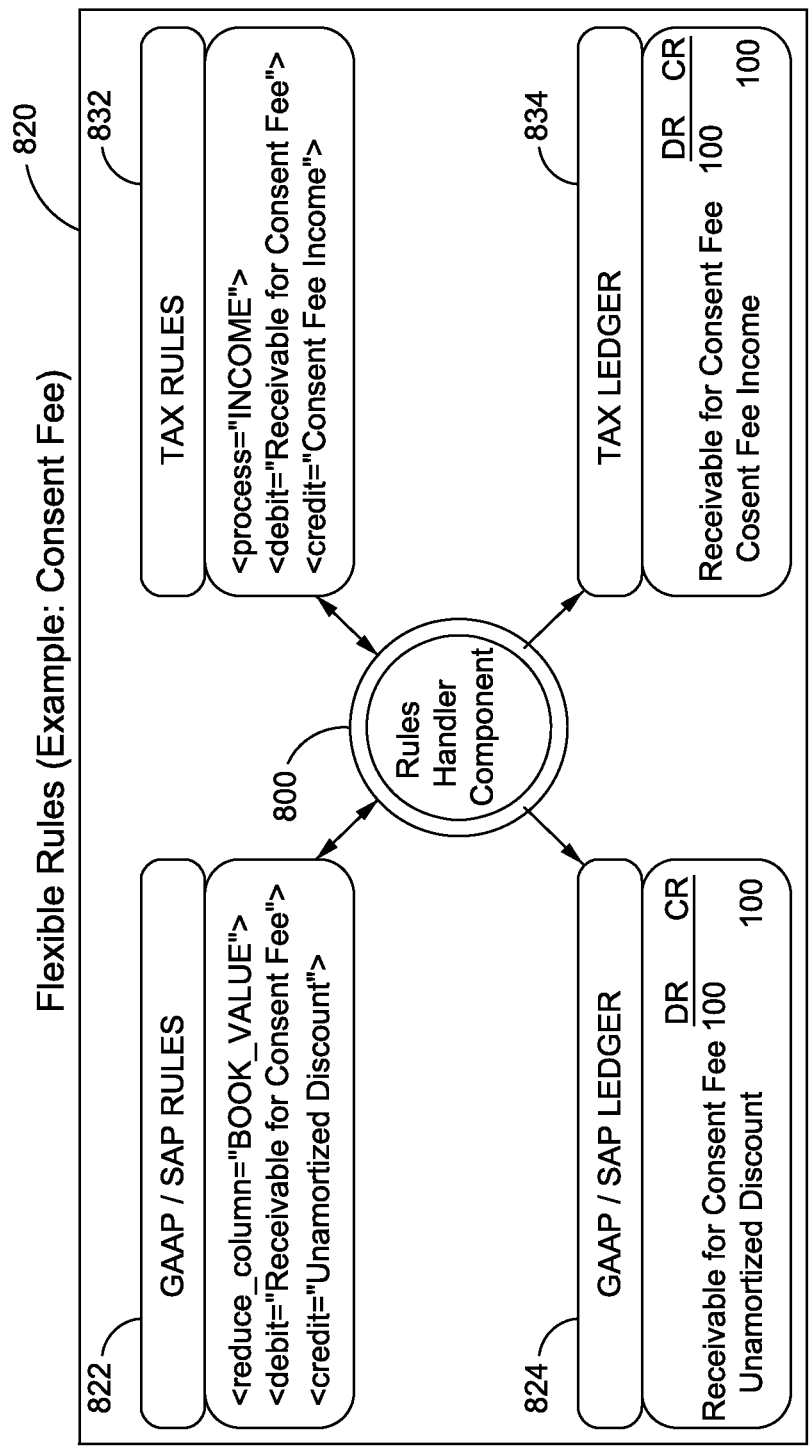
FIG. 24 shows a comparison of example outcomes for a consent fee under different rules as processed by the rules handler component of the event engine according to one embodiment of the present invention.

FIG. 24 shows a comparison example for outcomes under different accounting methods as processed by the rules handler component 800 in the event engine 600. The comparison for a consent fee 820 shows the flexibility of applying various rules to the same real event type resulting in perhaps different outputs to the ledger component 1100. In this example, a real event consent fee is processed under GAAP and SAP rules (same rules for GAAP and SAP accounting methods) and under Tax rules. The rules handler component 800 attributes processing of the consent fee by processing to a business type book value, wherein the debit of the security is mapped to a "receivable for the consent fee" business type and the credit is mapped to a "unamortized discount" business type as shown in the GAAP/SAP Rules application box 822. However, as shown in the Tax Rules application box 832, the rules handler component 800 attributes processing of the consent fee to an "income" business type, wherein the debit is considered a "receivable for the consent fee" business type and the credit is considered "consent fee income" business type. Subsequent output to the ledger component 1100 under the GAAP and SAP accounting method is reported in the GAAP/SAP ledger box 824 differing from the output under Tax accounting method as reported in the Tax ledger box 834.

The event engine 600 may be configured to provide for effective dating for an investment. Effective dating may be provided by the event handler component 650 in conjunction with the calculation component 700 and rules handler component 800. Effective dating may be defined as the integration of a particular event to a particular location on an investment timeline, e.g., not only the latest sequential event to the timeline. The user 5, or feed site 20, may provide an event to be added to a timeline that occurs earlier than those events already located on the timeline, and this may be termed a "back-dated event." Any attribute in a security or any event that has the potential to effect income, and may occur at an earlier date on the timeline, is effective dated by ITAMS 10. Effective dating ensures that the full financial effect of an event will be reported "as-of" a specific date, regardless of the date it occurred, or the date it entered the system.

ITAMS 10 associates events and any other changes affecting income to a date to allow for processing with effective dating. When changing security attributes of an investment and/or an event, the original information is stored in ITAMS 10 for accurate "as-of" reporting prior to the effective date of the change and certain back dated corrections or events may then be delayed by ITAMS 10 until a future date, so previously reported investment values aren't changed. This may be desired, for example, after an accounting method's investment ledger has been "closed" to prepare year-end reports and/or filings. Examples of changes which affect investment values include: The maturity date of a bond, which alters its amortization or entering a back dated trade from the prior year, affecting gains/losses, holdings and amortization processed by, for example, the event engine 600. The decision by ITAMS 10 to delay a change is made independently for each accounting method.

In effective dating, the event engine 600 may maintain a history of revisions to an investment timeline, including a revision number, reason for the revision (correction vs. new information), the date of the change, and the user ID if a user 5 entered the change. Using the system's effective dating features, the system will display the previous versions of a cash flow schedule and, if necessary, process or re-use an older version of a cash flow schedule if certain events are corrected and/or back dated.

The event engine 600 may process effective dating for each accounting method separately. The event engine 600 may identify and process all changes to the timeline of an investment caused by the event. The event handler component 650, calculation component 700, and rules handler component 800 replay the necessary processing and calculations to update outputs to the ledger component 1100 and/or reporting component 1200. In some embodiments of the invention, the event engine 600 may also provide information pertaining to the change and the effects from the change for notification to a user 5 or to supplement a report or ledger output.

A real event date is always the same date for all accounting methods. An event will also have an associated "effective date." The effective date is utilized by the event engine 600 to determine when the new financial value should take effect, in for example, reporting. The effective date determines the accounting date on which entries may appear in a ledger. Unlike a real event date, the effective date may differ for each accounting method.

For the preparation of reports and filing, ITAMS 10 designates for a given investment both an open period of reporting and a closed period of reporting. The open period of reporting is considered the current period wherein all current financial charges are occurring. The closed period is the time designated on the timeline of an investment wherein the declaration of financial values through reporting or ledgers have been finalized. The effective dating feature, processed in the event engine 600, provides for a financial affectivity in an open period when the real event otherwise had occurred in a closed period. For example, if the close of a reporting period occurred on March 31 and an event is entered on April 26, with a real event of March 29, then the event engine 600 may still process the event for reporting in the new open period even though the real event date is in the closed period. The event engine 600 would process the real event date for the event as March 29, in the closed period, but the effective date of the event would be considered by the event engine 600 as April 1, the first day of the open period for recording the event output in the ledger under any one of the various accounting methods. The event engine 600, or if the user 5 chooses, may set the effective date of the event to March 29 in the closed period, for re-reporting purposes. Re-reporting may be deemed necessary depending on the nature of the investment or the rules for reporting under particular accounting methods. The effective dating feature processed by the event engine 600 provides updated processing of an investment for all events and accurate calculations following the date of a particular event, regardless whether the event was placed on a timeline in a closed period.

Figure 25:
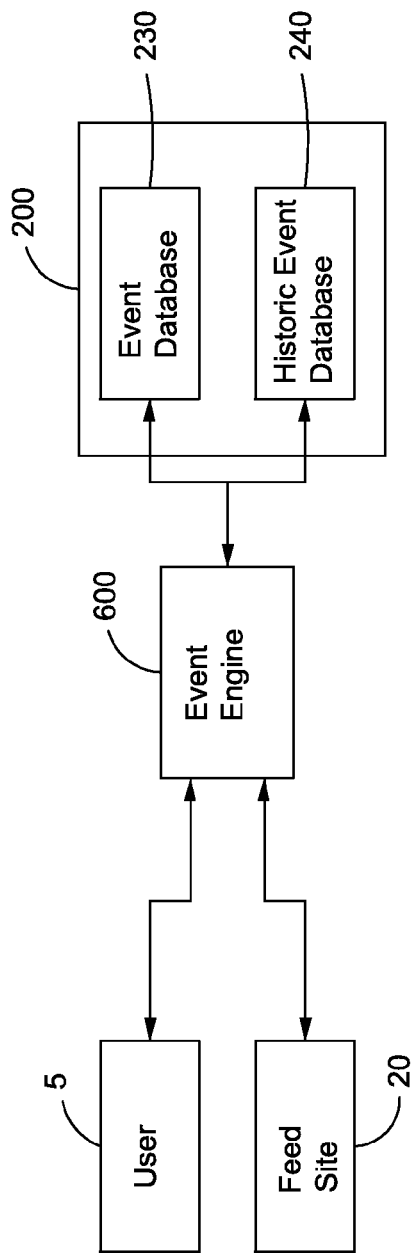
FIG. 25 shows a schematic of connections to and from the event engine according to one embodiment of the present invention.

The event engine 600 is capable of processing more than one event timeline for an investment. This allows for a user 5 to access various timelines for an investment before or after an event is applied to the timeline. FIG. 25 shows a schematic of interconnections between event engine 600, the feed component 300 and data storage device 200. The event engine 600 is capable of writing to and retrieving from both the event database 230 and the historic event database 240 in the storage device 200 of the ITAMS database server 150. The event engine 600 may also retrieve and/or provide information to external sources from the ITAMS 10, such as the user 5 or feed site 20. For every event added or removed from a timeline, as either supplied by a user 5 or feed site 20 or otherwise processed internally in the event engine 600, the event engine 600 updates the event timeline for that particular investment. The most current event timeline is stored in the event database 230. After the timeline is updated with a new event, the previous timeline, processed prior to the addition of the new event, is transmitted by the event engine 600 to the historic event database 240 for storage. Thus, a given investment may have one or more older timelines stored in the historic event database 240. This allows for the event engine 600 to recall any previous security timeline for effective dated internal processing or for user 5 review.

Figure 26A:
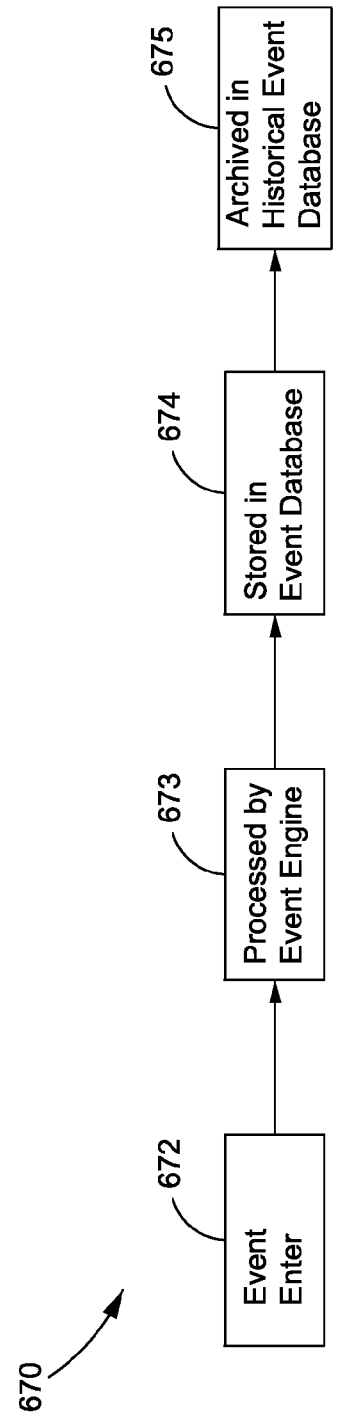
FIG. 26A shows a process for entering and storing a new event by the event engine according to one embodiment of the present invention.

FIG. 26A shows a process for storage of a new event by the event engine 600 according to one embodiment of the present invention. The new event storage process 670 begins as a new event enters the event engine 600 at step 672. The event engine 600 processes the event at step 673, as discussed above through the event handler component 650, calculation component 700, and rules handler component 800. The event may be transmitted by any component of the event engine 600, preferably the event handler component 650, to ITAMS database server 150 where the event is stored in event database 230 at step 674. The event, along with the timeline as impacted by and/or including the event is stored in the event database 230. A copy of the event and timeline impacted and/or including the event is transmitted to the historical event database 240 for archiving at step 675. Thus, each event occurring for a particular investment and the variations of timelines for every investment are archived in the historical event database 240.

FIG. 26B shows a process for event browsing and replay 680 according to one embodiment of the present invention. A user may request of ITAMS 10 to browse prior events occurring for a particular investment or an older version of an investment timeline as shown in step 682. The event engine 600 transmits the request from the user to search the historical event database 240 for the requested information in step 684. The particular event or a previous investment timeline is retrieved from the historical event database 240 in step 686. The previous investment timeline or event is then displayed to the user 5 for review in step 687. The user 5 can thus request replays from the event engine 600 to review event impacts on the timeline of an investment from the introduction of a first event to the timeline, through and including any subsequent event on a timeline, up to the last entered event on a timeline for a particular investment.

FIG. 26C shows the process overview for event backdating with event reversal according to one embodiment of the present invention. A backdated event process with event reversal 690 begins when a user 5 enters a backdated event into ITAMS 10 at step 692. The user 5 provides an event that may not be the next subsequent dated event on a timeline. In other embodiments of the invention, the feed site 20 might also supply the backdated event. The event engine 600, particularly the event handler component 650, processes the backdated event based on the real date of which the event occurred in step 693. In step 694, the event engine 600 retrieves an investment timeline from the historical event database 240. The event engine 600 may select a timeline from the event database 240 in which the backdated event would be the last dated event on that timeline. In other embodiments of the invention, the user 5 may specify which timeline the event engine 600 will retrieve from the historical event database 240 to see the impact of inserting that particular backdated event on that particular timeline for an investment. In step 695, the event engine 600 inserts the backdated event on the timeline retrieved from the historical event database 240. In step 696, the event engine 600 processes a timeline replay with the event inserted and calculates the cash flows, yield, and/or amortization (and other investment values) for the investment based on the updated timeline. As discussed above, the event handler component 650 preferably inserts the event on the timeline, the rulers handler component 800 defines the business event rules for the business events derived from the event interpreted by and mapped to the business events by the event handler component 650, and the calculation component 700 calculates the financial output according to the specified accounting method. The processed timeline for the backdated event is transmitted by the event engine 600 to the event database 230 in step 697. A copy of the timeline is transmitted to the historic database 240 in step 698 for archiving.

Referring again to FIG. 17, the event engine 600 may also include a what-if component 630. The what-if component 630 provides a user 5 with access to the event engine 600 for hypothetical event processing of a particular investment. The what-if component 630 is connected to the event handler component 650, calculation component 700, and rules handler component 800. For a particular investment, a user 5 may input a hypothetical event. A user 5 may input a hypothetical event to observe the impact to an investment anywhere along an investment's timeline. The what-if component 630 receives a hypothetical event from the user 5 (this could include adding, removing and/or changing something), along with user 5 provided instruction on which investment the hypothetical event applies, which timeline to implement the event (present timeline in the event database 230 or any timeline in the historical event database 240), and where on the specified timeline to insert the event. The processing of the investment timeline based on the event is conducted by the event handler component 650, calculation component 700, and rules handler component 800 at the instruction of the what-if component 630. The processed output for the investment timeline based on insertion of the hypothetical event is transmitted to the what-if component 630 and then transmitted from the what-if component 630 to the user 5 for review. The user 5 is provided with an option to store the investment timeline for the hypothetical event if the user 5 chooses to retain the results for later review. If the user 5 chooses to store the timeline with the inserted hypothetical event, the what-if component 630 stores the processed timeline for the hypothetical event in the supplemental information database 245. In other embodiments of the invention, the what-if component 630 may store the processed timeline for the hypothetical event in any other storage database, so as to not impact investment timelines stored for non-hypothetical events in the event database 230 or historical event database 240.

Referring again back to FIG. 5, the software engine storage component 140 may also include an accounting maintenance component 900. The accounting maintenance component 900 processes the security profile from the security profile component 400 and event information and calculations processed in the event engine 600 to compare and account for, for example, cash availability, payments made, inventory location and availability, etc. The accounting maintenance component 900 processes reconciliations for inventory and cash.

Figure 27:
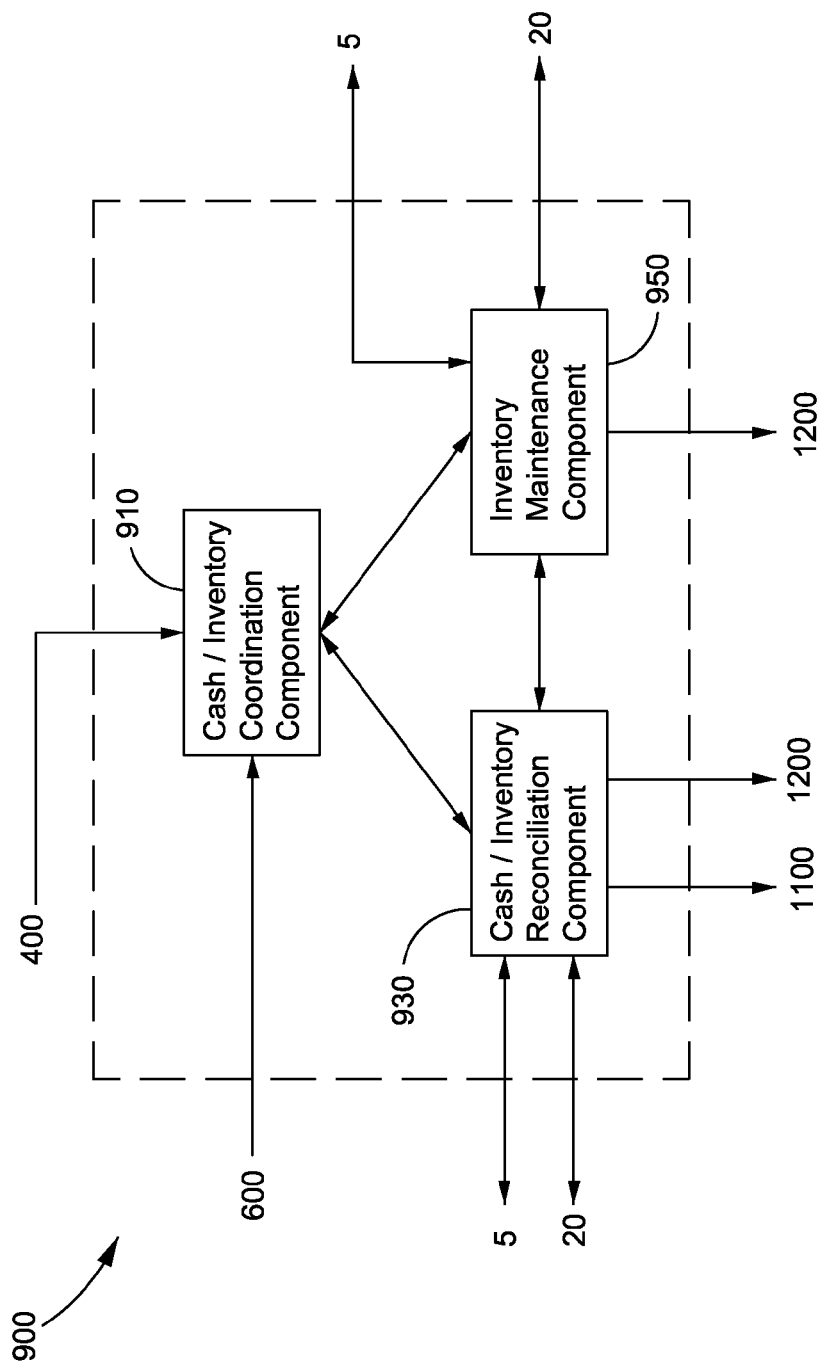
FIG. 27 shows a schematic of the accounting maintenance component according to one embodiment of the present invention.

FIG. 27 shows a schematic of the accounting maintenance component 900 of FIG. 5 according to one embodiment of the present invention. The accounting maintenance component 900, in many instances, is the processing component for reconciling cash and changes in inventory quantities during the lifespan of an investment, including during and after trades, redemptions, and capital changes are calculated in the event engine 600 and during or before reporting. The accounting maintenance component 900 includes a cash/inventory coordination component 910, a cash/inventory reconciliation component 930, and an inventory maintenance component 950. ITAMS 10 tracks the date an investment was last inventoried and reconciled.

Inventory reconciliation is the process of verifying that the holdings of each investment in a portfolio in ITAMS 10 match the actual security inventory where it is kept in a bank account or vault. When investment securities are purchased, they are inventoried by ITAMS 10 by one of two methods: physical—having possession of the physical security, usually in the form of a certificate or note safely stored in a vault; or book entry—having an electronic record of ownership maintained by, for example, a custodial bank.

ITAMS 10 provides a method of maintaining the location of all investments (e.g. Custodial Bank, BNY/MELLON, legal vault, etc.) on a security level (more than one location per portfolio is supported). ITAMS 10 may provide an inventory report for each portfolio, showing the location of the assets.

The cash/inventory coordination component 910 receives security profile information from the security profile component 400 and information pertaining to events and calculations for, as example, quantities adjusted for periodic redemptions from the event engine 600 pertaining to the particular investment. For every event occurring that is processed and calculated on by the event engine 600, the information pertaining to the event and/or the calculation may be transmitted to the cash/inventory coordination component 910. This event information is forwarded along with the relevant security profile processed and generated by the security profile component 400 to the cash/inventory coordination component 910. Based on the attributes and events, including lots of the particular investment, the cash/inventory coordination component 910 may determine what particular function shall be carried out by the accounting maintenance component 900. For example, cash may need to be reconciled for that particular investment so as to be properly located. Inventory is affected by changes in quantity due to redemptions and sales. Inventory may need to be reconciled for a particular investment so expected cash amounts for cash reconciliation will be proper. The cash/inventory coordination component 910 will transmit the security profile and processed events to the cash/inventory reconciliation component 930 for reconciliation of inventory. Security profile and event information determined by the cash/inventory coordination component 910 to be for inventory tracking and/or location, will be transmitted from the cash/inventory coordination component 910 to the inventory maintenance component 950.

The cash/inventory reconciliation component 930 and inventory maintenance component 950 may transmit information between each other based on the various processing conducted by each component. For example, cash reconciled by the cash/inventory reconciliation component 930 for a particular security may be processed by the cash/inventory reconciliation component 930 only after requesting and receiving information pertaining to inventory location or inventory availability provided by the inventory maintenance component 950 for the same investment.

The cash/inventory reconciliation component 930 performs the process of reconciling the actual cash items of all bank accounts that hold investments to the expected cash amounts for trades, income, and expenses of the investments as processed by ITAMS 10 for those same accounts. ITAMS 10 may support multiple bank accounts for a single portfolio. The cash/inventory reconciliation component 930 may support two sources of cash items to reconcile: those cash items from a feed site 20, such as the Custodial Bank (e.g., BNY Mellon) Daily Cash Activity Feed, which is a daily feed file provided by Custodial Bank listing all cash activity of an account for the prior date; and from manual cash items from a user 5 or even from a some banks for entering cash receipts including processing corrections and unidentified cash items. Actual cash item information may be held in book entry form in, for example, a Trading Custodial Account (e.g., Custodial Bank). However, some direct placement type investments may be held in physical form in, for example, a company's vault (at the company office or at a bank). The cash/inventory reconciliation component 930 will reconcile cash items directly generated from activities such as trading and investment of an investment. The cash/inventory reconciliation component 930 may reconcile each cash reconciliation entry under all applicable accounting methods for a portfolio, including GAAP, SAP, and Tax.

The cash/inventory reconciliation component 930 may predict expected trades, income, and expenses of investments and thus, an expected cash amount for a given investment based at a particular point on an event timeline for the given investment. The cash/inventory reconciliation component 930 matches an actual cash item for an investment with the expected cash item for that investment. Matching the actual cash item to the expected cash item is critical to performing a correct comparison. The cash/inventory reconciliation component 930 compares actual cash item information for a particular investment, usually supplied by a feed site 20 or a user 5, with the expected cash amount after the cash/inventory reconciliation component 930 makes the match. The cash/inventory reconciliation component 930 may then determine whether the difference between the actual and expected cash items are within an acceptable tolerance as either specified in ITAMS 10 or by the user 5. If the difference is within the tolerance, then the cash/inventory reconciliation component 930 may proceed to output the actual cash item, predicted cash item, and/or differences to the ledger component 1100 or directly to the reporting component 1200. When the difference is out of tolerance, the cash/inventory reconciliation component 930 may still proceed to output actual cash item, predicted cash item, and/or differences to the ledger component 1100 or directly to the reporting component 1200 with a notification that the differences are out of tolerance. If the difference is out of tolerance, the cash/inventory reconciliation component 930 may also notify the user 5 through the web browser 3. ITAMS 10 may process differences daily, or more or less often, and update the ledger component 1100 to apply all appropriate ledger entries to record the reconciliation of receivable/payable items to cash received.

The inventory/cash reconciliation component 950 may process a number of cash item types including:

Incoming Cash
1. Outside Disposal Proceeds—Cash received on settlement of a sold security. Example: Broker Commissions and SEC fees may have been deducted from the gross proceeds of public equity sales.
2. Tender Offers—Similar to an Outside Disposal, but a Consent Fee may also be received.
3. Maturity and Redemption Proceeds—Cash received from a security redemption (e.g. a bond that matures, or a Sinking Fund Payment).
4. Principal Paydowns—Cash received for the principal debt of an investment (e.g. MBS/ABS securities).
5. Interest—Cash Interest income received from an interest bearing security or loan.
   Example: Custodial Bank receives the cash for the Interest coupon amount less the compensating interest. (For some MBS securities, a percentage of the coupon rate may be deducted from the interest as a servicing fee.)
6. Premium Tax Credit Partial Payment for Interest and/or Principal—Some or no cash may be received for the interest and/or principal receivables of these securities. The remaining interest and/or principal receivables balance will be offset by recording the remaining receivable amount to Premium Tax Clearing ledger account.
7. Cash Dividends—Cash received for dividends of an equity security.
8. Intercompany Sale Settlements—Cash received for an "Intercompany Sale", where cash will be received as settlement of a security traded between affiliated companies.
9. Consent Fee/Commitment Fee—Cash received as a payment of a Consent or Commitment Fee. Generally, the cash is not identified with enough detail to automatically reconcile these cash items.
10. Cash in Lieu of Fractional Share—Cash income received in lieu of a fractional share resulting from a Capital Change (e.g. a Stock Split or Spin-Off).
11. Cash received with Capital Changes (also referred to as TAX Boot)—Cash received for an event, such as an Exchange or Stock Merger that is not considered a Consent Fee or Cash in Lieu of Fractional Share.
12. Factor Adjustment—Cash received on settlement of an updated Trade factor for a "Has Factor Based Paydowns" security (due to a Day Delay).
13. Coupon Adjustment—Cash received on settlement of an updated Trade factor for a "Has Factor Based Paydowns" security (due to a Day Delay).
14. Unmatched Interest and Principal Payments—Investment income or principal received that need to be disregarded from the Custodial Bank Daily Cash Activity feed and re-allocated by the user 5.
15. Unidentifiable Interest and Principal Payments—Investment income or principal received, but not clearly identified in the Custodial Bank Daily Cash Activity feed (e.g. Fee reversal, etc.). To reconcile these items, an authorized user 5 may identify the associated security and the reason for the payment.

Outgoing or Withheld Cash
16. Outside Acquisition Costs—Cash paid as settlement of a purchased security.
    Example: Broker Commissions may be added to the cost of a public equity security purchase.
17. Wire Transaction Fees—A withheld transaction fee charged by the Special Deposit Custodial bank for wiring income to the Custodial Bank account.
18. Factor Adjustment—Cash paid on settlement of an updated Trade factor for a "Has Factor Based Paydowns" security (due to a Day Delay).
19. Coupon Adjustment—Cash paid on settlement of an updated Trade factor for a "Has Factor Based Paydowns" security (due to a Day Delay).
20. Unidentifiable Funding and Expenses—Investment amounts paid, but not clearly identified in the Custodial Bank Daily Cash Activity feed. To reconcile these items, an authorized user 5 may identify the associated security and the reason for the outgoing amount. The cash item may then be corrected by the user 5 to add the missing information.

The cash/inventory reconciliation component 930 may directly receive investment and event information pertaining to the security from the cash/inventory coordinating component 910 when an event occurs. The cash/inventory reconciliation component 930 may predict or adjust predictions for expected cash item for the particular investment. Actual cash item information previously received by or cash item information to be received by the cash/inventory coordinating component 910 will then be compared to the expected cash item. This process is continuous. The cash/inventory reconciliation component 930 may receive cash item information daily, hourly, or by the minute. As the cash/inventory reconciliation component 930 receives the cash items, the cash/inventory reconciliation component 930 processes and updates the predictions for the expected cash items, and then compares the expected cash items to the actual cash items.

The cash/inventory reconciliation component 930 may receive actual cash items and information from a feed site 20, such as on the Custodial Bank Daily Cash Activity feed, through the feed component 300. When the cash/inventory reconciliation component 930 receives cash information, the cash/inventory reconciliation component 930 may forward the cash information to the cash/inventory coordinating component 910. The cash/inventory coordinating component 910 relays the cash information to the security profile component 400 and event engine 600. If, for instance, an actual cash item pertains to cash received to paydown interest, then the received information is forwarded to the event engine 600 to be processed as an event. The security profile component 400 receives the cash information to link the correct security profile to the appropriate real event based on the actual cash item for process at the event engine 600. The security profile and the updated event information, as processed by the event engine 600, are relayed back to the accounting maintenance component 900 for process by the cash/inventory reconciliation component 930.

Reconciliation entries in the cash/inventory reconciliation component 930 may be derived from the event type, which also may be described as the cash reconciliation reason, being reconciled, along with the security profile to which the event applies. The cash/inventory reconciliation component 930 may associate expected payable/receivable amounts to the cash reconciliation reason and date for the expected payment or receipt of cash.

Depending on the cash reconciliation reason or the type of event, the cash is expected to be paid/received on a specific date referred to as the expected date (e.g. the Settlement Date of a trade). Cash may not be considered overdue by the cash/inventory reconciliation component 930 until that date has passed. Depending on the cash reconciliation reason, the cash item paid/received on a given date may be the result of a single event or multiple events. For example, a single cash item may be an amount that represents the sum of multiple receivable/payable ledger entries from multiple events, and multiple lots. Supported cash reconciliation reasons may include:

1. Trade Settlement—The payment made for an acquired security, or the receipt of cash for a sold (disposed) security.
2. Factor or Coupon Adjustment—The payment or receipt of cash for a factor adjustment or a coupon adjustment of a trade of a "Has Factor Based Paydowns" security (due to a day delay).
3. Redemption—The receipt of cash for an issuer payment of all or a portion of the outstanding principal.
4. Capital Change—The receipt of cash resulting from a capital change of the security.
5. Income—The receipt of income from an issuer as a payment of interest (a coupon payment), dividend, consent fee, commitment fee, or partnership income.
6. Premium Tax—The receipt/credit for all or a portion of the outstanding interest and principal receivables.

If a cash item is received by the cash/inventory reconciliation component 930, as for example, from the Custodial Bank Daily Cash Activity feed, and after forwarding to the security profile component 400 the cash item could not be associated with a specific investment, then the cash/inventory reconciliation component 930 will record the cash item as 'suspense' for storage in the ITAMS database server 150 in an for example the supplement information database 245. A user 5 may then request access to the cash item, recorded to 'suspense' and investigate the reason for the cash item. The user 5 may then manually assign the suspense cash item to a particular investment.

The cash/inventory reconciliation component 930 may also record 'suspense' for a cash item matched to an expected cash item, but the actual amount differs from the expected amount by more than the acceptable tolerance, such that the entire cash amount will be recorded as suspense. In all situations where an actual cash amount cannot be matched to an expected amount, the cash/inventory reconciliation component 930 may produce an exception report entry. The exception report entry may include the non-identifiable cash item reason, as for example, "an unknown cash receipt or payment." The exception report entry may also include whether and how much the actual cash item amount differs from what was expected, even if within a specified tolerance level. The exception report entry may also include, for example, whether the creditor made a payment that was not expected. When processing a cash item from, for example, the Custodial Bank Daily Cash Activity feed, the cash income or redemptions from an investment are identified as principal in default, interest in default, or bankruptcy, then the cash/inventory reconciliation component 930 may record the item as suspense and generate a cash reconciliation exception report reporting a warning.

A user 5 may be able to reconcile items recorded as suspense by manually entering corrections to the cash item, which may generate a new real event for processing through the event engine 600. However, effective dating processing may not be utilized since cash reconciliation, as for example, with open receivables or payables, is only processed by the cash/inventory reconciliation component 930 for current balances.

When a cash reconciliation event is processed by the cash/inventory reconciliation component 930, it is transmitted to the ledger component 1100 for recording in an investment ledger for a portfolio on the date of the cash reconciliation. The cash/inventory reconciliation component 930 may use the accrual method for accounting, where investment income becomes a receivable at the time the income is due or is earned. At that time, it is outputted from the cash/inventory reconciliation component 930 to the ledger component 1100 for recording into the investment ledger as income and a receivable is automatically set up for the income item. For cash reconciliation, receivables and payables recorded to the ledger are not considered "open" until they are due for payment. The cash/inventory reconciliation component 930 may determine whether only a portion of an open payable or receivable will be expected for a bank account due to multiple inventory allocations. If the reconciliation of a prior reconciled item is reversed, the cash/inventory reconciliation component 930 will consider all of the associated payable(s)/receivables "open" again.

Within a portfolio, a cash reconciliation event will be initiated for a specific investment with an amount specified as principal and/or income (e.g. Interest, Dividend, etc.). The specified amounts may be matched to receivables/payables as follows:

| How Specified By Custodial Bank | Ledger Accounts in ITAMS to Match |
|---|---|
| Principal (& Income for a Disposal) | Receivable for Securities |
| Principal or Income | Receivable for Consent Fee |
| Principal | Receivable for Fractional Share |
| Principal or Income | Receivable for Commitment Fees |
| Principal & Income | Receivable for Capital Change |
| Income | Accrued Interest Receivable (and for a TAX Step-up: Receivable for Non-Qualified Stated Interest) |
| Income | Accrued Prepaid Interest (and for a TAX Step-up: Receivable for Non-Qualified Stated Interest) |
| Income | Dividend Receivable |
| Principal (& Income for an Acquisition) | Payable for Securities |

FIG. 28 shows an exemplary screenshot for entry of a cash reconciliation item according to one embodiment of the present invention. When a cash reconciliation entry is received from a feed site 20 by the cash/inventory reconciliation component 930, the cash/inventory reconciliation component 930 provides a user 5 with a cash reconciliation entry screen 932 for review. The user 5 is provided with the cash reconciliation entry screen 932 for the particular cash reconciliation entry 934, also providing the cash reconciliation date. Under the open and unapplied payables/receivables box 936, the user 5 is provided with a trade settlement event type 937 occurring on the reconciliation date and income 938 for the investment.

The cash/inventory reconciliation component 930 will support reversals of reconciled items. At times, a feed site 20, such as Custodial Bank, may reverse an amount and post a corrected amount. Examples of this may include a reversal for a creditor in default, where an adjustment is posted by Custodial Bank when the creditor did not make an expected payment on a debt security, principal or interest. The cash/inventory reconciliation component 930 may update and process an event based on the reversal supplied by, for example, Custodial Bank.

FIG. 29 shows an exemplary screenshot of a confirmation screen for a cash reconciliation reversal item 940, according to one embodiment of the present invention. When a reversal is received from a feed site 20 by the cash/inventory reconciliation component 930, the cash/inventory reconciliation component 930 notifies a user 5 of the reversal. In some embodiments of the invention, the user 5 may have provided the reversal, as opposed to a feed site 20. In either event, the user 5 is provided with a confirmation screen for the reversal item 940 for the particular cash reconciliation entry 934. Under the open and unapplied payables/receivables box 936, the user 5 is shown an unapplied user item 939 for income of 12,079.20 from Custodial Bank. The user 5, reviewing this screenshot may simply select the box next to this item to confirm that this particular event may be reversed out.

Referring again to FIG. 27, the inventory maintenance component 950 identifies where an investment is held (the inventory location). Security profile and event information determined by the cash/inventory coordination component 910 to be for inventory tracking and/or location may be transmitted from the cash/inventory coordination component 910 to the inventory maintenance component 950. The inventory maintenance component 950 may transmit inventory information and inventory processing output back to the cash/inventory coordination component 910. The cash/inventory reconciliation component 930 and inventory maintenance component 950 may transmit information between each other. The inventory maintenance component 950 may receive inventory related information from either the user 5 or feed site 20 and transmit inventory related information to either the user 5 or feed site 20.

Figure 30:
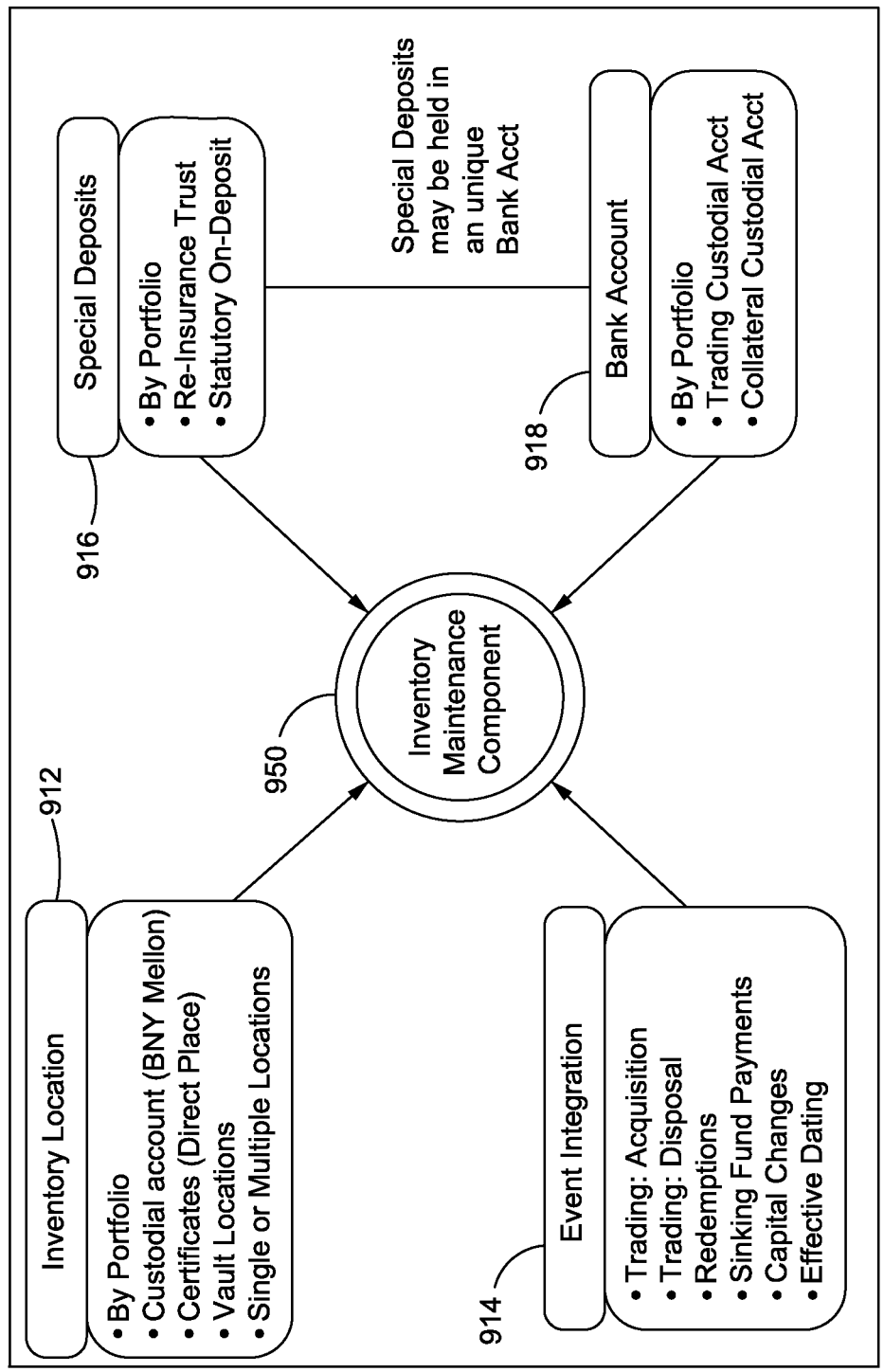
FIG. 30 shows various considerations for processing inventory in the cash/inventory maintenance component.

FIG. 30 shows a diagram of various considerations for processing inventory in the inventory maintenance component 950 (shown in FIG. 27). The inventory maintenance component 950 processes the particular inventory location for a security, wherein several examples are listed under the heading inventory location 912 in FIG. 30. The inventory maintenance component 950 also accounts for any special deposits 916, such as by portfolio or statutory on-deposit that may be held in a unique bank account such as those listed under the heading for bank account 918. The inventory maintenance component 950 also provides for event integration 914, wherein particular events, as provided by the event engine 600, result in adjustments made by the inventory maintenance component 950.

Referring again to FIG. 27, the inventory maintenance component 950 will initialize to and/or default to identify an inventory location for the trading quantity of any investment by the identified portfolio default trading custodial account (typically a Custodial Bank Custodial Account). Physical securities may be held in any Custodial Bank Trading Custodial account, which may be included in the Custodial Bank inventory file. Typically, physical securities may be held in a company vault. If a trading quantity of a direct placement security for a portfolio is not held in the default physical location, a user 5 may manually designate the trading quantity to the correct inventory location. If a trading quantity of a security for a portfolio is not held in a default trading custodial account or the direct placement physical location, a user 5 may manually designate the correct location.

The inventory maintenance component 950 may categorize portfolio bank accounts relating to inventory locations as follows:

1. Default Trading Custodial Account—The portfolio bank account used as the default for trading purposes, where investments are held and acquisitions and disposals are settled. If for example this is a Custodial Bank account, the account will also hold any applicable "S-CUSIPs" (securities held at a Custodian that is a Non-Custodial Bank, but "Represented by Receipt" (RBR) with Custodial Bank).
2. Non-Default Trading Custodial Account—The portfolio bank account that is not the Default Trading Custodial Account (may or may not be at Custodial Bank) used for trading purposes, where investments are held and acquisitions and disposals are settled.
3. Collateral Custodial Account—A portfolio bank account used to hold investments separate from the Trading Custodial Account. Securities in this account are typically used for a special purpose such as Statutory Deposit or Reinsurance. In many instances, these investments are sometimes referred to as "Securities Held in Trust".

The inventory maintenance component 950 may allot a trading quantity, or lots, of a security within a portfolio to be allocated to more than one inventory location at a time.

A user 5 may be able to create physical locations for recognition by the inventory maintenance component 950. A user 5 may be able to verify the inventory count in physical locations or bank locations not automatically reconciled by the cash/inventory reconciliation component 930. The user 5 may manually designate the trading quantity of the securities held in a non-default physical location. The user 5 may manually move an investment from one physical location to another physical location or from a bank location to a physical location. If user 5 wants to designate a quantity of a direct placement investment to a non-default physical location, the user 5 may first reduce the quantity in the default physical location and then increase the quantity in the non-default physical location. For securities held in custodial bank locations, user 5 may manually designate the trading quantity of the securities held in a non-default custodial bank location.

At any time, the inventory maintenance component 950 may calculate exact inventory for the default trading custodial account by totaling up the trading quantity and quantity of all lots for the particular portfolio, and then subtract the trading quantity from quantity designated at other locations (e.g. a vault). Trading quantity/location designations entered and processed by the inventory maintenance component 950 may be effective dated. The inventory maintenance component 950, in conjunction with the cash/inventory reconciliation component 930, automatically reconciles locations of held lots of securities based on the location designated for lots of a security by comparing with location information pertaining to the security lots from, for example, a feed site 20. For locations not automatically reconciled, the inventory maintenance component 950 records and stores in the ITAMS database server 150 in, for example, the supplemental information database 255, an inventory reconciliation history (audit trail) of securities manually reconciled. An inventory reconciliation history may provide, but is not limited to the following information:

1. Last Inventory Date: This is the date that the Trading Quantity in ITAMS 10 was last compared/confirmed by the inventory maintenance component 950 against the Physical Location Inventory Statement's or Bank Statement's Trading Quantity, as provided for through the feed site 20.
2. Actual Count: This is the Trading Quantity and Quantity (Current Face) found in the location, if it is different than the Trading Quantity and Quantity (Current Face) specified by the inventory maintenance component 950.
3. Verification: This indicates whether the actual count matched the Trading Quantity and Quantity (Current Face) found in the inventory maintenance component 950.
4. User Details: This is the user ID information pertaining to the user 5 that verified the Trading Quantity.
5. Initial System wide Physical Locations: This is a listing of physical locations identified for storage of the quantity, such as Legal Vault, Portfolio's Corporate Vault, Custodial Bank Vault, Other Bank Vaults. A user 5 with authorization may establish any other physical locations as needed.

The inventory maintenance component 950 may adjust for events effecting securities in locations. For example, the following effect from events may apply only to securities in a physical location or a non-default trading custodial account including:

1. Disposal and Redemptions (Pro-Rata)—When events are processed as "Pro-Rata," meaning that the disposal is applied proportionately across all lots, the inventory maintenance component 950 will reduce the trading quantity proportionately from all of the inventory locations (including any special deposit locations) based upon the portion (percentage) of quantity that has been disposed from the security in the portfolio.
    For Example: If 1,000 shares of AT&T Common Stock are held by Portfolio ABC in three different locations as described: 1) Custodial Bank Custodial Account "AAA111" holds 500 quantity, 2) Physical Location Provident Vault holds 300 quantity, 3) Special Deposit Location "Statutory Deposit of OH" holds 200 quantity, then the inventory maintenance component 950, in conjunction with the event engine 600 processes a Sinking Fund Payment as a "Partial Pro-Rata" event. The amount disposed for portfolio ABC is 600 quantity, which represents a percentage of 60% of the holdings for AT&T Common Stock at portfolio ABC. As a result of this, the inventory maintenance component 950 will reduce the quantity holdings in each of the locations as follows:
    a. Custodial Bank Custodial Account "AAA111" is reduced by 60% (300 quantity) and the result of the event will leave the holdings at 200 quantity,
    b. Physical Location Provident Vault is reduced by 60% (180 quantity) and the result of the event will leave the holdings at 120 quantity,
    c. Special Deposit Location "Statutory Deposit of OH" is reduced by 60% (120 quantity) and the result of the event will leave the holdings at 80 quantity.

2. Disposal and Redemptions (Entire Trading Quantity for the portfolio)—The inventory maintenance component 950 will reduce the Trading Quantity of the "From" side or selling portfolio in all of the inventory locations (default trading custodial, non-default trading custodial, and collateral accounts including special deposits accounts) to zero for the portfolio where the entire Trading Quantity is disposed or voluntarily redeemed. The inventory maintenance component 950 will automatically update all inventory location quantities.
    For Example: 1,500 shares of AT&T common are held in portfolio EFG in physical location "Legal Vault." That may constitute the entire holdings of AT&T common for the financial institution. As a result of an Intercompany Trade, 1,500 shares of that security are sold to portfolio JKL. As an effect of this event, the inventory maintenance component 950 will reduce the 1,500 shares of the AT&T common from the "Legal Vault" for the portfolio EFG and increase the Trading Quantity in the Default Trading Custodial Account for portfolio JKL by 1,500 shares of AT&T Common (publicly traded security).

3. Disposal and Redemptions (Partial Disposal for security held in single inventory location)—The inventory maintenance component 950 will reduce the Trading Quantity of the "From" side in the Inventory Location for the Portfolio where a portion of the Trading Quantity is disposed or voluntarily redeemed and the Trading Quantity of the security in the Portfolio is held in a single location. The inventory maintenance component 950 will automatically update the Inventory Location Trading Quantity.
    For Example: 1,500 shares of AT&T common are held in portfolio EFG in Physical Location "Legal Vault." That constitutes the entire holdings of security AT&T for the financial institution. As a result of an Intercompany Trade for a portion of Trading Quantity, 500 shares of that security are sold to portfolio JKL. As an effect of this event, the inventory maintenance component 950 will reduce the 500 shares of the security from the "Legal Vault" and increase the Trading Quantity in the Custodial Bank Default Trading Custodial Account for portfolio JKL by 500 shares of AT&T Common (publicly traded security).

4. Disposal and Redemptions (Partial disposal for security held in multiple inventory locations)—If a portion of the Trading Quantity is disposed or voluntarily redeemed and the Trading Quantity of the security in the Portfolio is not held in a single location, an authorized user 5 may update the Trading Quantity on the Inventory Location maintenance screens.

If the Capital Change type event alters the entire trading quantity, the inventory maintenance component 950 will automatically update all inventory location quantities (Default Trading Custodial, Non-Default Trading Custodial, and Collateral Accounts including Special Deposits accounts). Capital changes include events such as Stock Split, Exchanges, Conversions, Stock Mergers, Spin Off and Dividend events such as Stock and PIK dividends and Interest Events such as PIK Interest for corporate and Z Tranches. For example, if 1,500 shares of AT&T common are held at portfolio of a financial institution in location "Legal Vault," that constitutes the entire holding of AT&T common for the financial institution. A 2-for-1 Stock Split event is executed resulting in 3,000 shares of the stock. As an effect of the event, the inventory maintenance component 950 will record the additional 1,500 shares, a total of 3,000 shares of AT&T common for portfolio a financial institution are now held at the "Legal Vault" location. If the Capital Change type event alters a portion of the Trading Quantity ("From" side) and the Trading Quantity of the security in the portfolio is held in a single location, the inventory maintenance component 950 will automatically update the entire Inventory Location Trading Quantity. If the Capital Change type event alters a portion of the Trading Quantity ("From" side) and the Trading Quantity of the security in the Portfolio is not held in a single location, an authorized user 5 may update the accurate Trading Quantity on the Inventory Location maintenance screens.

Referring again to FIG. 5, the ledger component 1100 processes and prepares the ledger for a particular investment. A ledger is typically a listing of debits and credits for a particular investment. In ITAMS 10, the ledger is processed by the ledger component 1100 in real-time. The ledger component 1100 communicates with the event engine 600 and updates the ledger for calculations conducted by the event engine 600 based on events occurring over the life of the investment. The ledger is updated by the ledger component 1100 for an investment under a particular accounting method. For example, the event engine 600 provides calculations for as investment, based on an event, under GAAP, SAP, or Tax as processed through the rules handler component 800 for output to the ledger component 1100. The ledger component 1100 also communicates with the accounting maintenance component 900 and updates the ledger based on cash reconciliation and/or inventory maintenance processed by the accounting maintenance component 900.

The ledger component 1100 tracks accounting for an investment at the lot level. The ledger component 1100 may update the ledger for an event that affects the financial value of an investment. This provides an easy-to-understand ledger for a user 5 to review and utilize. The ledger component may provide a ledger to the reporting component 1200 for reporting purposes.

The reporting component 1200 provides a user 5 with various means for reviewing ledgers and/or reports, generated for an investment, portfolio or security. The reporting component 1200 may receive ledgers from the ledger component 1100 pertaining to an investment accounted for under GAAP, SAP, or Tax. The reporting component 1200 may also receive an investment processed under the investment group for Trade directly from the event engine 600. In other embodiments of the invention, the event engine 600 may also provide output for a processed investment under GAAP, SAP, or Tax directly to the reporting component 1200.

Reports may provide a user 5 with up-to-date financial calculations for a given accounting method, for a particular investment based on the security profile and events occurring in the lifespan timeline of the investment. Reports may be used to evaluate income and performance. ITAMS 10 provides choice of Trade reporting, SAP reporting, GAAP reporting, or TAX reporting. The reporting component 1200 may provide cycles of financial information on, for example, daily investment values. Reporting cycles may also occur monthly, so that a user 5 may review gains/losses over the month. Cycles may also occur quarterly, as for example, for tax reporting. Cycles provided to a user 5 may show up-to-date purchases and sales. The user 5 may then confirm, for example, with a trade ticket that the ticket matches a broker's confirmation and that the purchase or sale is moving through the marketplace properly, based on bank activity. The reporting component 1200 may also provide progression reports to allow a user 5 to view, for example, interest changes over time. A user 5 may then provide the reports showing, for example, changes in interest or other quantities to management and/or regulators.

A portfolio can be grouped together with other portfolios for the purpose of combined reporting so that GAAP, SAP, Tax, and/or Trade information may be reviewed in the same report. Even though a report may be designed for a specific accounting method, the reporting component 1200 may allow for the user 5 to specify a different accounting method for on-demand reporting.

The reporting component 1200 may provide a feature to automatically determine the appropriate dates for a production report. Most production reports are run according to a predefined schedule. This schedule could be daily, weekly, monthly, quarterly, or annually. The reporting component 1200 may allow the user 5 to set a date from which all reports refer. The reporting component 1200 may provide a calendar, such that at the beginning of the year, the user 5 would designate pre-defined days to run reports.

Figure 31:
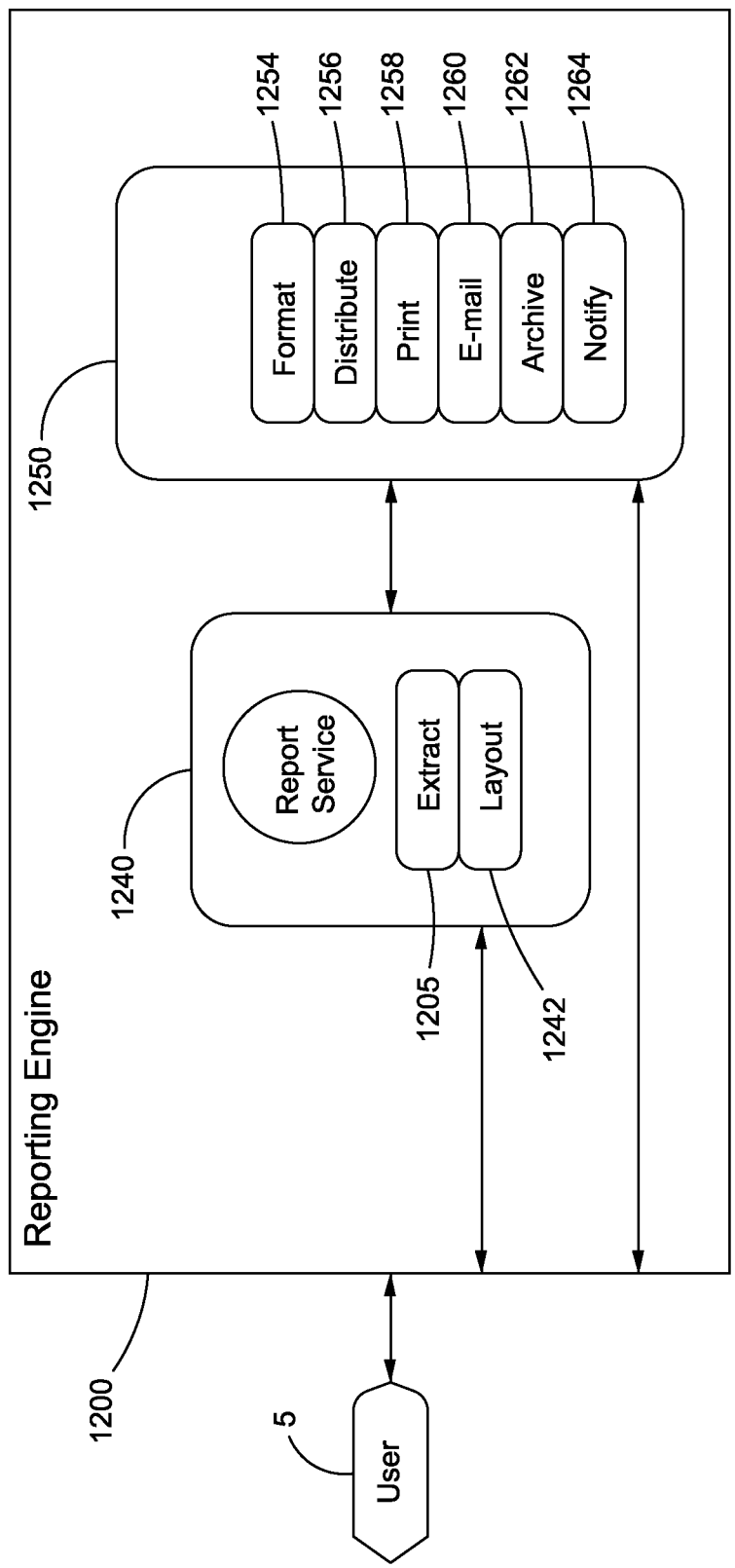
FIG. 31 shows a schematic of interconnection to and from the reporting component to a user providing various types of reporting to a user in one embodiment of the present invention.

FIG. 31 shows a schematic of interconnection to and from the reporting component 1200 to a user 5 and sub-function elements of the reporting component in one embodiment of the present invention. In general, the reporting component 1200 may output from the ITAMS 10 to a hard copy (e.g. paper), to an electronic copy (e.g. electronic document or e-mail), or to another system (e.g. another accounting system).

A user 5 may request a report or may be scheduled to receive a report from the reporting component 1200. The user 5 may define, in the initial request for a report, a specific reporting service and choose settings for the report. In some embodiments of the invention, if the user 5 does not predefine the type of report and/or distribution method for the report, the reporting component 1200 may request the user 5 to select from various reporting services and/or settings. Alternatively, the reporting component 1200 may default to a predefined standard report format.

The reporting component 1200 provides various reporting services 1240. One type of report service 1240 is an extract 1205. The reporting component 1200 may provide to a user 5 an extract 1205, which may be a portion of a ledger for an investment, as provided by the ledger component 1100. The portion may provide financial accounting for a certain period of time. The reporting component 1200 may also provide a layout 1242 to the user 5 showing the entire financial accounting for a particular investment in for example, a ledger.

Various types of report settings 1250 may be defined by the reporting component 1200, as for example, requested by the user 5. The format 1254 of the report may be specified and generated by the reporting component 1200. For example, the format 1254 may be provided in Microsoft Excel. Other formats may include other financial spreadsheets, such as Apple Numbers, or in presentation format, such as Microsoft PowerPoint, and/or any other means to read financial accounting. Another report setting 1250 may include reporting distribution 1256. With reporting distribution 1256, the reporting component 1200 may define what users and/or other individuals will receive a report. For example, the distribution 1256 setting may be determined by the reporting component 1200, based on user 5 request or selection, to provide reports to the user 5, a user's manager, and a regulator specified by the user 5.

Another report setting 1250 that may be processed by the reporting component 1200, as requested or selected by the user 5, is reporting print 1258. In this particular setting, choosing to print may be selected along with the printer and format of the report for printing for processing by the reporting component 1200. In other embodiments of the inventions, a print setting to provide a report in electronic print format, such as PDF, may be processed by the reporting component 1200. A reporting e-mail 1260 setting may also be processed by the reporting component 1200 so that a report or portions of the report may be sent to a user 5 or specified personnel by electronic transmission. A reporting archive 1262 setting may also be processed by the reporting component 1200, as for example, requested by a user 5. Present and/or past reporting for a particular portfolio or security may be transmitted from the reporting component 1200 to the ITAMS Database Server 150. The archived reports may be stored for a security with the security profile in the security database 210 and/or with a specified portfolio in the portfolio database 220. The archived reports may be stored in any database within ITAMS 10. The reporting component 1200 may also process reporting notification 1264. The reporting notification 1264 settings may be selected by the user 5. Reporting notification 1264 may be scheduled by the reporting component 1200, based on request or selection of a user 5. A user 5 may specify when a reporting notification 1264 should occur, as for example, daily, monthly, or quarterly. The user 5 may also specify who shall receive the reporting notifications 1264. Report settings may also be defined in standards set by, for example, a system administrator or manager. ITAMS 10 may incorporate different report settings for different investment groups, e.g., GAAP, SAP, Tax, or Trade.

Figure 32:
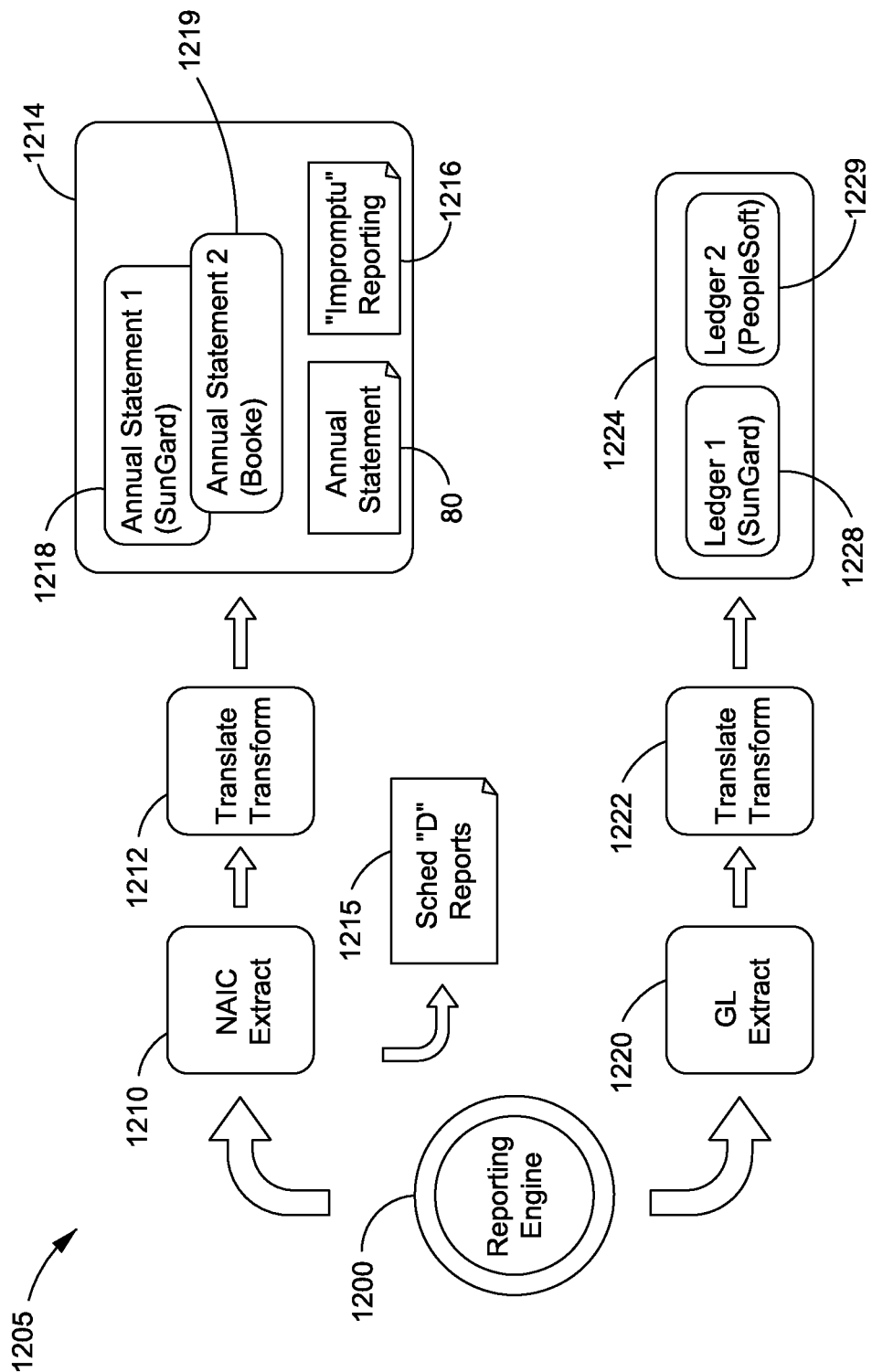
FIG. 32 shows an exemplary process for transmitting output extracts from the reporting component in one embodiment of the present invention.

FIG. 32 shows an exemplary process for transmitting output extracts from the reporting component 1200 in one embodiment of the present invention. An example extract reporting process 1205 is shown for a particular security. As shown in FIG. 32, the reporting component 1200 may provide an extract for a particular investment for a user 5 to report to a particular financial organization. Information pertaining to a ledger may be processed and categorized for reporting to, for example, the National Association of Insurance Commissioners (NAIC). At step 1210 an NAIC extract for particular security if prepared by the reporting component 1200 based on the ledger provided by the ledger component 1100 for the particular investment. The reporting component 1200 may organize the NAIC extract into a schedule "D" report for Tax accounting at step 1215. The schedule "D" report may be provided to a user 5 in various format types, such as electronically for review or for print. At step 1212, the reporting component 1200 may also translate the financial, security, and/or portfolio information in the NAIC extract to transform the information into an accepted standard for transmission to a user 5 in the network 25. At step 1214, the user 5 receives the transformed NAIC extract information. The NAIC information may be transmitted, as shown in FIG. 32, to a SunGard software system 1218 or a Booke software system 1219, typically utilized by regulators for reviewing reports to the NAIC so that, for example, a regulator may review the extract in a format as provided by either the SunGard 1218 or Booke software system 1219. The transformed NAIC extract may also be reported in an annual statement 80 to regulators at NAIC and various insurance departments. The reporting component 1200 may also provide "impromptu" reporting, at the request of a user 5 or other personnel, as for example, a regulator with the NAIC.

As shown in FIG. 32, the reporting component 1200 may provide another extract for the same or another investment for a user 5 in a particular financial group from a general ledger. At step 1220, a general ledger (GL) extract for particular security is prepared by the reporting component 1200 based on the ledger provided by the ledger component 1100. At step 1222, the reporting component 1200 may also translate the financial, security, and/or portfolio information in the GL extract to transform the information into an accepted standard for transmission to a user 5 in the network 25. At step 1224, the user 5 receives the transformed GL extract information. The GL extracted information may be transmitted, as shown in FIG. 32, to a SunGard database 1228 or a PeopleSoft software system 1229, so that a user 5 may review the general ledger extract in a format as provided by either the SunGard 1229 or PeopleSoft software system 1229.

Figure 33:
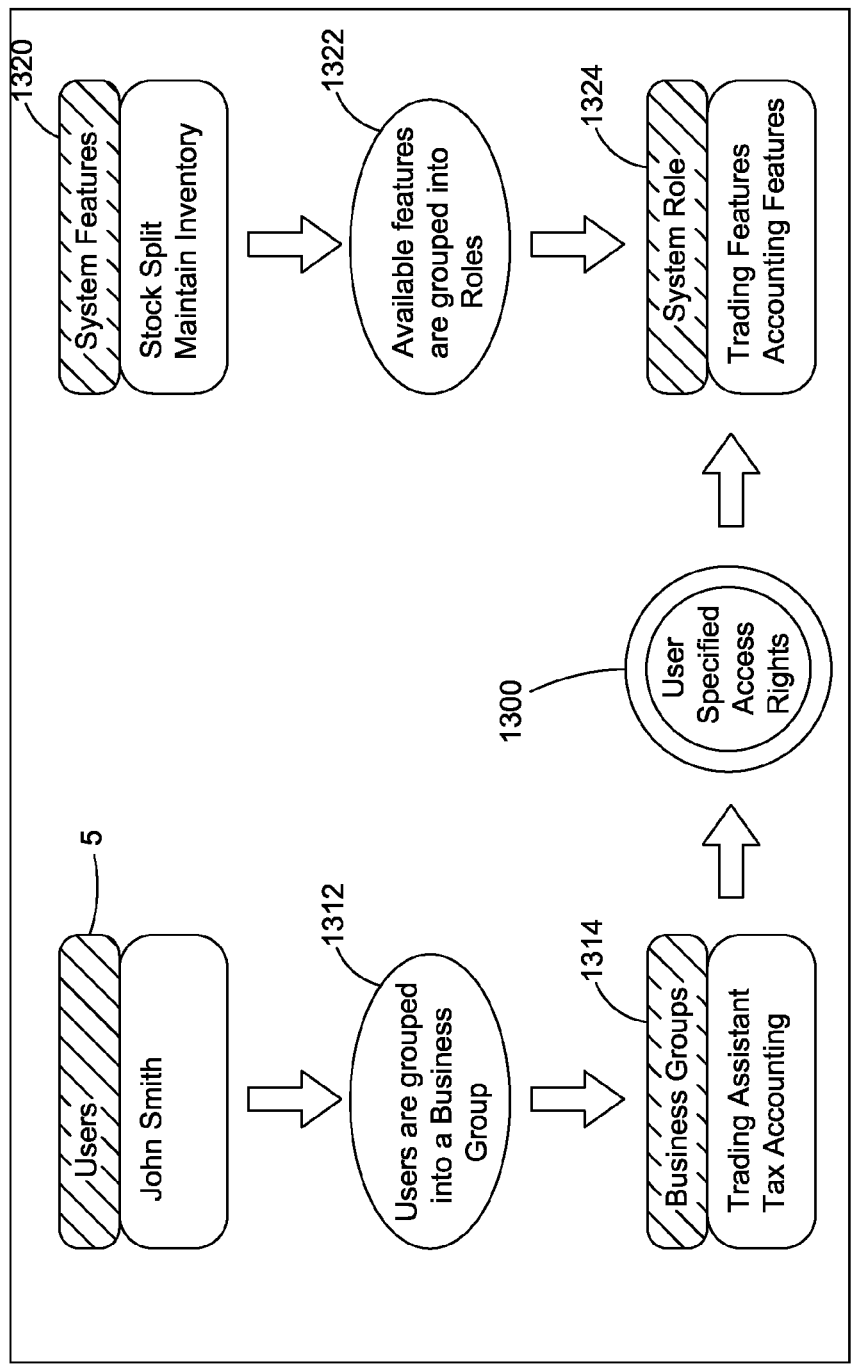
FIG. 33 shows processing of system access rights according to one embodiment of the present invention.

FIG. 33 shows processing of system access rights according to one embodiment of the present invention. ITAMS 10 processes and manages user specified access rights 1300 for a user 5 to utilize features provided through ITAMS 10. ITAMS 10 may restrict/grant access to the ITAMS 10, or to specific features of ITAMS 10. The user 5 may be a customer, an user, finance professional, or any other person provided with some form of access to ITAMS 10.

As shown in FIG. 33, ITAMS 10 processes various inputs to determine access rights for a user 5. A user may be identified by ITAMS 10 through a userID. The security device 6 (see FIG. 1) compares userID and password to user account information stored on the ITAMS user database server 7 (see FIG. 1) to verify whether user 5 has access to work with ITAMS 10. The ITAMS user database server 7 may communicate to the ITAMS application server 100 whether or not the user 5 has access to ITAMS 10 and/or whether the user 5 is restricted from particular applications and/or data in ITAMS 10. Once the userID and password are verified, the user 5 may begin utilizing the ITAMS 10.

As a new user 5 is introduced to ITAMS 10, ITAMS 10 groups that user 5 with other users by a designated business group in step 1312. A system administrator may designate the business group to which the user 5 belongs and provide the information to ITAMS 10. In ITAMS 10, a business group is the classification of users based on the roles they perform. Users 5 of the system can be added to one or more business groups 1314. Adding users 5 to a business group 1314 allows users 5 to begin performing tasks common to that particular business group in ITAMS 10. Examples of business groups 1314 may be trading assistant or tax accounting.

ITAMS 10 groups the various system features 1320 that may be utilized or provided by a user 5 into system roles 1324 through processing step 1322. In ITAMS 10, a system feature is a feature in the system of which access/use is limited to users of a specified role. For example, a user 5 introducing a stock split as a real event or in a what-if scenario is a system feature 1320 that may be utilized by a user 5. Another example feature 1320 may be that the user 5 can maintain inventory within ITAMS 10. In ITAMS 10, the system roles 1324 provide a way of grouping related system tasks for the purpose of access rights. Instead of being assigned individually, tasks are grouped into system roles 1324.

ITAMS 10 assigns the system roles 1324 to a business group 1314 so that the system roles 1324 are automatically "inherited" by each user 5 of the business group 1314. System roles 1324 may also be assigned to specific users 5 without access to a business group 1314. So, for example the ability to enter, correct, or reverse events in the system will be restricted to users 5 having the system role (or roles) 1324 defined for a particular event use case.

Figure 34:
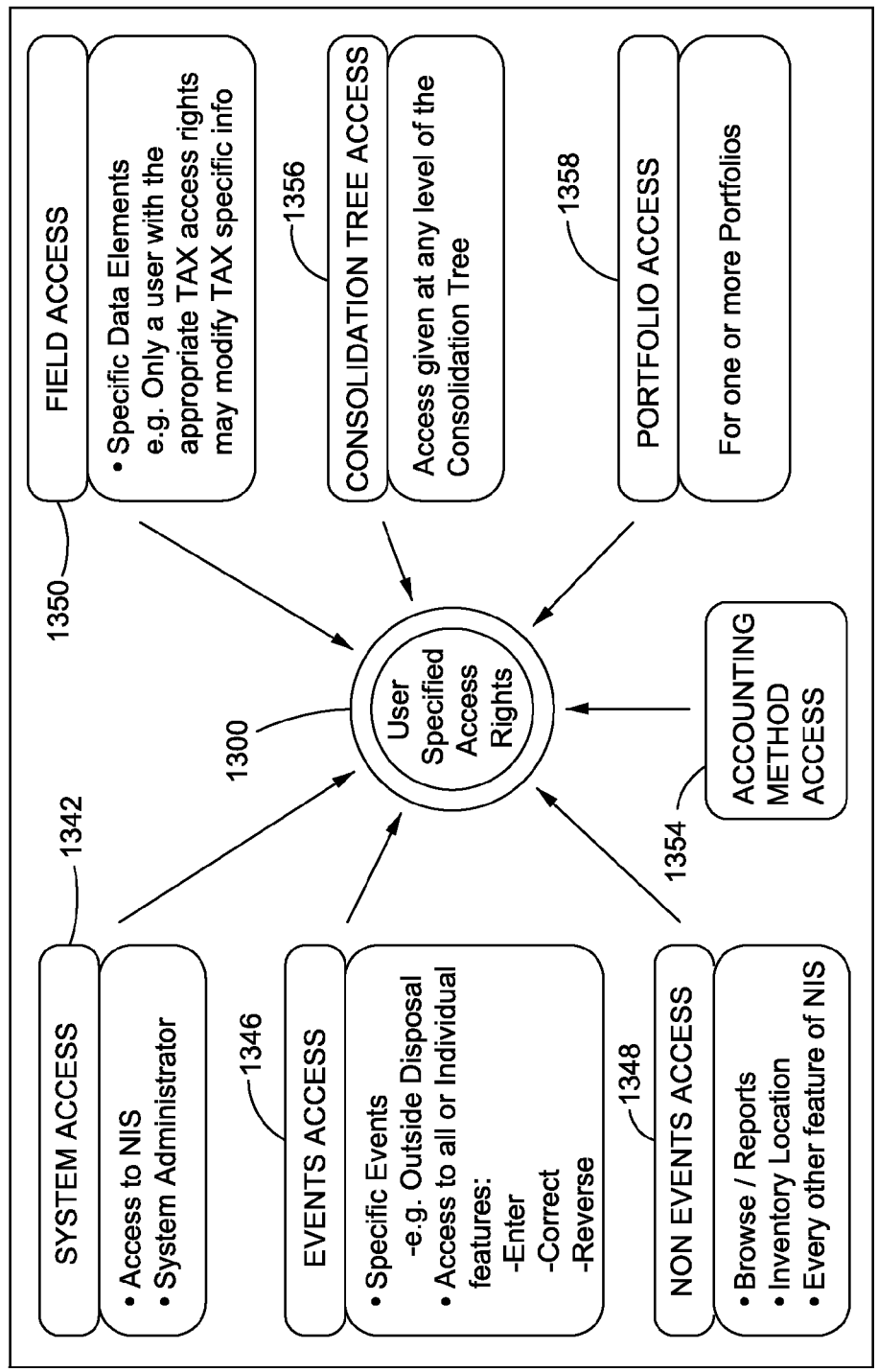
FIG. 34 shows various considerations for processing access rights by ITAMS according to one embodiment of the present invention.

FIG. 34 shows various considerations for processing access rights by ITAMS 10 according to one embodiment of the present invention. An initial consideration processed by ITAMS 10 for user specified access rights 1300 pertaining to a user 5 is whether the user 5 has any access to ITAMS 10, designated under the system access 1342. A system administrator may provide ITAMS 10 with user 5 information for granting user 5 access to the system. The administrator or ITAMS 10 may then assign the user 5 with a userID for access after the system administrator identifies the new authorized user 5. ITAMS 10 conducts authorization of the user 5 for further system 1342 access. When a user 5 is authenticated, the ITAMS 10 will check the ITAMS user database server 7 to confirm whether the user 5 is authorized to use the system under 1342.

Another consideration for processing by ITAMS 10 is for determining events access 1346 for a user 5. A user 5 may be granted full access, partial access, or no access to manipulating an event. Manipulating an event may include a user 5 entering an event into ITAMS 10, to be processed at the event engine 600. Manipulation may also include correcting an event, so as for example, changing an amount or price of sold stock. Correcting an event may result in reprocessing of the event for an investment/security in the event engine 600. Manipulation may also include reversing an event. Reversing an event may include a user 5 removing an event provided by, for example, another user 5 or from a feed site 20, from the lifespan timeline of a security. Reversing an event may also result in reprocessing events in the timeline of an investment at the event engine 600. A user 5 may also apply an event for back-dating. The user 5 may also be granted access by ITAMS 10 to only specific types of events, as for example, an outside disposal.

Non-events access 1348 may also be processed by ITAMS 10 for access for a user 5. Non-events are any features that may be utilized through ITAMS 10 that do not create, impact, or effect events. ITAMS 10 may manage access to browsing for example, information or a timeline pertaining to a security. ITAMS 10 may manage access to, for example, reports for investments, or inventory location review.

Another consideration for processing by ITAMS 10 is for determining the accounting method access 1354 for a user 5. The system role 1324 (see FIG. 33) by default may not be accounting method specific. However, if there is a need to have a separate role for each feature for GAAP, SAP, Tax and Trade, these roles may be specified by an administrator for the ITAMS 10 to separate. So for example, a stock split event use case may specify that there must be a separate capital change reviewer role for each of GAAP, SAP, Tax, and Trade so that ITAMS 10 will separate these capital change reviewer roles for each of these accounting methodologies.

Another consideration for processing by ITAMS 10 is for determining the field access 1350 for a user 5. In field access 1350, a user 5 may only be granted by ITAMS 10 access to specific data elements for a particular investment. These data elements may include particular security attributes of the investment. Thus, a user 5 may be granted to create and/or modify certain security attributes for processing by the security profile component 400. For example, only a user 5 with the appropriate Tax privilege may change Tax specific data fields for defining the attributes of a newly entered security before the security profile component 400 generates the security profile.

Another consideration for processing by ITAMS 10 is for determining the consolidation tree access 1356 for a user 5. Each user 5 may be assigned to a consolidation tree (i.e. a root-level consolidation group) selected from one of active consolidation views: GAAP, SAP, or Tax.

Another consideration for processing by ITAMS 10 is for determining the portfolio access 1358 for a user 5. In the context of certain events or processes, users 5 may only be able to perform these functions on portfolios they are assigned to by ITAMS 10. Access provided by ITAMS 10 to enter an event or initiate a system process, a non-event, for a portfolio may be determined by ITAMS 10 according to the access privileges already defined for an event or non-event by ITAMS 10. If ITAMS 10 specifies for an event or non-event that access must be limited to users 5 assigned to a specific portfolio, the user's portfolio assignments may be checked by ITAMS 10.

FIG. 35 shows an exemplary screenshot for user privilege entry preceding access rights to ITAMS 10 in one embodiment of the present invention. The entry screen may be provided by ITAMS 10 to enter user 5 access information. User 5 information may be added in the fields contained in user add/edit box 1331. A system administrator may provide or update this information. The system administrator may provide the user ID or the ITAMS 10 may provide the next available userID number. In the business group membership box 1332, a system administrator may choose from the business membership groups in the column identified by "available" on the left, such as trading or SAP Subsidiary Accountants, for addition to the column identified by "selection" on the right. After selection of the business group memberships, ITAMS 10 provides the administrator with system roles in the system roles for user box 1334, based on the business group membership selected, in the left column identified as "available", so that the administrator may then choose the appropriate system roles for incorporation in the column to the right identified by "selected." In the consolidation group box 1336, the administrator may then select the appropriate consolidation view at the consolidation view drop down window 1337. The administrator may choose the accounting method for consolidation view, such as for example GAAP, SAP, and Tax. Based on the consolidation view, ITAMS 10 will provide related consolidation groups in the consolidation group drop down window 1338. So for example, as shown in FIG. 35, if the administrator chooses GAAP as the consolidation view, then GAAP group may be chosen as the consolidation group. In the portfolios box 1340, the administrator may select which particular portfolios the user 5 shall be granted access by ITAMS 10 from the available column on the left to the selected column on the right. User 5 granted rights to portfolios listed in the "selected" column may only update information pertaining to those selected portfolios. If "all portfolios" is selected in the portfolios box 1340, then consolidation group setting are ignored and default access to all accounting methods for a user 5 is granted by ITAMS 10 to the user 5.

Figure 36:
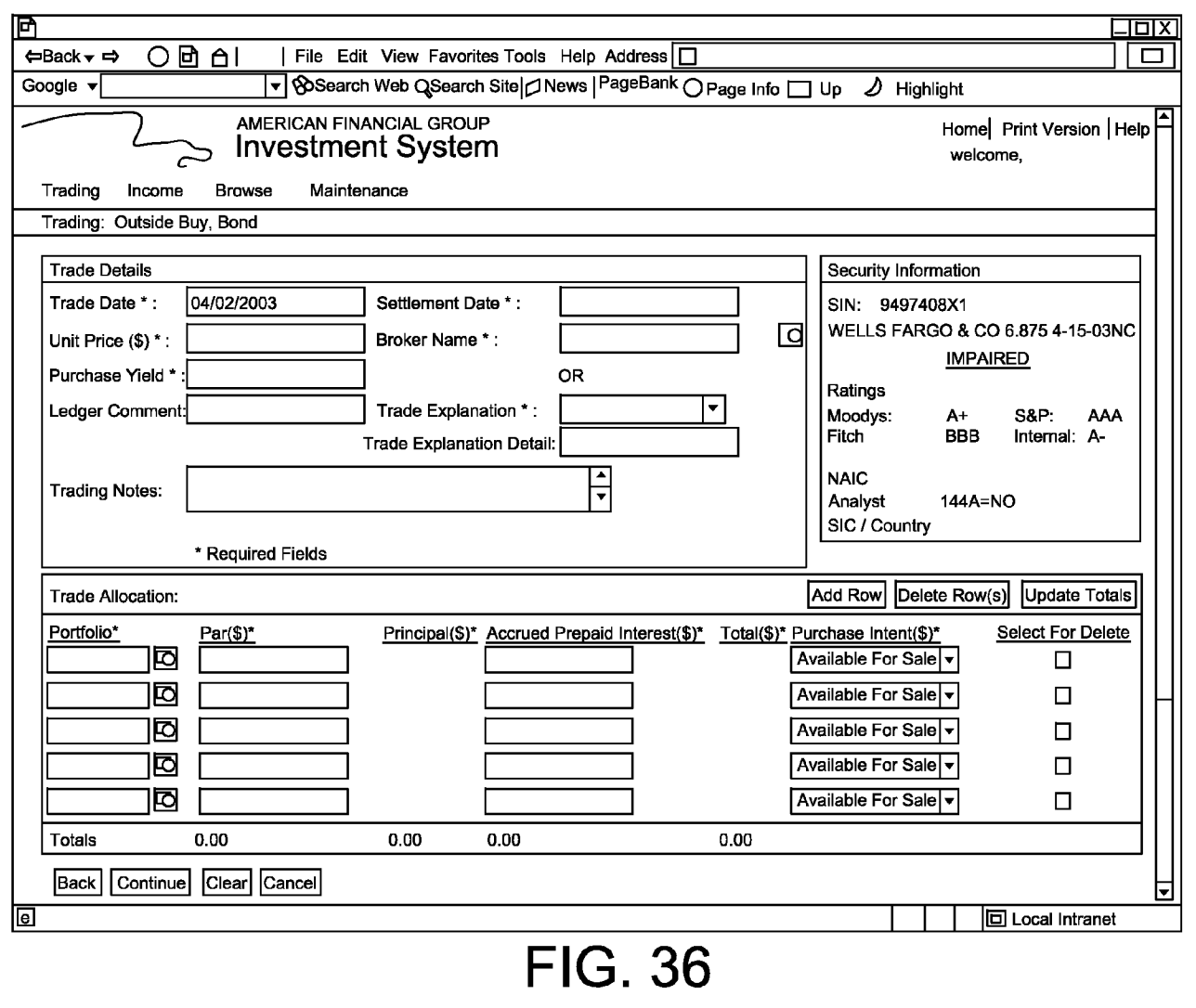

FIG. 36 shows an exemplary trading page for a bond. FIG. 37 shows an exemplary trading page with trade allocation event table for a stock on the ITAMS.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. An investment, trading and accounting management system comprising:
   an application server for processing an investment and one or more events pertaining to the investment, the application server comprising:
   a security profile component to receive the investment and information pertaining to the investment from one or more users or one or more feed sites, wherein the security profile component organizes the information pertaining to the investment into one or more security attributes and assigns the investment and the one or more security attributes into one or more predefined security templates to generate a security profile for the investment;

an event engine connected with the security profile component to receive the one or more events pertaining to the investment from the one or more users or the one or more feed sites and to receive the security profile from the security profile component, wherein the one or more events are linked to the security profile pertaining to the investment by the event engine, the event engine comprising:

an event handler component to add at least one of the one or more events to an investment timeline of events in the life of the investment at a date on the investment timeline in which the at least one event occurred;

a calculation component connected with the event handler component to receive the investment timeline from the event handler component and calculate one or more calculated outputs comprising at least one of a cash flow, an amortization, and a yield for the security profile as of a specified date on the investment timeline after the addition of the at least one event to the investment timeline based on the at least one event, wherein the calculation component selects one or more accounting methods to calculate based on the one or more security attributes or from a request from the one or more users;

a rules handler component connected to the calculation component to receive the one or more calculated outputs from the calculation component and to apply one or more rules to the one or more calculated outputs of the calculation component to generate one or more rule-applied calculated values, wherein the one or more rules are based on the one or more accounting methods selected by the calculation component; and a what-if component connected to the rules handler component and the calculation component, wherein the what-if component receives one or more hypothetical events from the one or more users to add to, change or remove from the investment timeline of events in the life of the investment for calculation at the calculation component and application of one or more rules at the rules handler component to generate a hypothetical rule-applied calculated value and to transmit the hypothetical rule-applied calculated value to the one or more users; and a reporting component connected to the event engine to receive the one or more rule-applied calculated values and to report the one or more rule-applied calculated values for the security profile to the one or more users; and a database server connected with the application server to transmit to the application server, receive from the application server, and store at least one of: the investment; the information pertaining to the investment, the security profile, the one or more investment timelines, the one or more rules for the one or more accounting methods, the one or more events, the one or more calculated outputs, the one or more rule-applied calculated values, and the hypothetical rule-applied calculated value.

2. The system of claim 1, wherein the one or more accounting methods comprise at least one of: GAAP accounting, SAP accounting, and Tax accounting.

3. The system of claim 1, wherein the one or more accounting methods comprise two or more of: GAAP accounting, SAP accounting, and Tax accounting.

4. The system of claim 1, further comprising investment groups for managing investments, the investment groups comprising one or more users from at least one of: a GAAP department, a SAP department, a Tax department, and a Trade department.

5. The system of claim 1, further comprising investment groups for managing investments, the investment groups comprising one or more users from two or more of: a GAAP department, a SAP department, a Tax department, and a Trade department.

6. The system of claim 1, wherein the application server further comprises an accounting maintenance component connected with the security profile component to receive the security profile, the event engine to receive the one or more events and the one or more rule-applied calculated values, and the reporting component to transmit an inventory and a difference between the inventory and the rule-applied calculated values; wherein the accounting maintenance component receives the inventory from the one or more users or the one or more feed sites and compares the inventory with the one or more rule-applied calculated values to determine the difference, determine the availability of the inventory, and to reconcile the difference.

7. The system of claim 1, wherein the application server further comprises a ledger component connected to the event engine and the reporting component to update a ledger pertaining to the security profile with the one or more rule-applied calculated values transmitted from the event engine and to transmit the ledger to the reporting component.

8. The system of claim 1, wherein the specified date on the investment timeline is selected from:
a user chosen date;
an occurrence date, wherein the occurrence date is a date the event occurred; or
a pre-closing date, wherein the pre-closing date is a date prior to a reporting period closing date.

9. The system of claim 1, further comprising a user database server connected with the application server and a user interface, wherein the user database server stores user account information for the one or more users comprising at least one of a user ID and a password, and wherein the application server compares the user account information on the user database server with an entered user ID and an entered password from the one or more users at the user interface to allow or deny access to the one or more users to the application server.

10. The system of claim 9, wherein the user account information further comprises:
one or more business groups of which the one or more users belongs;
one or more event access rights of which the one or more users belong, wherein the one or more event access rights define whether the one or more users can enter or modify the one or more events; and
one or more accounting method access rights of which the user belongs, wherein the one or more accounting method access rights define whether the one or more users can access the application server for the one or more accounting methods.

11. The system of claim 1, wherein the one or more feed sites comprise at least one of a Custodial Bank, a security data provider, Bloomberg, BNY Mellon, National Association of Insurance Commissioners (NAIC), EJV, IDSI, and BROKER.

12. A method for managing investments, trading and accounting for investments comprising:
processing an investment and one or more events pertaining to the investment at an application server comprising:
receiving the investment and information pertaining to the investment from one or more users or one or more feed sites at a security profile component in the application server, wherein the one or more users or the one or more feed sites communicate with the application server;
organizing the information pertaining to the investment into one or more security attributes at the security profile component;
selecting a predefined security template from various security templates stored in a database server based on the investment and the one or more security attributes at the security profile component;
transmitting the selected predefined security template from the database server to the security profile component;
assigning the investment and the one or more security attributes to the selected predefined security template at the security profile component;
generating a security profile after assigning the investment and the one or more security attributes to the selected predefined security template in the security profile component;
transmitting the security profile from the security profile component to an event engine;
receiving the one or more events from the one or more users or the one or more feed sites at the event engine;
linking the security profile with the one or more events pertaining to the investment at the event engine;
selecting an investment timeline of events in the life of the investment from one or more security timelines pertaining to the security profile from the database server by the event engine;
transmitting the selected investment timeline from the database server to the event engine;
adding at least one of the one or more events to the selected investment timeline at a date the at least one event occurred at an event handler component in the event engine;
transmitting the selected investment timeline for the security profile with the added at least one event to a calculation component in the event engine from the event handler component;
selecting one or more accounting methods in the calculation component for calculating one or more calculated outputs for the selected investment timeline based on the at least one event, wherein the one or more accounting methods are selected based on the security attributes or by a request from the one or more users;
calculating the one or more calculated outputs comprising at least one of a cash flow, a yield, and an amortization for the one or more selected accounting methods for the security profile as of a specified date on the investment timeline based on the at least one event;
transmitting the one or more calculated outputs from the calculation component to a rules handler component in the event engine;
applying one or more rules to the one or more calculated outputs at a rules handler component based on the one or more selected accounting methods to generate one or more rule-applied calculated values;
transmitting the one or more rule-applied calculated values from the event engine to a reporting component;
reporting the one or more rule-applied calculated values for the security profile at the reporting component to the one or more users;
receiving one or more hypothetical events from the one or more users at a what-if component in the event engine;
transmitting the one or more hypothetical events from the what-if component in the event engine to the event handler component;
linking the security profile with the one or more hypothetical events pertaining to the security at the event engine;
selecting the investment timeline of events in the life of the investment from one or more security timelines pertaining to the security profile from the database server by the event engine;
transmitting the selected investment timeline from the database server to the event engine;
adding at least one of the one more hypothetical events to the selected investment timeline at the date the received event occurred at the event handler;
transmitting the selected investment timeline including the at least one hypothetical event to the calculation component in the event engine;
selecting the one or more accounting methods in the calculation component for calculating at least one hypothetical calculated output for the selected investment timeline based on the at least one hypothetical event, wherein the one or more accounting methods are selected based on the one or more security attributes or from a request from the one or more users;
calculating the at least one hypothetical calculated output comprising at least one of a hypothetical cash flow, a hypothetical yield, and a hypothetical amortization for the one or more selected accounting methods, and for the security profile as of the specified date on the investment timeline based on the at least one hypothetical event;
transmitting the at least one hypothetical calculated output from the calculation component to the rules handler component in the event engine;
applying the one or more rules to the at least one hypothetical calculated output at the rules handler component based on the one or more accounting methods to generate one or more hypothetical rule-applied calculated values;
transmitting the one or more hypothetical rule-applied calculated values from the rules handler component to the what-if component; and
transmitting the one or more hypothetical rule-applied calculated values from the what-if component to the one or more users; and
storing at the database server in connection with the application server at least one of: the investment; the information pertaining to the investment, the security profile, the one or more investment timelines, the one or more rules for the one or more accounting methods, the one or more events, the one or more calculated outputs, the one or more rule-applied calculated values, the at least one hypothetical calculated output, and the one or more hypothetical rule-applied calculated values.

13. The method of claim 12, wherein the one or more accounting methods comprise at least one of: GAAP accounting, SAP accounting, and Tax accounting.

14. The method of claim 12, wherein the one or more accounting methods comprise two or more of: GAAP accounting, SAP accounting, and Tax accounting.

15. The method of claim 12, further comprising investment groups for managing investments, the investment groups comprising one or more users from at least one of: a GAAP department, a SAP department, a Tax department, and a Trade department.

16. The method of claim 12, further comprising investment groups for managing investments, the investment groups comprising one or more users from two or more of: a GAAP department, a SAP department, a Tax department, and a Trade department.

17. The method of claim 12, wherein the one or more accounting methods comprise: GAAP accounting, SAP accounting, and Trading.

18. The method of claim 12, further comprising selecting at the calculation component the specified date on the timeline from: a user chosen date; an occurrence date, wherein the occurrence date is a date on which the event occurred; or a pre-closing date, wherein the pre-closing date is a date prior to a reporting period closing date.

19. The method of claim 18, wherein when the pre-closing date is selected as the specified date, adding the at least on event to the selected investment timeline comprises determining at the event handler component whether the reporting period closing date has already occurred and if the reporting period closing date has already occurred then shifting the at least one event on the selected investment timeline to a date after the reporting period closing date at the event handler component before transmitting the security timeline to a calculation component in the event engine.

20. The method of claim 19, further comprising:
receiving an inventory for the investment at an accounting maintenance component in the application server for the security profile from the one or more users or the one or more feed sites;
receiving the one or more rule-applied calculated values for the security profile from the event engine at the accounting maintenance component;
comparing the inventory for the investment in the security profile with the one or more rule-applied calculated values to determine differences at the accounting maintenance component;
reconciling the differences at the accounting maintenance component; and
transmitting the inventory or differences to the reporting component.

21. The method of claim 12, further comprising archiving the selected investment timeline into the database server to add to the one or more investment timelines pertaining to the security profile after selecting the investment timeline and before retrieving the investment timeline.

* * * * *